(12) United States Patent
Stone et al.

(10) Patent No.: US 11,571,036 B2
(45) Date of Patent: Feb. 7, 2023

(54) LATERALLY SUPPORTED FILAMENTS

(71) Applicant: VICIS IP, LLC, New York, NY (US)

(72) Inventors: Andre Stone, Seattle, WA (US); Anton Perry Alferness, Seattle, WA (US); Mike Czerski, Seattle, WA (US); Jason Neubauer, Seattle, WA (US); Adam Frank, Seattle, WA (US); Travis Glover, Seattle, WA (US); Kayla Fukuda, Seattle, WA (US)

(73) Assignee: Vicis IP, LLC, New York, NY (US)

(*) Notice: Subject to any disclaimer, the term of this patent is extended or adjusted under 35 U.S.C. 154(b) by 124 days.

(21) Appl. No.: 16/410,429

(22) Filed: May 13, 2019

(65) Prior Publication Data

US 2020/0022444 A1 Jan. 23, 2020

Related U.S. Application Data

(63) Continuation-in-part of application No. PCT/US2017/041273, filed on Jul. 8, 2017, which is
(Continued)

(51) Int. Cl.
*A42B 3/06* (2006.01)
*A42B 3/12* (2006.01)
(Continued)

(52) U.S. Cl.
CPC .............. *A42B 3/062* (2013.01); *B32B 3/085* (2013.01); *B32B 2307/56* (2013.01)

(58) Field of Classification Search
CPC ........... A42B 3/062; A42B 3/12; A42B 3/125; A42B 3/128; A42B 3/121; A42B 3/124;
(Continued)

(56) References Cited

U.S. PATENT DOCUMENTS 3,447,163 A 6/1969 Tojeiro et al.
3,617,416 A 11/1971 Kromrey
(Continued)

FOREIGN PATENT DOCUMENTS

CN 1291263 4/2001
CN 101513287 8/2009
(Continued)

OTHER PUBLICATIONS

PCT International Search Report and Written Opinion, PCT Appl. No. PCT/US2017/012373, dated Mar. 17, 2017, 1-13 pgs.
(Continued)

*Primary Examiner* — Joanna Pleszczynska
(74) *Attorney, Agent, or Firm* — Fish & Richardson P.C.

(57) ABSTRACT

Protective clothing and/or equipment may comprise an impact mitigation layer which comprises a plurality of impact mitigation assemblies positioned between an exterior surface and an interior surface. The plurality of impact mitigation assemblies may comprise an impact absorbing array of impact mitigation structures having at least one filament and a lateral support wall or connecting element. When force is applied to the exterior surface, the structures of the impact absorbing materials deform in a desired and controlled manner, reducing the force received by the interior surface.

25 Claims, 41 Drawing Sheets

Related U.S. Application Data a continuation-in-part of application No. 15/399,034, filed on Jan. 5, 2017, application No. 16/410,429, which is a continuation-in-part of application No. 15/644,756, filed on Jul. 8, 2017, now Pat. No. 10,973,272, which is a continuation-in-part of application No. 15/399,034, filed on Jan. 5, 2017.

(60) Provisional application No. 62/670,643, filed on May 11, 2018, provisional application No. 62/682,125, filed on Jun. 7, 2018, provisional application No. 62/276,793, filed on Jan. 8, 2016.

(51) Int. Cl.
*B32B 3/08* (2006.01)
*B32B 3/18* (2006.01)
*B32B 3/20* (2006.01)

(58) Field of Classification Search
CPC .. B32B 3/085; B32B 3/18; B32B 3/20; B32B 3/22
See application file for complete search history.

(56) References Cited

U.S. PATENT DOCUMENTS

| | | | |
|---|---|---|---|
| 4,283,864 A | 8/1981 | Lipfert | |
| 4,412,358 A | 11/1983 | Lavender | |
| 4,558,470 A | 12/1985 | Mitchell et al. | |
| 5,204,998 A | 4/1993 | Liu | |
| 5,950,243 A | 9/1999 | Winters | |
| 5,956,777 A | 9/1999 | Popovich | |
| 6,029,962 A | 2/2000 | Shorten et al. | |
| 6,397,399 B1 | 6/2002 | Lampe | |
| 6,530,564 B1 | 3/2003 | Julien | |
| 6,969,548 B1 | 11/2005 | Goldfine | |
| 7,089,602 B2 | 8/2006 | Talluri | |
| D582,608 S | 12/2008 | Palmer | |
| 7,516,597 B1 | 4/2009 | Roose | |
| 7,677,538 B2 | 3/2010 | Darnell et al. | |
| 8,615,826 B2 | 12/2013 | Michael | |
| 8,640,267 B1 | 2/2014 | Cohen | |
| 8,661,564 B2 | 3/2014 | Dodd | |
| 9,375,041 B2 | 6/2016 | Plant | |
| 9,839,251 B2 | 12/2017 | Pannikottu et al. | |
| 10,376,000 B2 | 8/2019 | Desnoyers | |
| 2004/0168246 A1 | 9/2004 | Phillips | |
| 2006/0064900 A1 | 3/2006 | Aveni | |
| 2006/0070171 A1 | 4/2006 | Copeland et al. | |
| 2007/0083965 A1 | 4/2007 | Darnell | |
| 2010/0223730 A1 | 9/2010 | Pearce | |
| 2010/0258988 A1 | 10/2010 | Darnell et al. | |
| 2011/0113559 A1 | 5/2011 | Dodd | |
| 2011/0143080 A1 | 6/2011 | Ortiz | |
| 2012/0198604 A1* | 8/2012 | Weber | A42B 3/125 2/414 |
| 2012/0266365 A1 | 10/2012 | Cohen | |
| 2013/0061371 A1 | 3/2013 | Phipps et al. | |
| 2013/0122256 A1* | 5/2013 | Kleiven | A42B 3/064 428/158 |
| 2013/0185837 A1 | 7/2013 | Phipps et al. | |
| 2013/0234376 A1 | 9/2013 | Frey et al. | |
| 2013/0305435 A1 | 11/2013 | Surabhi | |
| 2013/0340147 A1 | 12/2013 | Giles | |
| 2014/0004322 A1 | 1/2014 | Kim | |
| 2014/0007322 A1 | 1/2014 | Marz et al. | |
| 2014/0101816 A1 | 4/2014 | Toronjo | |
| 2014/0196198 A1* | 7/2014 | Cohen | F41H 1/04 2/414 |
| 2015/0059063 A1 | 3/2015 | Ho | |
| 2015/0072103 A1* | 3/2015 | Tresso | B32B 3/20 428/116 |
| 2015/0223547 A1 | 8/2015 | Wibby | |
| 2015/0272255 A1 | 10/2015 | Galaitsis et al. | |
| 2015/0285697 A1 | 10/2015 | O'Bier, II et al. | |
| 2015/0305430 A1 | 10/2015 | Rush et al. | |
| 2016/0255900 A1 | 9/2016 | Browd et al. | |
| 2016/0278470 A1 | 9/2016 | Posner et al. | |
| 2018/0058531 A1 | 3/2018 | Schaedler et al. | |
| 2018/0132556 A1 | 5/2018 | LaPerriere et al. | |
| 2018/0184732 A1 | 7/2018 | Plant | |

FOREIGN PATENT DOCUMENTS

| | | |
|---|---|---|
| CN | 103263108 | 8/2013 |
| CN | 203152622 | 8/2013 |
| EP | 1793697 A2 | 6/2007 |
| EP | 2922431 A1 | 9/2015 |
| GB | 1578351 A2 | 11/1980 |
| GB | 2518668 A | 4/2015 |
| JP | 2001171448 A | 6/2001 |
| JP | 2007254920 | 10/2007 |
| WO | 2010076257 A2 | 7/2010 |
| WO | 2015002986 A1 | 1/2015 |
| WO | 2015044687 A2 | 4/2015 |
| WO | 2015089646 A1 | 6/2015 |
| WO | 2015103634 A2 | 7/2015 |
| WO | 2016154364 A1 | 9/2016 |
| WO | 2017033022 A2 | 3/2017 |

OTHER PUBLICATIONS

PCT International Search Report and Written Opinion, PCT Appl. No. PCT/US2017/041273, dated Dec. 1, 2017, 1-12 pgs.
Office Action for JP Patent Appl. No. 2018-535866, dated Jul. 23, 2019 (with English Translation), 8 pgs.
Supplementary European Search Report, U.S. Appl. No. 17/736,356, dated Oct. 14, 2019, 9 pgs.
Qi, H.J., Boyce, M.C. "Stress-strain behavior of thermoplastic polyurethanes," 2005, Mechanics of Materials 37, pp. 817-839.

* cited by examiner

LATERALLY SUPPORTED FILAMENTS

CROSS-REFERENCE TO RELATED APPLICATIONS

This application claims the benefit of U.S. Provisional Application No. 62/670,643 entitled "Modular Impact Mitigation Assemblies (MIMAS)," filed on May 11, 2018, and U.S. Provisional Application No. 62/682,125 entitled "Laterally Supported Filaments," filed on Jun. 7, 2018, the disclosures of which are incorporated by reference herein in their entireties.

This application is a continuation-in-part application of Patent Cooperation Treaty Application Serial No. PCT/US2017/41273, entitled "Laterally Supported Filaments," filed Jul. 8, 2017, which is a continuation-in-part application of U.S. patent application Ser. No. 15/399,034 entitled "Impact Absorbing Structures for Athletic Helmet," filed Jan. 5, 2017, the disclosures of which are each incorporated by reference herein in their entireties.

This application is a continuation-in-part application of U.S. patent application Ser. No. 15/644,756 entitled "Laterally Supported Filaments, which is a continuation-in-part of U.S. patent application Ser. No. 15/399,034 entitled "Impact Absorbing Structures for Athletic Helmet," filed Jan. 5, 2017, which claims the benefit of U.S. Provisional Application No. 62/276,793 entitled "Impact Absorbing Structures for Athletic Helmet," filed Jan. 8, 2016, the disclosures of which are both incorporated by reference herein in their entireties.

TECHNICAL FIELD

The present invention relates to devices, systems and methods for improving protective clothing such as helmets and protective headgear, including improvements in impact absorbing structures and materials to reduce the deleterious effects of impacts between the wearer and other objects. In various embodiments, improved filament arrays are disclosed that can reduce acceleration/deceleration and/or disperse impact forces on a protected item, such as a wearer. Various designs include modular, semi-custom or customized components that can be assembled and/or integrated into new and/or existing protective clothing designs for use in all types of wearer activities (i.e., sports, military, equestrian, etc.).

BACKGROUND

Impact absorbing structures can be integrated into protective clothing or other structures to desirably prevent and/or reduce the effect of collisions between stationary and/or moving objects. For example, an athletic helmet typically protects a skull and various other anatomical regions of the wearer from collisions with the ground, equipment, other players and/or other stationary and/or moving objects, while body pads and/or other protective clothing seeks to protect other anatomical regions. Helmets are typically designed with the primary goal of preventing traumatic skull fractures and other blunt trauma, while body pads and ballistic armors are primarily designed to cushion blows to other anatomical regions and/or prevent/resist body penetration by high velocity objects such as bullets and/or shell fragments. Some protective clothing designs primarily seek to reduce the effects of blunt trauma associated with impacts, while other designs primarily seek to prevent and/or reduce "sharp force" or penetration trauma, including trauma due to the penetration of objects such as bullets, knives and/or shell fragments into a wearer's body. In many cases, a protective clothing design will seek to protect a wearer from both blunt and sharp force injuries, which often involves balancing of a variety of competing needs including weight, flexibility, breathability, comfort and utility (as well as many other considerations).

For example, a helmet will generally include a hard, rounded shell with cushioning inside the shell (and typically also includes a retention system to maintain the helmet in contact with the wearer's head). When another object collides with the helmet, the rounded shape desirably deflects at least some of the force tangentially, while the hard shell desirably protects against object penetration and/or distributes some amount of the impact forces over a wider area of the head. The impact absorbing structures, which typically contact both the inner surface of the helmet shell and an outer surface of the wearer's head, then transmits this impact force (at varying levels) to the wearer's head, which may involve direct contact between the hard shell and the head for higher impact forces.

A wide variety of impact absorbing structures have been utilized over the millennia, including natural materials such as leathers, animal furs, fabrics and plant fibers. Impact absorbing structures have also commonly incorporated flexible membranes, bladders, balloons, bags, sacks and/or other structures containing air, other gases and/or fluids. In more recent decades, the advent of advanced polymers and foaming technologies has given rise to the use of artificial materials such as polymer foams as preferred cushion materials, with a wide variety of such materials to choose from, including ethyl vinyl acetate (EVA) foam, polyurethane (PU) foam, thermoplastic polyurethane (TPU) foam, lightweight foamed EVA, EVA-bound blends and a variety of proprietary foam blends and/or biodegradable foams, as well as open and/or closed cell configurations thereof.

While polymer foams can be extremely useful as cushioning structures, there are various aspects of polymer foams that can limit their usefulness in many impact-absorption applications. Polymer foams can have open- or closed-cell structures, with their mechanical properties dependent on their structure and the type of polymer of which the cells are made. For open-cell foams, the mechanisms of cell edge and micro-wall deformations are also major contributors to the mechanical properties of the foam, while closed cell mechanical properties are also typically affected by the pressure of gases or other substance(s) present in the cells. Because polymer foams are made up of a solid (polymer) and gas (blowing agent) phase mixed together to form a foam, the dispersion, shape and/or directionality of the resulting foam cells are typically irregular and fairly random, which causes the foam to provide a uniform (i.e., non-directionally dependent) response to multi-axial loading. While useful from a general "cushioning" and global "force absorption" perspective, this uniform response can greatly increase the challenge of "tailoring" a polymer foam to provide a desired response to an impact force coming from different loading directions. Stated in another way, it is often difficult to alter a foam's response in one loading mode (for example, altering the foam's resistance to axial compression) without also significantly altering its response to other loading modes (i.e., the foam's resistance to lateral shear forces).

The uniform, multi-axial response of polymer foams can negatively affect their usefulness in a variety of protective garment applications. For example, some helmet designs incorporating thick foam compression layers have been successful at preventing skull fractures from direct axial impacts, but these thick foam layers have been less than successful in protecting the wearer's anatomy from lateral and/or rotational impacts (and can also allow a significant degree of concussive impacts to occur). While softening the foam layers could render the foam more responsive to lateral and/or rotational impacts, this change could also reduce the compressive response of the foam layer, potentially rendering the helmet unable to protect the wearer from impact induced trauma and/or additional brain concussions.

The balancing of force response needs becomes especially true where the thickness of a given compressive foam layer is limited by the cushioning space available in the protective garment, such as between an inner helmet surface and an outer surface of a wearer's skull. In many applications, it is desirous to minimize helmet size and/or weight, which can require a limited foam layer thickness and/or reduced weight foam layer which may be unable to protect the wearer from various impact induced brain concussions. A concussion can occur when the skull changes velocity rapidly relative to the enclosed brain and cerebrospinal fluid. The resulting collision between the brain and the inner surface of the skull in various helmet designs can result in a brain injury with neurological symptoms such as memory loss. Although the cerebrospinal fluid desirably cushions the brain from small forces, the fluid may not be capable of absorbing all the energy from collisions that arise in sports such as football, hockey, skiing, and biking. Even where the helmet design may include sufficient foam cushioning to dissipate some energy absorbed by the hard shell from being transmitted directly to and injuring the wearer, this cushioning is often insufficient to prevent concussions from very violent collisions or from the cumulative effects of many lower velocity collisions.

SUMMARY OF THE INVENTION

Various aspects of the present invention include the realization of a need for improved impact absorbing structures, including custom or semi-custom laterally supported buckling structures and/or various types of macroscopic support structures for replacing and/or augmenting various impact absorbing structures within helmets, footwear and other protective clothing. In various embodiments, the helmets, footwear and other protective clothing may comprise an impact mitigation layer, the impact mitigation layer being coupled to the helmets, footwear and other protective clothing. The impact mitigation layer includes a plurality supported impact absorbing structures to significantly improve the predictability, performance, strength, utility and/or usability.

In various embodiments, a protective helmet may be desired. The protective helmet an outer shell; and an impact mitigation layer, the impact mitigation layer comprising a plurality of impact absorbing pads, the plurality of impact absorbing pads positioned in coupled to different regions within the impact mitigation layer, each of the plurality of impact absorbing pads comprising an impact absorbing assembly and an enclosure, the impact absorbing assembly comprises an impact absorbing array, a plate and at least one foam layer, the impact absorbing array comprises a plurality of polygonal laterally supported filament (LSF) structures and a face sheet, at least a portion of the plurality of polygonal laterally supported filament structures are coupled to a portion of the face sheet, the plate having a first surface and a second surface, the impact absorbing array contacts the first surface of the plate, the at least one foam layer contacts the second surface of the plate, the impact absorbing assembly disposed in the enclosure.

In various embodiments, an impact mitigation layer can comprise an array of impact absorbing structures, the array of impact absorbing structures may comprise longitudinally extending vertical filaments, columns and/or other buckling structures, otherwise known as "open" laterally supported filament (LSF) structures. Each impact absorbing LSF structure comprises a plurality of connected support members, each connected support member having a first filament, a second filament and a connecting lateral support wall. Each of the first and second filaments having an elongated body and high aspect ratio of greater than 3:1 to facilitate an elastic buckling response, the buckling being a lateral deflection away from a longitudinal axis of the filament. At least a portion of the first and second filament may further comprise a uniform and/or constant cross-sectional shape. Alternatively, at least a portion of the first and second filaments may have a substantially uniform and/or substantially constant cross-sectional shape, where substantially is defined as at least ninety percent of the filament body is uniform and/or constant cross-sectional shape. The lateral support wall or connecting element is coupled the first and second filament. The lateral support wall or element may extend at least a portion of the length of the first or second filament. The lateral support wall or connecting element may comprise of different shapes and/or configurations, which includes a strut shape, a cable shape, a beam shape, another filament shape, polygon shaped, re-entrant shapes, parabolic shapes, cone shapes, venturi shaped, hemispherical shaped, re-entrant flared shaped, and/or any combinations thereof. The plurality of connected support members is positioned adjacent to each other to form a pattern, shape or structure. The pattern, shape or structure comprises a circle, and/or a polygon. The polygons may comprise triangles, squares, rectangles, pentagons, hexagons, septagons, octagons, nonagons, decagons, and/or any combination thereof. The polygons may further comprise a regular or irregular polygon.

In various embodiments, an impact mitigation layer can comprise an array of impact absorbing structures, the array of impact absorbing structures may comprise longitudinally extending vertical filaments, columns and/or other buckling structures, otherwise known as "closed" laterally supported filament (LSF) structures. Each impact absorbing LSF structure comprises a plurality of connected support members, each connected support member having a filament and a lateral support wall or connecting element. The filament having a high aspect ratio of greater than 3:1, and a uniform and/or constant cross-sectional shape. Alternatively, the filament may have a substantially uniform and/or substantially constant cross-sectional shape, where substantially is defined as at least ninety percent of the filament body is uniform and/or constant cross-sectional shape. The connecting wall or element is coupled the filament. The connecting wall or element may extend at least a portion of the length of the filament. The lateral support or connecting element may comprise of different shapes and/or configurations, which includes a strut shape, a cable shape, a beam shape, another filament shape, polygon shaped, re-entrant shapes, parabolic shapes, cone shapes, venturi shaped, hemispherical shaped, re-entrant flared shaped, and/or any combinations thereof. The plurality of connected support members is positioned adjacent to each other to form a pattern, shape or structure, and each of the plurality of connected support members arc coupled to each other. The pattern, shape or structure comprises a circle, and/or a polygon. The polygons may comprise triangles, squares, rectangles, pentagons, hexagons, septagons, octagons, nonagons, decagons, and/or any combination thereof. The polygons may further comprise a regular or irregular polygon.

In various embodiments, the impact mitigation layer may comprise a one or more impact mitigation pads. The impact mitigation pads comprising an impact absorbing assembly, the impact absorbing assembly comprises an impact absorbing array, a plate and at least one foam layer, the impact absorbing array comprises a plurality of polygonal laterally supported filament (LSF) structures and a face sheet, at least a portion of the plurality of polygonal laterally supported filament structures are coupled to a portion of the facesheet, the plate having a first surface and a second surface, the impact absorbing array contacts the first surface of the plate, the at least one foam layer contacts the second surface of the plate; and an enclosure, the impact absorbing assembly disposed within the enclosure.

In various embodiments, the connecting wall or connecting element may control or supplement the energy management of the filaments. An LSF structure may comprise a filament and a lateral support wall or connecting element, the connecting wall or element may comprise a web or thin sheet of material extending laterally to at least one adjacent filament. The extending lateral walls or connecting walls can be thinner than the diameter of the vertical filaments, with the lateral walls desirably acting as reinforcing members and/or "lateral buckling sheets" that can inhibit buckling, bending and/or other deformation of some portion of the vertical filaments in one or more desired manners. By incorporating lateral walls between the vertical filaments of the impact absorbing array, the individual vertical filaments can potentially be reduced in diameter and/or spaced further apart to create an impact absorbing array of laterally reinforced vertical filaments having an equivalent compressive response to that of a larger diameter and/or higher density array of unsupported vertical filaments. Moreover, in various embodiments the response of the array to lateral and/or torsional loading can be effectively "uncoupled" from its axial loading response to varying degrees, with the axial loading response primarily dependent upon the diameter, density and/or spacing of the vertical filaments in the array and the lateral/torsional loading response dependent upon the orientation, location and/or thicknesses of the lateral walls. The incorporation of lateral walls in the filament bed, which can desirably allow a commensurate reduction in the diameter of the filaments and/or an as increased filament spacing, can also greatly reduce the height at which the array will "bottom out" under compressive and/or axial loading, which can occur when the filament columns of the array have completely buckled and/or collapsed (i.e., the array is "fully compressed"), and the collapsed filament material and bent wall materials can fold and "pile up" to form a relatively solid layer of material resisting further compressive loading. As compared to an impact absorbing array of conventional columnar filament design, an improved impact absorbing array incorporating lateral walls can be reduced to half as tall (i.e., 50% of the offset) as the conventional array, yet provide the same or equivalent impact absorbing performance, including providing an equivalent total amount of layer deflection to that allowed by the conventional filament array. Specifically, where a traditional 1 inch tall filament column array may compress ½ inch before "bottoming out" (as the filament bed becomes fully compressed at 0.5 inches height), one exemplary embodiment of an improved filament array incorporating lateral wall support that is 0.7 inches tall can compress ½ inch before bottoming out (as the filament bed becomes fully compressed at 0.25 inches height). This arrangement provides for equivalent and/or improved axial array performance in a reduced profile or "offset" as compared to the traditional filament array design.

In various embodiments, an impact mitigation layer may comprise an array of modular assemblies. Each of the modular assemblies comprise different shapes and/or configurations and are positioned in different regions of the wearer's head. The different shapes or configurations may comprise such as rectangular, trapezoidal, round, triangular, square, square-round, and/or various other polygonal shapes. The different regions may comprise a frontal region, a sphenoid region, an ethmoid region, a parietal region, a right temporal region, a left temporal region, zygomatic region, buccal region, parotid region, an occipital region, and/or any combination thereof. At least one of the modular assemblies comprise a top material layer, a bottom material layer, a plurality of impact absorbing structures, a first inner layer and a second inner layer. The plurality of impact absorbing structures may comprise an LSF structure. The first inner layer and the second inner layer may comprise at least one foam layer, and a semi-rigid or rigid force distributing plate, the force distributing plate may include a polymer or metal, and/or at least one foam layer. The plurality of impact absorbing structures abuts a top surface of the first inner layer, the second inner layer abuts a bottom surface of the first inner layer. The top material layer and the bottom material layer may be the same material or different materials. At least a portion of the top material layer is coupled to a portion of the bottom material layer to create a pouch or a cavity. The cavity is sized and configured to receive the plurality of impact absorbing structures, a first inner layer and the second inner layer.

In various exemplary embodiments, an impact mitigation layer and/or the impact absorbing array of impact absorbing structures can incorporate an array of vertically oriented filaments incorporating lateral walls positioned in a "repeated polygon" structural element configuration, in which the lateral walls between filaments are primarily arranged to extend in repeating geometric patterns, such as triangles, squares, pentagons, hexagons, septagons, octagons, nonagons and/or decagons. In various other embodiments, the lateral walls may be arranged in one or more repeated geometric configurations, such as parallel or converging/diverging lines, crisscrossing figures, cross-hatches, plus signs, curved lines, asterisks, etc. In other embodiments, various combinations thereof, including non-repeated configurations and/or outlier connections in repeating arrays (i.e., including connections to filaments at the edge of an impact absorbing array or filament bed) can be utilized.

In one exemplary embodiment, an impact absorbing structure can be created wherein filaments in the vertically orientated filament array are connected by lateral walls positioned in a hexagonal polygonal configuration. In one exemplary embodiment, each filament can be connected by lateral walls to two adjacent filaments, with approximately a 75-135 degree separation angle between the two lateral walls connecting to each filament, leading to a surprisingly stable array configuration that can optionally obviate the need and/or desire for a second face sheet proximate to an upper end of the filaments of the array. The absence of a second face sheet on the array can greatly facilitate manufacture of the array using a variety of manufacturing methods, including low-cost and/or high throughout manufacture by injection molding, compression molding, casting, transfer molding, thermoforming, blow molding and/or vacuum forming. If desired, the first face sheet (i.e., the lower face sheet) can be pierced, holed, webbed, latticed and/or otherwise perforated, which may further reduce weight and/or material density of the face sheet (and weight/density of the overall array) as well as facilitate bending, curving, shaping and/or other flexibility of the array at room temperatures to accommodate curved, spherical and/or irregularly shaped regions such as the inside surface of a helmet and/or within flexible clothing. Such flexible arrays can also reduce manufacturing costs, as they can be manufactured in large quantities in a flat-plane configuration and then subsequently cut and bent or otherwise shaped into a wide variety of desired shapes.

In various embodiments, an improved impact absorbing structures can incorporate various "draft" or tapered features, which can facilitate removal of the filaments and wall structures from an injection mold or other manufacturing equipment as well as potentially improve the performance of the array. In one exemplary embodiment incorporating a hexagonal wall/filament configuration, the outer and inner walls of the hexagonal elements (and/or the outer and inner walls of the filaments) may be slightly canted and/or tapered to facilitate ejection of the array from the mold. In various embodiments, the walls and/or filaments will desirably include at least 0.5 degrees of draft on all vertical faces, which may more desirably be increased to 2 to 3 degrees or greater for various components. In various alternative embodiments, a tapered form for the wall/filament configuration (i.e., the polygonal elements) could include frustum forms for such elements (i.e., the portion of a solid—such as a cone or pyramid—that lies between one or two parallel planes cutting it), including circular, oval, triangular, square, pentagonal, hexagonal, septagonal and octagonal frustum forms.

In various embodiments, a helmet can include one or more generally concentric shells, with an improved impact absorbing structure positioned proximate to an inner surface of at least one shell. Where more than one shell is provided, the impact absorbing structure may be disposed between shells. If provided, an inner shell may be somewhat rigid to protect against skull fracture and the outer shell may also somewhat rigid to spread impact forces over a wider area of the impact absorbing structures positioned inside the outer shell, or the outer shell may be more flexible such that impact forces locally deform the outer shell to transmit forces to a smaller, more localized section of the impact absorbing structures positioned inside the outer shell.

In various embodiments, improved impact absorbing structures can be secured between generally concentric shells and desirably have sufficient strength to resist forces from mild collisions. However, the impact absorbing structures will also desirably undergo deformation (e.g., buckling) when subjected to forces from a sufficiently strong impact force. As a result of this deformation, the impact absorbing structures desirably attenuate and/or reduce the peak force transmitted from the outer shell to the inner shell, thereby desirably reducing forces on the wearer's skull and brain. The impact absorbing structures may also allow the outer shell to move independently of the inner shell in a variety of planes or directions. Thus, impact absorbing structures can greatly reduce the incidence and severity of concussions or other injuries as a result of sports and other activities. When the outer and inner shell move independently from one another, rotational acceleration, which contributes to concussions, may also be reduced.

The impact absorbing structures may include improved impact absorbing members mechanically secured between the outer shell and the inner shell, and/or between the outer shell and skull (i.e., head) of the wearer. In one example embodiment, an improved impact absorbing member can comprise an array of columns having one end secured to an outer shell, with laterally supporting walls extending between adjacent columns (which could optionally include an opposite end of the columns secured to the inner shell). In an alternative embodiment, an improved impact absorbing member can comprise an array of columns having one end secured to an inner shell, with laterally supporting walls extending between adjacent columns (which could optionally include an opposite end of the columns secured or not secured to the outer shell).

In various embodiments, an improved impact absorbing member includes a plurality of vertical filaments joined by connecting walls or sheets to form a branched, closed and/or open polygonal shape, or various combinations thereof in a single array. By varying the length, width, and attachment angles of the filaments, the axial impact performance can desirably be altered, while varying the length, width, and attachment angles of the walls or sheets can desirably alter the lateral and/or torsional impact performance of the array. In various embodiments, the helmet manufacturer can control the threshold amounts and/or directions of force that results in filament/wall deformation and ultimate helmet performance.

In various embodiments, the improved impact absorbing structure may be incorporated into a helmet system. The helmet system comprising an outer shell and an impact mitigation layer. The helmet system may further comprise an inner shell. The impact mitigation layer may be secured to the inner shell and/or the outer shell. The impact mitigation layer comprises a plurality of impact absorbing structures or a plurality of modular assemblies, the plurality of modular assemblies includes a plurality of impact absorbing structures. The impact absorbing structures may include laterally supported filament structures. When deformation occurs, the impact absorbing structure can contact an opposite shell, or an impact absorbing structure secured to the opposite shell. Once the impact absorbing structure makes contact, the overall stiffness of the helmet may increase, and the impact absorbing structure desirably deforms to absorb energy. For example, ends of intersecting arches, bristles, or jacks could be attached to the inner shell, the outer shell, or both. Furthermore, the impact mitigation layer may also be packed between the inner and outer shells without necessarily being secured to either the inner shell or outer shell—it may freely float between the inner and/or outer shell. The space between the impact absorbing structures may be filled with air or a cushioning material (e.g., foam) that further absorbs energy and prevents the impact absorbing structures from rattling if they are not secured to either shell. The packed arrangement of the impact absorbing structures can potentially simplify manufacturing without reducing the overall effectiveness of the helmet. If desired, such impact absorbing elements could be manufactured individually using a variety of techniques, including by extrusion, and then the elements could be subsequently assembled into arrays.

The helmet may include modular rows to facilitate manufacturing. A modular row can include an inner surface, an outer surface, and impact absorbing structures positioned between the inner and outer surfaces. A modular row can be relatively thin and/or flat compared to the assembled helmet, which may reduce the complexity of forming the impact absorbing structures between the modular row's inner and outer surfaces. For example, the modular rows may be formed by injection molding, extrusions, fusible core injection molding, or a lost wax process, techniques which may not be feasible for molding the entire impact absorbing structures in its final form. When assembled, the inner surfaces of the modular rows may form part of the inner shell, and the outer surfaces of the modular rows may form part of the outer shell. Alternatively, or additionally, the modular rows may be assembled between an innermost shell and an outermost shell that laterally secure the modular rows and radially contain them. Alternatively, or additionally, adjacent rows may be laterally secured to each other.

BRIEF DESCRIPTION OF THE DRAWINGS

FIGS. 31C-31E depict perspective views of the impact absorbing arrays of FIGS. 31A and 31B;

DETAILED DESCRIPTION

Modular Helmet

Figure 1:
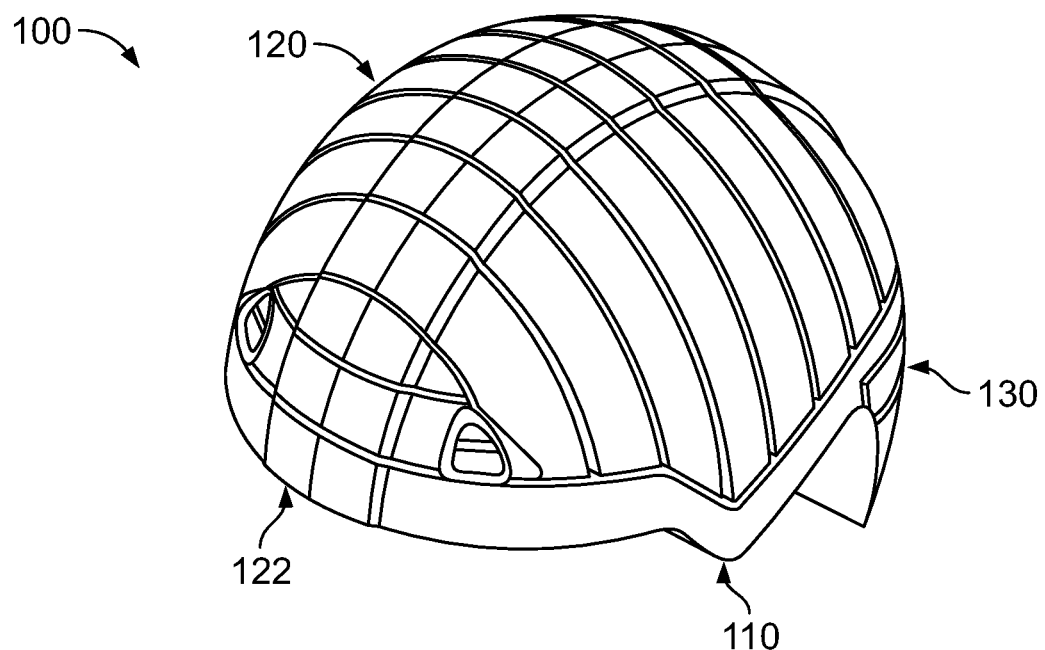
FIG. 1 is a perspective view of an assembly of impact absorbing structures formed from modular rows, in accordance with an embodiment.

FIG. 1 is a perspective view of an assembly 100 of impact absorbing structures formed from modular rows 110, 120, and 130, in accordance with an embodiment. In general, a modular row includes an inner surface, an outer surface, and impact absorbing structures between the inner surface and the outer surface. The modular row may further include a protective layer (e.g., foam) more and/or less rigid than the impact absorbing structures that encloses a remaining volume between the inner surface and outer surface after formation of the impact absorbing structures. When a helmet including the assembly 100 is worn, the inner surface is closer to the user's skull than the outer surface. Optionally, the modular row includes end surfaces connecting the short edges of the inner surface to the short edges of the outer surface. The inner surface, outer surface, and end surfaces form a slice with two parallel flat sides and an arc or bow shape on two other opposing sides. The end surfaces may be parallel to each other or angled relative to each other. The modular rows include one or more base modular rows 110, crown modular rows 120, and rear modular rows 130. The assembly 100 may include further shells, such as an innermost shell, an outermost shell, or both, that secure the modular rows relative to each other and capture the structure between the innermost and outermost shells when assembled for durability and impact resistance.

The base modular row 110 encircles the wearer's skull at approximately the same vertical level as the user's brow. The crown modular rows 120 are stacked horizontally on top of the base modular row 110 so that the long edges of the inner and outer surfaces form generally parallel vertical planes. The end surfaces of the crown modular rows 120 rest on a top plane of the base modular row. The outer surfaces of the crown modular rows 120 converge with the outer surface of the base modular row 110 to form a rounded outer shell. Likewise, the inner surfaces of the crown modular rows 120 converge with the inner surface of the base modular row 110 to form a rounded inner shell. Thus, the crown modular rows 120 and base modular row 110 form concentric inner and outer shells protecting the wearer's upper head. The outer surface of a crown modular row 120 may form a ridge 122 raised relative to the rest of the outer surface. The ridge 122 may improve distribution of impact forces or facilitate a connection between two halves (e.g., left and right halves) of an outermost layer of a helmet including assembly 100.

The rear modular rows 130 are stacked vertically under a rear portion of the base modular row 110 so that the long edges of the inner and outer surfaces form generally parallel horizontal planes. The inner surface of the topmost rear modular row 130 can form a seam with the inner surface of the base modular row 110, and the outer surface of the topmost rear modular row 130 can form a seam with the outer surface of the base modular row 110. Thus, the rear modular rows 130 and the rear portion of the base modular row 110 can form concentric inner and outer shells protecting the wearer's rear lower head and upper neck.

Modular Row

Figure 2:
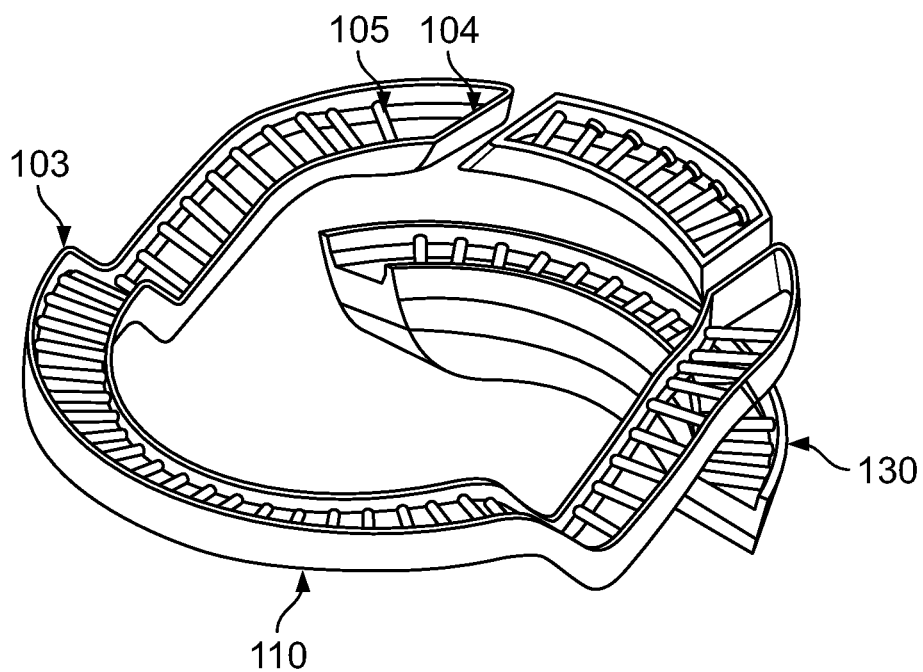
FIG. 2 is a perspective view of a modular row, in accordance with an embodiment.

FIG. 2 is a perspective view of a base modular row 110, in accordance with an embodiment. The base modular row 110 can includes two concentric surfaces 103 (e.g., an inner surface and an outer surface), end surfaces, and impact absorbing structures 105.

As illustrated, the impact absorbing structures 105 are columnar impact absorbing members which can be mechanically secured to both concentric surfaces 103. An end of the impact absorbing structure 105 may be mechanically secured to a concentric surface 103 as a result of integral formation, by a fastener, by an adhesive, by an interlocking end portion (e.g., a press fit), another technique, or a combination thereof. An end of the impact absorbing member can be secured perpendicularly to the local plane of the concentric surface 103 in order to maximize resistance to normal force. However, one or more of the impact absorbing members may be secured at another angle to modify the resistance to normal force or to improve resistance to torque due to friction between an object and the outermost surface of a helmet including assembly 100. The critical force that buckles the impact absorbing member may increase with the diameter of the impact absorbing member and may also decrease with the length of the impact absorbing member.

In various embodiments described herein, an impact absorbing member can have a circular cross section that desirably simplifies manufacture and can eliminate significant stress concentrations occurring along edges of the structure, but other cross-sectional shapes (e.g., squares, hexagons) may be employed to alter manufacturability and/or modify performance characteristics. Generally, an impact absorbing structure will be formed from a compliant, yet strong material such as an elastomeric substrate such as hard durometer plastic (e.g., polyurethane, silicone) and may include a core and/or outer surface of a softer material such as open or closed-cell foam (e.g., polyurethane, polystyrene) or may be in contact with a fluid or gas (e.g., air). After forming the impact absorbing members, a remaining volume between the concentric surfaces 103 (that is not filled by the impact absorbing members) may be filled with a softer material, such as foam or a fluid or gas (e.g., air).

The concentric surfaces 103 are desirably curved to form an overall rounded shape (e.g., spherical, ellipsoidal) when assembled into a helmet shape. The concentric surfaces 103 and end surfaces 104 may be formed from a material that has properties stiffer than the impact absorbing members such as hard plastic, foam, metal, or a combination thereof, or they may be formed from the same material as the impact absorbing members. To facilitate manufacturing of the base modular row 110, a living hinge technique may be used. The base modular row 110 may be manufactured as an initially flat modular row, where the long edges of the concentric surfaces 103 form two parallel planes. For example, the base modular row 110 could be formed by injection molding the concentric surfaces 103, the end surfaces 104, and the impact absorbing structures 105. The base modular row 110 may then be bent to form a living hinge. The living hinge may be created by injection molding a thin section of plastic between adjacent structures. The plastic can be injected into the mold such that the plastic fills the mold by crossing the hinge in a direction transverse to the axis of the hinge, thereby forming polymer strands perpendicular to the hinge, thereby creating a hinge that is robust to cracking or degradation.

Figure 3:
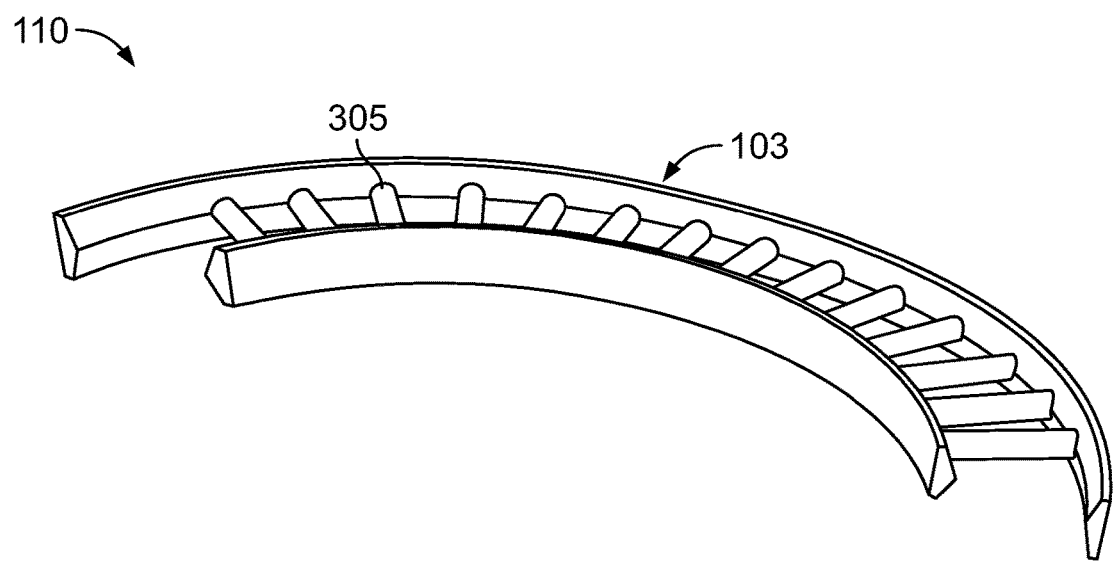
FIG. 3 is a perspective view of a modular row, in accordance with an embodiment.

FIG. 3 is a perspective view of a modular row 110, in accordance with an embodiment. The modular row 110 has a beveled edge with a cross-section that tapers from a base to an edge along which the impact absorbing members 305 are secured. For example, the modular row 110 has a pentagonal cross section where the impact absorbing members 305 are mechanically secured along an edge formed opposite the base of the pentagonal cross-section. The pentagon has two perpendicular sides extending away from the base of the pentagon to two sides that converge at an edge to which the impact absorbing members 305 are secured. As another example, the modular row 110 may have a triangular cross section (e.g., isosceles triangle), and the impact absorbing members 305 can be secured along an edge opposite the base of the triangular cross-section. Relative to a rectangular cross-section, the tapered cross-section can reduce the mass to secure the impact absorbing members 305 to the base of the modular row 110. The base of the modular row 110 may be generally wider than an impact absorbing member 305 in order to form a shell when assembled with adjacent modular rows 110. The general benefit of forming the base of the rows in this manner is to increase moldability of these structures.

Applications of Improved Impact Absorbing Structures

The improved impact absorbing structures may be utilized in a wide variety of personal protective equipment that require enhanced impact protection to minimize exposure to hazards that cause serious occupational and/or sport related injuries. Such personal protective equipment (PPEs) may include gloves, shoes, safety glasses, ear plugs, earmuffs, hats, helmets, full body suits, coveralls, shoulder pads, shin guards, chest protectors, protective cups, and/or any combination thereof. The improved impact absorbing structures may be customized and/or retrofitted into one or more commercially available protective clothing. Various specifications (e.g., mechanical characteristics, behavioral characteristics, the configuration profile, fit and/or aesthetics) can be provided to customize or semi-customize the impact absorbing structures. If desired, the original liner or material layers can be removed from the commercially available helmet, footwear, and/or protective equipment, and replaced with the customized impact absorbing structures described herein.

The improved impact absorbing structure may desirably elastically deform and/or elastically buckle in response to an impact. If elastic buckling occurs, at least a portion of the impact absorbing structure will buckle, where buckling is characterized by a sudden, sideways lateral deflection when subjected to compressive stress. The buckling may be further characterized by a single-mode buckling structure. The improved impact absorbing structures may comprise branched impact absorbing structures, arched impact absorbing structures, packed impact absorbing structures, conical impact absorbing structures, laterally supported arched impact absorbing structure, laterally supported filaments and/or any combination thereof. The elastic deformation allows the impact absorbing structure to return to its original configuration once the external force is removed. Accordingly, at least a portion of the impact absorbing structure comprises filaments. The filaments are thin, elongated columns that are configured to buckle because they contain a length greater than its width providing a high aspect ratio structure of 3:1 and greater. Filament diameters may comprise 1 mm to 20 mm, and the filament length may comprise 20 mm to 80 mm.

Although, the improved impact absorbing structures may be utilized for a wide variety of personal protective equipment, the present technology is generally related to protective helmet systems. The protective helmet systems may comprise an outer shell and an impact mitigation layer, the impact mitigation layer may be coupled to the outer shell. The impact mitigation layer may comprise a plurality of impact absorbing structures and/or a plurality of modular assemblies. Alternatively, the protective helmet systems may comprise an outer shell, and inner shell and an impact mitigation layer, the impact mitigation layer disposed between the outer shell and inner shell. The impact mitigation layer may comprise a plurality of impact absorbing structures and/or a plurality of modular assemblies. The plurality of impact absorbing structures and/or plurality of modular assemblies having an external surface and an internal surface, the internal surface and/or the external surface may be coupled to the inner shell, the outer shell, and/or the inner and outer shell. Also, the plurality of impact absorbing structures and/or modular assemblies having an external surface and an internal surface, the internal surface and/or the external surface may abut or contact or may be proximate to the inner shell, the outer shell, and/or the inner and outer shell.

Protective Helmet System

Figure 41A:
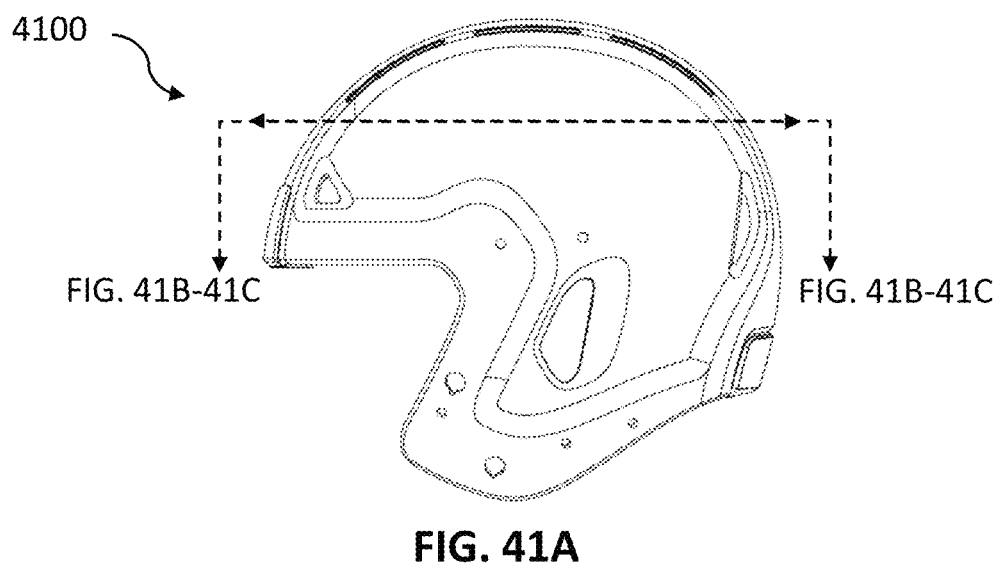
FIGS. 41A-41C depicts side views and cross-sectional views of protective helmets with an impact mitigation layer comprising a plurality of impact mitigation structures.
Figure 41B:
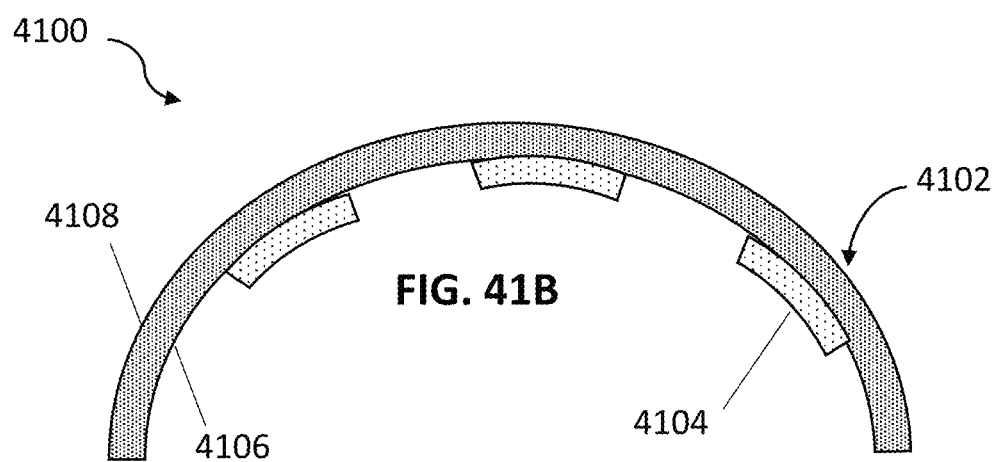
Figure 41C:
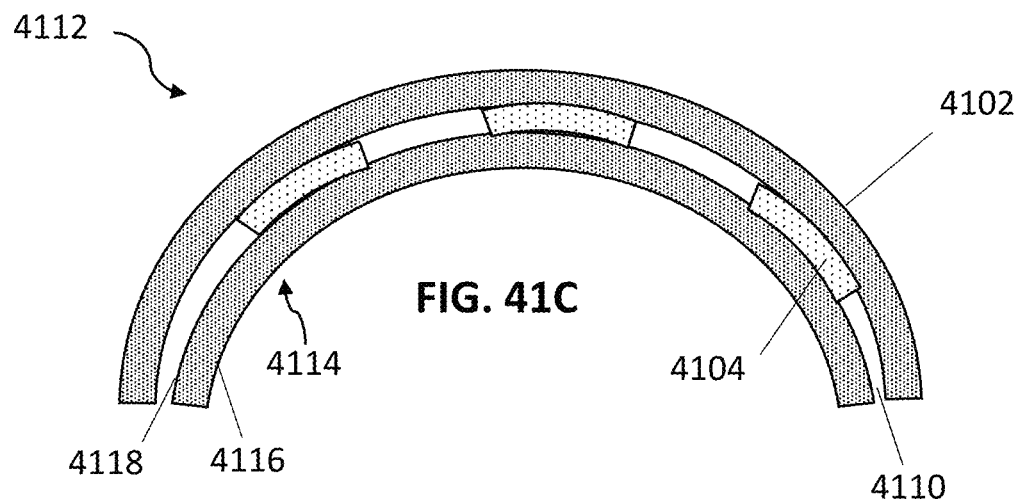

FIGS. 41A-41C depict a side view and cross-sectional views of one embodiment of protective helmet system. 4100. The protective helmet system 4100 may comprise an outer shell 4102 and an impact mitigation layer 4110 as shown in FIG. 41B. The outer shell 4102 may comprise an external surface 4108 and an internal surface 4106. In some embodiments, the outer shell 4102 and/or inner shell 4114 may be composed of different configurations and materials. In one embodiment, the outer shell 4102 may be a single, continuous shell and/or provided in two or more components. The outer shell 4102 may be manufactured from a deformable, relatively flexible polymer that allows the outer shell 4102 to be pliable enough to locally deform when subject to an incident force. Alternatively, the outer shell 4102 may comprise a relatively or rigid polymer. In other embodiments, the inner shell 4114 can be relatively stiff or rigid thereby preventing projectiles or intense impacts from fracturing the skull or creating hematomas. In some embodiments, the inner shell 4114 can be at least five times to one-hundred times more rigid than the outer shell 4102 and/or impact mitigation layer 4110. The inner shell 4114 may comprise an internal surface 4116 and an external surface 4118. Additional comfort padding (not shown) may be coupled to an internal surface 4116 of the inner shell 4114.

The impact mitigation layer 4110 may be coupled or mated to the internal surface 4106 of the outer shell 4102. The impact mitigation layer 4110 may comprise a plurality of impact absorbing structures and/or a plurality of impact mitigation pads 4104. The impact absorbing pads 4104 may comprise an impact absorbing assembly and an enclosure. The impact absorbing assembly disposed within the enclosure. The impact absorbing assembly comprising an impact absorbing array, and at least one foam layer. The impact absorbing assembly may further comprise a plate, the plate may be disposed between the impact absorbing array and the at least one foam layer. The impact absorbing array may comprise a plurality of impact absorbing structures coupled to a facesheet. The plurality of impact absorbing structures may comprise laterally supported filament (LSF) impact absorbing structures, branched impact absorbing structure, intersecting impact absorbing structure, arched impact absorbing structure, and additional impact absorbing structures, and/or any combination thereof.

Alternatively, the protective helmet system 4112 may comprise an outer shell 4102, an impact mitigation layer 4110, and an inner shell 4114 as shown in FIG. 41C. The outer shell 4102 may comprise an external surface 4108 and an internal surface 4106. The impact mitigation layer 4110 may be disposed between the outer shell 4102 and the inner shell 4114. The impact mitigation layer 4110 may comprise a plurality of impact absorbing structures and/or a plurality of impact mitigation pads 4104. The impact absorbing pads 4104 may comprise an impact absorbing assembly and an enclosure. The impact absorbing assembly disposed within the enclosure. The impact absorbing assembly comprising an impact absorbing array, and at least one foam layer. The impact absorbing assembly may further comprise a plate, the plate may be disposed between the impact absorbing army and the at least one foam layer. The impact absorbing array may comprise a plurality of impact absorbing structures coupled to a facesheet. The plurality of impact absorbing structures may comprise laterally supported filament (LSF) impact absorbing structures, branched impact absorbing structure, intersecting impact absorbing structure, arched impact absorbing structure, and additional impact absorbing structures, and/or any combination thereof.

The plurality of impact absorbing structures and/or plurality of impact mitigation pads 4104 may span or substantially span between the internal surface 4106 of the outer shell 4102 to the external surface 4118 of the inner shell 4114. The plurality of impact absorbing structures and/or plurality of impact absorbing pads 4104 having an external surface and an internal surface, the internal surface and/or the external surface may be coupled to the inner shell, the outer shell, and/or the inner and outer shell. Also, the plurality of impact absorbing structures and/or impact absorbing pads 4104 having an external surface and an internal surface, the internal surface and/or the external surface may abut or contact or may be proximate to the external surface 4118 of the inner shell 4114, to the internal surface 4106 of the outer shell, and/or be proximate to both the external surface 4118 of the inner shell 4114, to the internal surface 4106 of the outer shell. The plurality of impact absorbing structures and/or plurality of impact mitigation pads may be positioned in different regions throughout the protective helmet. The different regions may comprise a frontal region, a sphenoid region, an ethmoid region, a parietal region, a right temporal region, a left temporal region, zygomatic region, buccal region, parotid region, an occipital region, and/or any combination thereof. The improved impact absorbing structures may comprise branched impact absorbing structures, arched impact absorbing structures, packed impact absorbing structures, conical impact absorbing structures, laterally supported arched impact absorbing structure, laterally supported filaments and/or any combination thereof.

Impact Absorbing/Mitigating Structures—Branched Impact Absorbing Members

Figure 4:
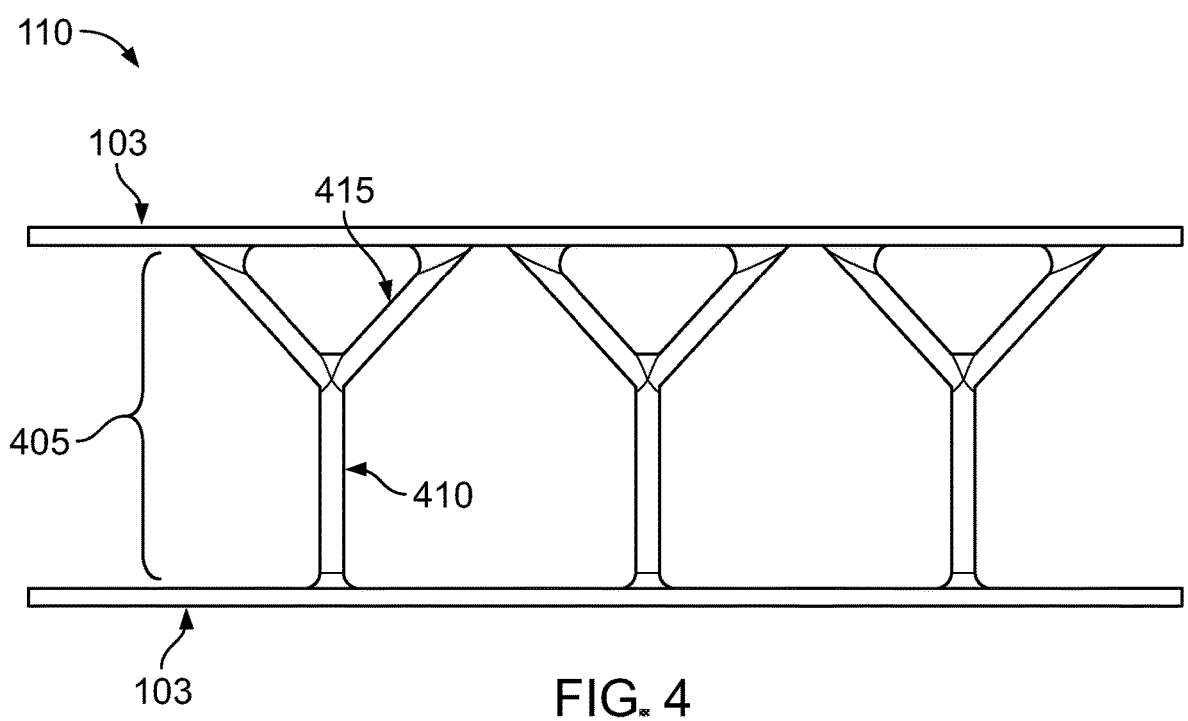
FIG. 4 is a plan view of an impact absorbing member having a branched shape, in accordance with an embodiment.

FIG. 4 is a plan view of an impact absorbing structure or member 405 having a branched shape, in accordance with an embodiment. The impact absorbing member 405 includes a base portion 410 and two branched portions 415. The base portion 410 and the branched portions 415 are joined at one end. Opposite ends of the branched portions 415 can be secured to one of the concentric surfaces 103, and the opposite end of the base portion 410 can be secured to an opposite one of the concentric surfaces. Varying the angle between the branched portions 415 can modify the critical force to buckle the impact absorbing member 405. For example, increasing the angle between the branched portions 415 may decrease the critical force. Generally, the angle between the branched portions 415 is between 30° and 120°. The impact absorbing structure 405 may include additional branched portions 415. For example, impact absorbing structure 405 could include three branched portions 415, one of which may be parallel to the base portion 410.

Alternatively, the impact absorbing structure 405 having a base portion 410, and at least branched portions 415. The base portion 410 may comprise a first end and a second end, and each of the at least two branched portions 415 having a first end and a second end. The at least two branched portions 415 may be have a first end and a second end, the second ends of the at least two branched portions 415 is coupled axisymmetrically or asymmetrically to a first end of the base portion 410, the second end of the base portion 410 is coupled to an of the concentric surfaces 103. The at least two branched portions 415 extend longitudinally away from the first end of the base portion 410 at an angle between 30 degrees and 120 degrees. The first ends of the at least two branched portions 415 may contact or couple the opposite concentric surface 103.

The base portion 410 and the at least two branched portions 415 may have an elongated, uniform, and/or constant cross-sectional shape and/or length. The cross-sectional shape may comprise a circle, square, rectangle, pentagon, hexagon, heptagon, octagon, nonagon, decagon, and/or any combination thereof. Alternatively, the base portion 410 and the at least two branched portions 415 may have a substantially elongated uniform, and/or substantially constant cross-sectional shape, and length. The cross-sectional shape may comprise a circle, square, rectangle, pentagon, hexagon, heptagon, octagon, nonagon, decagon, and/or any combination thereof. The term "substantially" is intended to refer that at least 90 percent of the base portion 410 and the at least two branched portions 415 are uniform and/or constant cross-sectional shape and length. Accordingly, the base portion 410, and at least two branched portions 415 may comprise filaments.

Impact Absorbing/Mitigating Structures Including Intersecting Arches

Figure 5A:
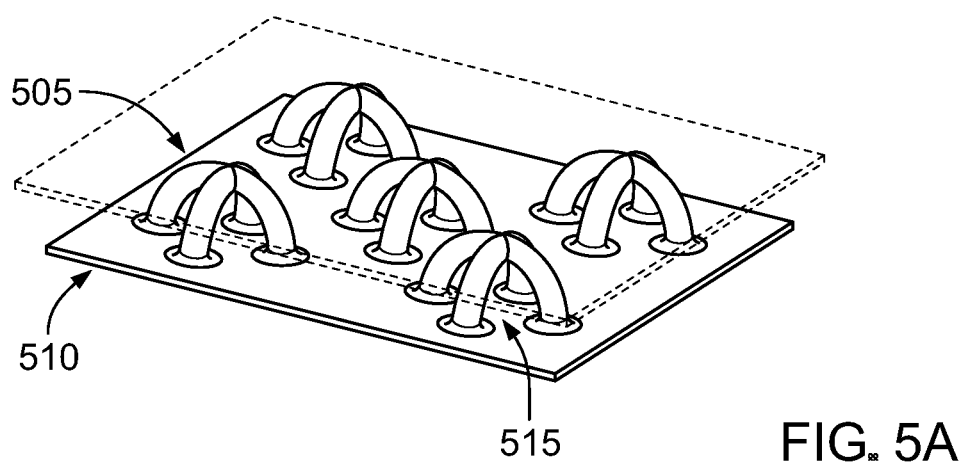
FIG. 5A is a perspective view of impact absorbing structures including intersecting arches, in accordance with an embodiment.

FIG. 5A is a perspective view of impact absorbing structures 505 including intersecting arches, in accordance with an embodiment. In the illustrated example, an impact absorbing structure 505 includes two arches which each form half a circle. The portions intersect perpendicular to each other at an apex of the impact absorbing structure 505. However, other variations are possible, such as an impact absorbing structure 505 including three arches intersecting at angles of about 60°, four arches intersecting at angles of about 45°, or a single arch. In general, having two or more intersecting arches causes the impact absorbing structure 505 to have a more uniform rigidity and yield stress from torques having different lateral directions relative to a single arch. As another example, the impact absorbing structure 505 may form a dome having a uniform resistance to torques from different lateral directions, but use of distinct intersecting arches may decrease the weight of the impact absorbing structure 505. Compared to a dome, the gaps between the arches in the impact absorbing structure 505 desirably facilitate injection of foam or another less rigid material inside of the impact absorbing structure 505 to further dissipate energy.

The ends of the arches are desirably mechanically secured to the surface 510, which may be a concentric surface 103 of a modular row or an inner or outer shell. The surface 510 may form an indentation 515 having a cross-sectional shape corresponding to (and aligned with) a projection of the impact absorbing structure 505 onto the surface 510. The indentation extends at least partway through the surface 510. For example, the indentation 515 has a cross-section of a cross to match the perpendicularly intersecting arches of the impact absorbing structure 505 secured above the indentation. When the impact absorbing structure 505 deforms as a result of a compressive force, the impact absorbing structure 505 may deflect into the indentation 515. As a result, the impact absorbing member 505 has a greater range of motion, resulting in absorption of more energy (from deformation) and slower deceleration. Without the indentation 515, a compressive force could cause the impact absorbing structure 505 to directly contact the surface 510, resulting in a sudden increase in stiffness and/or "bottoming out" of the structure, which could limit further gradual deceleration of the impact absorbing structure 505.

Figure 5B:
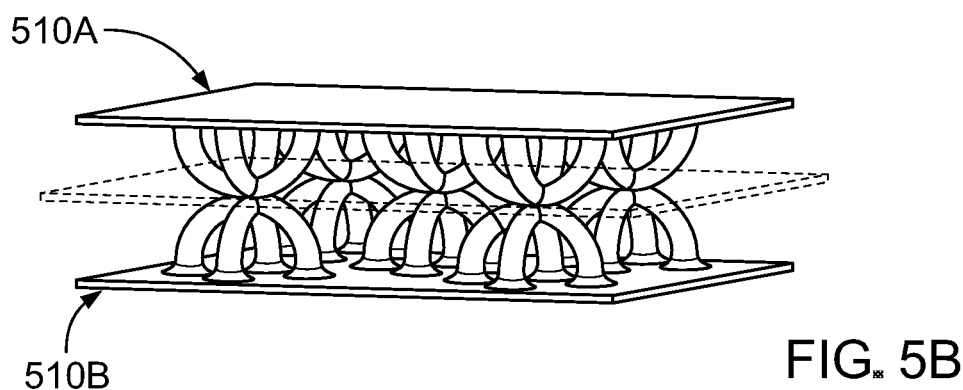
FIG. 5B is a perspective view of an opposing arrangement of the impact absorbing structures of FIG. 5A, in accordance with an embodiment.

FIG. 5B is a perspective view of an opposing arrangement of the impact absorbing 505 structures of FIG. 5A, in accordance with an embodiment. An upper set of impact absorbing structures 505 is secured to an outer surface 510A, and a lower set of impact absorbing structures 515 is secured to an inner surface 510B. The impact absorbing structures 505 may be aligned to horizontally overlap apexes of opposing impact absorbing structures 505, or the impact absorbing structures 505 may be aligned to horizontally offset apexes of impact absorbing structures 505 on the outer surface 510A and inner surface 510B. In the vertically aligned arrangement, the distance between the inner and outer surfaces can be increased, which can provide more room for deformation of the impact absorbing structures 505 to absorb energy from a collision. In the offset arrangement, the distance between the inner and outer surfaces 510 can be reduced, and the area of contact between oppositely aligned impact absorbing structures 505 increased. Although the outer surface 510A and the inner surface 510B are illustrated as being planar, they may be curved, as in a modular row or a concentric shell arrangement. In such a case, the outer surface 510A may include more impact absorbing structures 505 than the inner surface 510B, or the impact absorbing structures 505 of the outer surface 510A may be horizontally enlarged relative to those on the inner surface 510B.

Figure 5C:
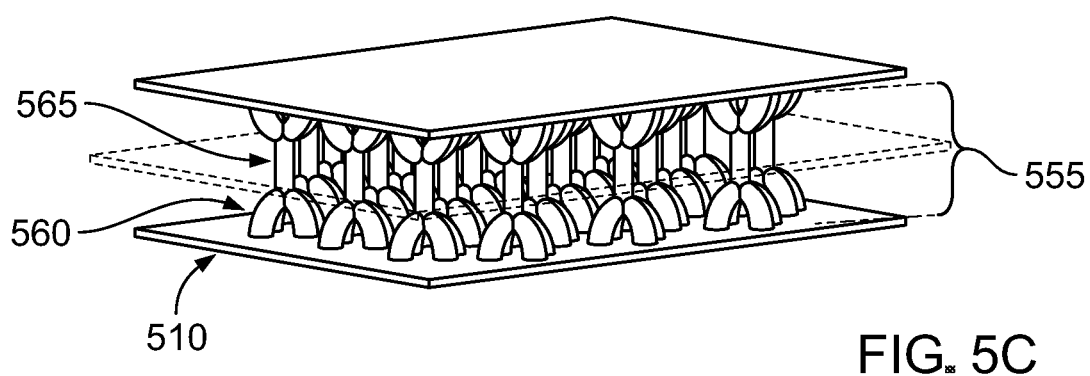
FIG. 5C is a perspective view of impact absorbing structures including intersecting arches connected by a column, in accordance with an embodiment.

FIG. 5C is a perspective view of impact absorbing structures 555 including intersecting arches 560 connected by a column 565, in accordance with an embodiment. The intersecting arches 560 may be intersecting arches, such as the impact absorbing structures 505. The column 565 may be similar to the impact absorbing members 105 and 305. As illustrated, the opposite ends of a column 565 may be perpendicularly connected (or connected at other angles and/or alignments) to two vertically aligned intersecting arches 560. Because the columns 565 are subject to different types of deformation relative to the intersecting arches (e.g., buckling and deflection), the impact absorbing structure 555 may have two or more critical forces that result in deformation of different components of the impact absorbing structure 555. In this way, the impact absorbing structure 555 may dissipate energy from a collision in multiple stages through multiple mechanisms. In other embodiments, the impact absorbing structures 505 and 555 may include any of the impact absorbing structures described with respect to FIGS. 6A through 8C.

Impact Absorbing/Mitigating Structures—Packed Impact Absorbing Structures

Figure 6A:
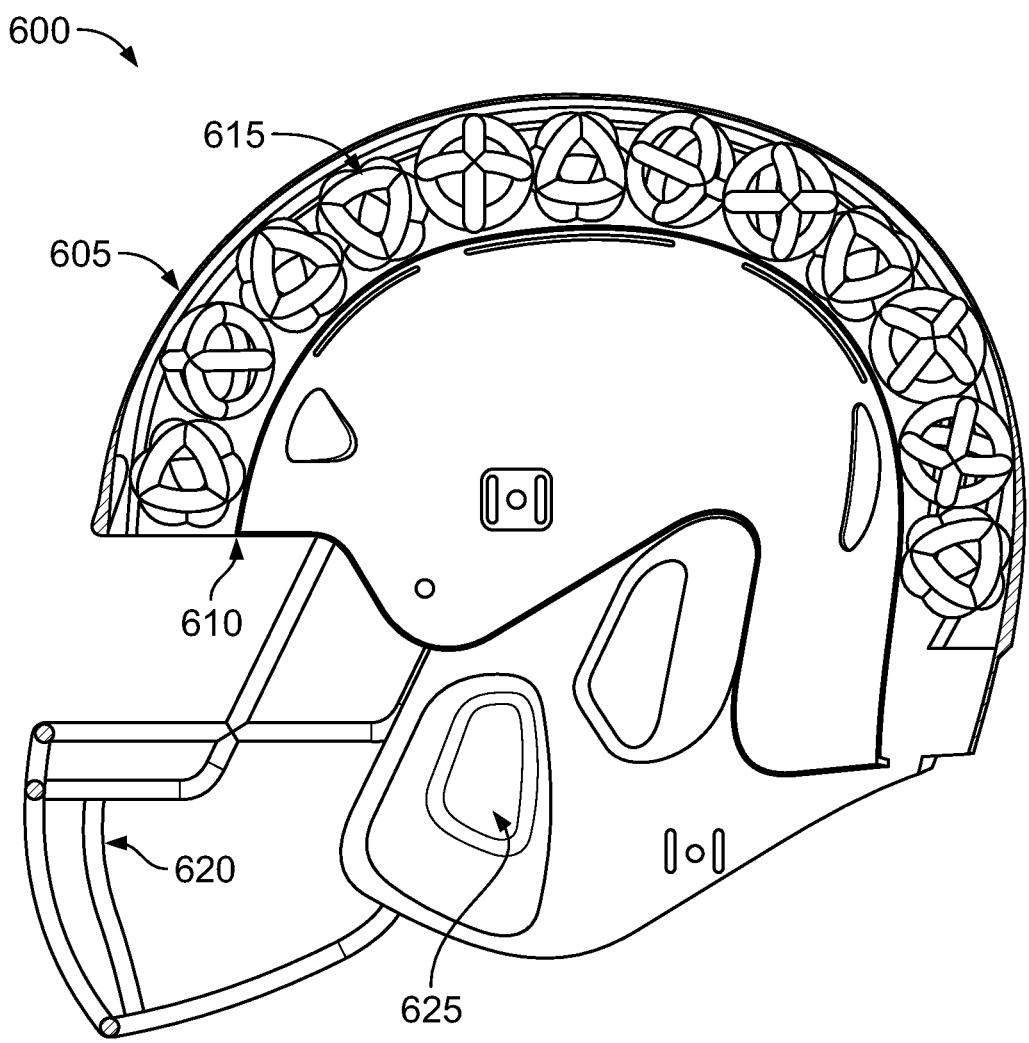
FIG. 6A is a cross-sectional view of a helmet including impact absorbing structures having a spherical wireframe shape, in accordance with an embodiment.
Figure 6B:
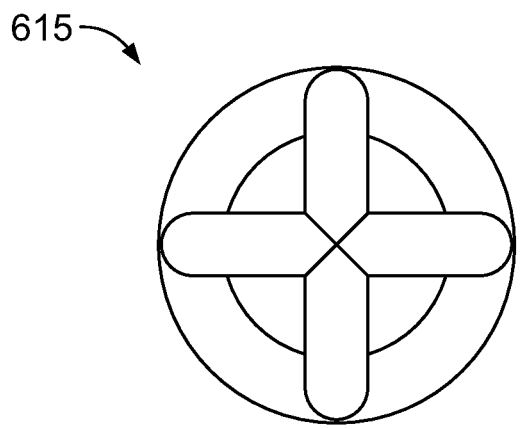
FIG. 6B is a plan view of an impact absorbing structure included in the helmet of FIG. 6A, in accordance with an embodiment.
Figure 6C:
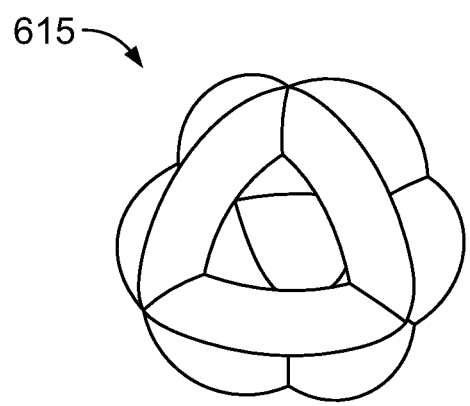
FIG. 6C is a perspective view of an impact absorbing structure included in the helmet of FIG. 6A, in accordance with an embodiment.

FIG. 6A is a cross-sectional view of a helmet 600 including impact absorbing structures 615 having a spherical wireframe shape, in accordance with another embodiment. FIG. 6B is a plan view of the impact absorbing structural element 615 included in the helmet 600, in accordance with an embodiment. FIG. 6C is another perspective view of the impact absorbing structure 615 included in the helmet 600, in accordance with an embodiment.

The helmet 600 includes an outer shell 605, an inner shell 610, and impact absorbing structures 615 disposed between the outer shell 605 and the inner shell 610. The impact absorbing structures 615 can be formed from perpendicularly interlocked rings that together form a spherical wireframe shape. Although the illustrated impact absorbing structures 615 include three mutually orthogonal rings, other structures are possible. For example, the number of longitudinal rings may be increased to improve the uniformity of the impact absorbing structure's response to forces from different directions. However, increasing the number of rings may also increase the weight of the impact absorbing structure 615 and/or may decrease the spacing between the rings, which might hinder filling an internal volume of the impact absorbing structure 615 with a less rigid material such as foam.

The helmet 600 further includes a facemask 620, which desirably protects a face of the wearer while allowing visibility, and vent holes 625, which desirably improve user comfort by enabling air circulation proximate to the user's skin. For example, the helmet 600 may incorporate vent holes 625 near the user's ears to improve propagation of sound waves. The vent holes 625 may further serve to reduce moisture and sweat accumulating in the helmet 600. In some embodiments, the helmet may include a screen or mesh (e.g., using polymeric and/or metal wire) placed over one or both vent holes 625 to desirably reduce penetration by particles (e.g., soil, sand, snow) and to prevent penetration by blunt objects during collisions.

Figure 7A:
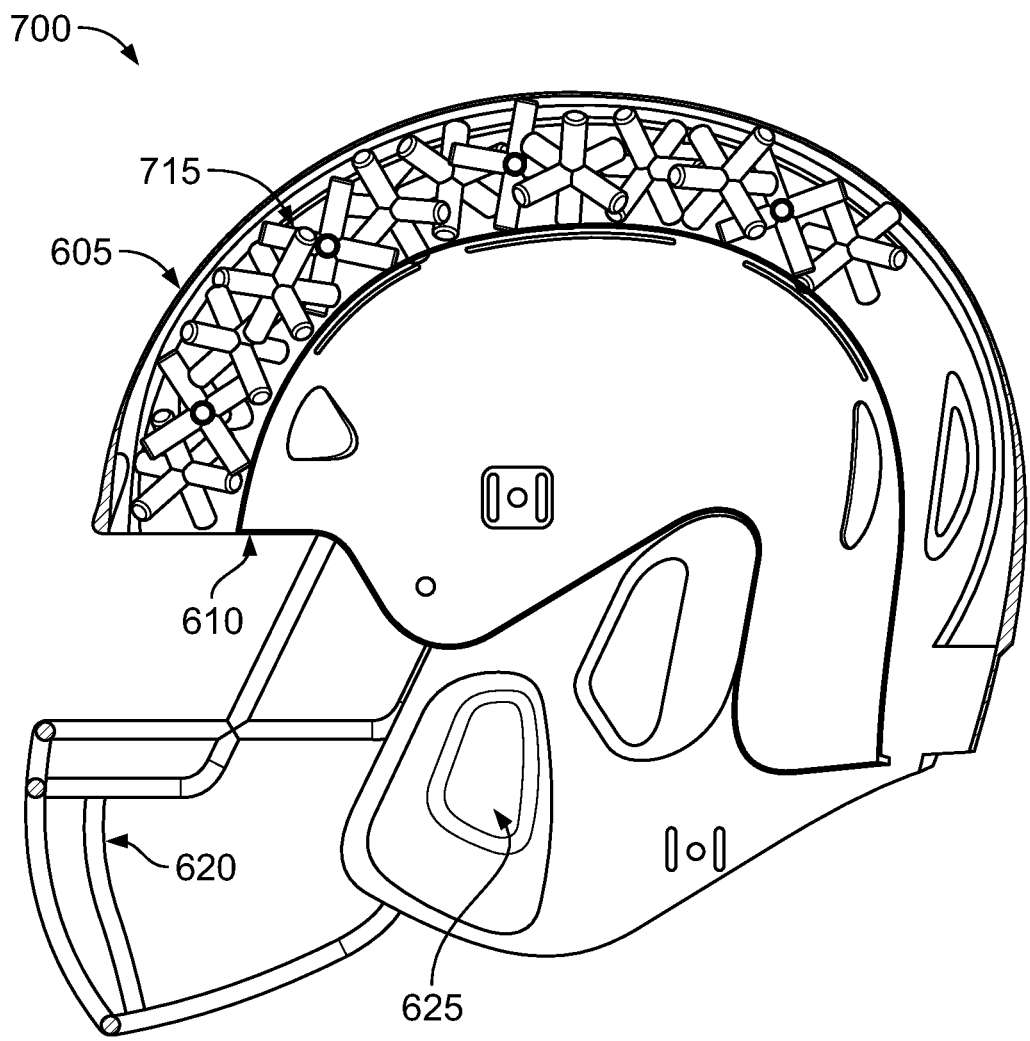
FIG. 7A is a cross-sectional view of a helmet including impact absorbing structures having a jack shape, in accordance with an embodiment.
Figure 7B:
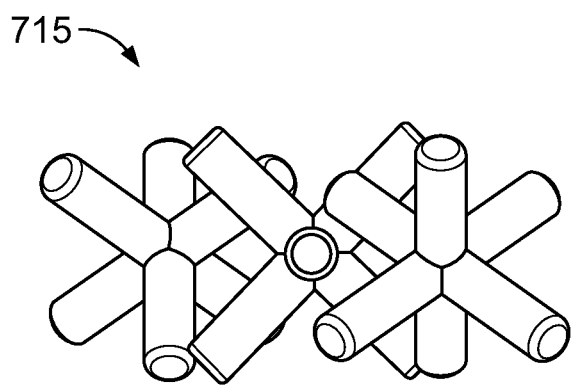
FIG. 7B is a plan view of an impact absorbing structure included in the helmet of FIG. 7A, in accordance with an embodiment.
Figure 7C:
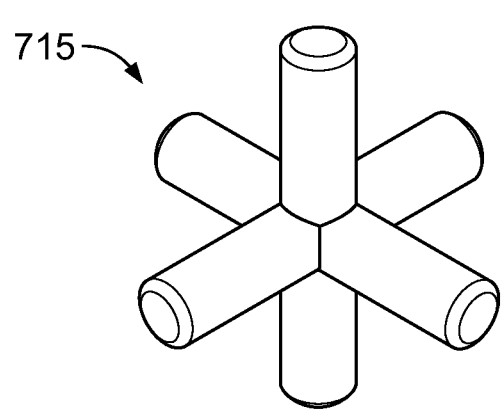
FIG. 7C is a perspective view of an impact absorbing structure included in the helmet of FIG. 7A, in accordance with an embodiment.

FIG. 7A is a cross-sectional view of a helmet 700 including impact absorbing structures 715 having a jack-like shape, in accordance with another embodiment. FIG. 7B is a plan view of the impact absorbing structure 715 included in the helmet 700, and FIG. 7C is a perspective view of the impact absorbing structure 715 included in the helmet 700, in accordance with this embodiment.

As disclosed, the helmet 700 can include an outer shell 605, an inner shell 610, impact absorbing structures 715 disposed between the outer shell 605 and the inner shell 610, a face mask 620, and vent holes 625. As illustrated, the impact absorbing structure 715 can have a jack-like or "caltrop" shape formed by three orthogonally intersecting bars, which connect a central point to faces of an imaginary cube enclosing the impact absorbing structure 715. Alternatively, the impact absorbing structures may include additional bars intersecting at a central point, such as bars that connect the central point to faces of an enclosing tetrahedron or octahedron. Compared to impact absorbing structures with a column shape, the impact absorbing structures 715 may have increased resistance to forces from multiple directions, particularly torques due to friction in a collision.

The impact absorbing structures 615 or 715 may be mechanically secured to the outer shell 605, the inner shell 610, or both. However, mechanically securing the impact absorbing structures 615 or 715 increase manufacturing complexity and may be obviated by filling the volume between the outer shell 605 and inner shell 610 with another material. This other material may secure the impact absorbing structures 615 relative to each other and the inner and outer shells, which prevents bothersome rattling.

Figure 8A:
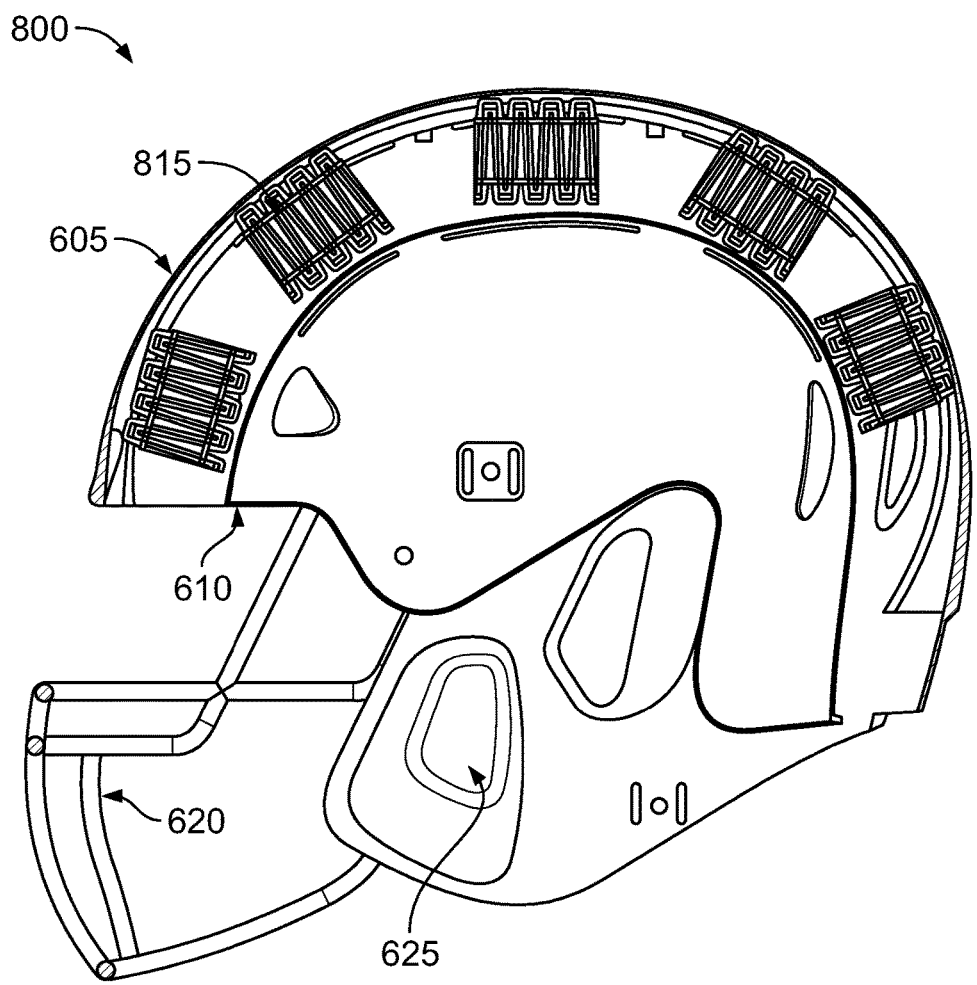
FIG. 8A is a cross-sectional view of a helmet including impact absorbing structures having a bristle shape, in accordance with an embodiment.
Figure 8B:
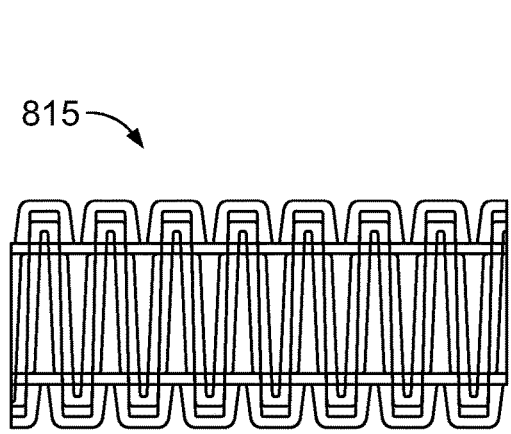
FIG. 8B is a cross-sectional view of an impact absorbing structure included in the helmet of FIG. 8A, in accordance with an embodiment.
Figure 8C:
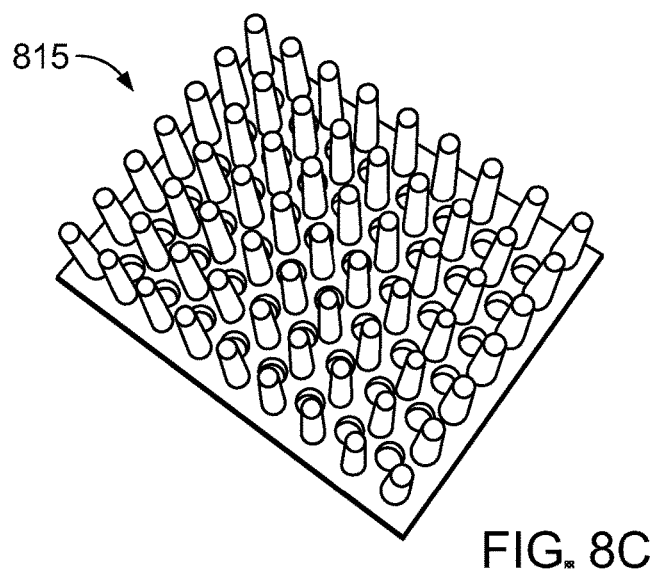
FIG. 8C is a perspective view of an impact absorbing structure included in the helmet of FIG. 8A, in accordance with an embodiment.

FIG. 8A is a cross-sectional view of a helmet 800 including impact absorbing structures 815 having a bristle shape, in accordance with an embodiment. FIG. 8B is a plan view of the impact absorbing structure 815 included in the helmet 800, in accordance with an embodiment. FIG. 8C is a perspective view of the impact absorbing structure 815 included in the helmet 800, in accordance with an embodiment.

The helmet 800 includes an outer shell 605, an inner shell 610, impact absorbing structures 815 disposed between the outer shell 605 and the inner shell 610, a face mask 620, and vent holes 625. As illustrated, an impact absorbing structure 815 has a bristle shape with multiple bristles arranged perpendicular to outer shell 605, inner shell 610, or both. The impact absorbing structure 815 further includes holes having a same diameter as the bristles. As illustrated, the holes and bristles of the impact absorbing structure are arranged in an array structure with the bristles and holes alternating across rows and columns of the array. The impact absorbing structure may include a base pad secured to the shell 605 or 610. The base pad secures the bristles and forms the holes. Alternatively, the shells 605 and 610 serve as base structures that secure the bristles and forms the holes. Impact absorbing structures 815 on the shells 605 and 610 are aligned oppositely and may be offset so that bristles of an upper impact absorbing structure 815 are aligned with holes of the lower impact absorbing structure 815, and vice versa. In this way, the ends of bristles may be laterally secured when the opposing impact absorbing structures 815 are assembled between the outer shell 605 and the inner shell 610.

In some embodiments, the impact absorbing structures 615, 715, or 815 are secured in a ridge that protrudes from an outer shell of the helmet 100 (e.g., like a mohawk). In this way, the ridge may absorb energy from a collision before the force is transmitted to the outer shell of the helmet 100.

Additional Impact Absorbing Structures

Figure 9:
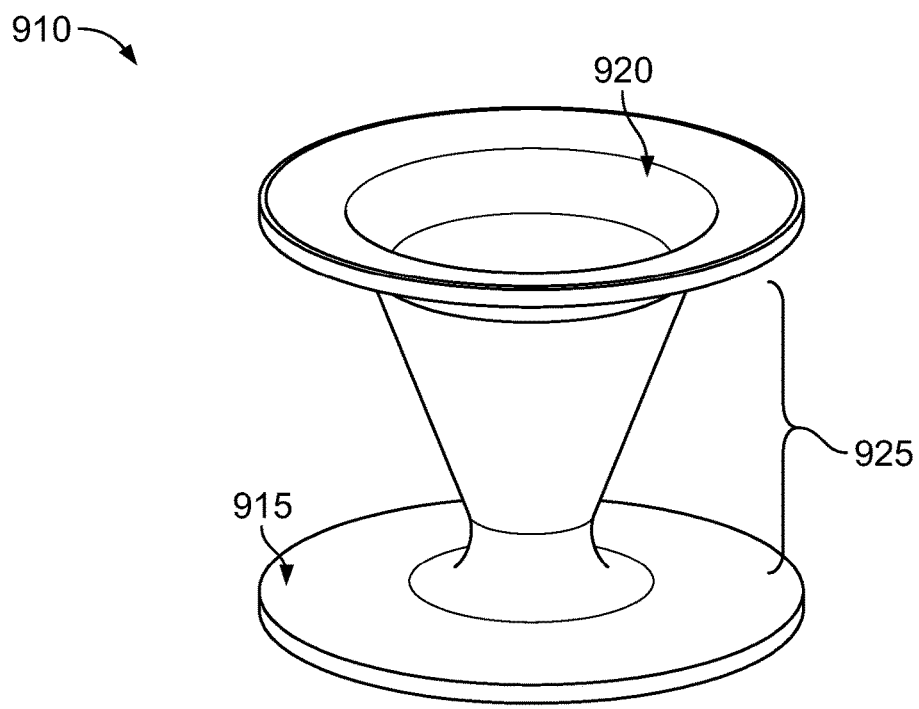
FIG. 9 is a perspective view of an embodiment of an impact absorbing structure having a conical structure, in accordance with an embodiment.

FIG. 9 is a perspective view of another alternative embodiment of an impact absorbing structure 910 having a conical structure. In the example shown by FIG. 9, the impact absorbing structure 910 has a circular base 915 coupled to a circular top 920 via a conical structure 925. As shown in FIG. 9, a portion of the conical structure 925 coupled to the circular base 915 has a smaller diameter than an additional portion of the conical structure 925 coupled to the circular top 920 of the impact absorbing structure 910. In various embodiments, the interior of the conical structure 925 is hollow. Alternatively, a less rigid material, such as foam, may be injected into the interior of the conical structure 925 to further dissipate energy from an impact. In various embodiments, the circular base 915 is configured to be coupled to an inner shell of a helmet, while the circular top 920 is configured to be coupled to an outer shell of a helmet, such as the helmet described above in conjunction with FIGS. 6A, 7A, and 8A Alternatively, the circular base 915 is configured to be coupled to an outer shell of a helmet, while the circular top 920 is configured to be coupled to an inner shell of a helmet, such as the helmet described above in conjunction with FIGS. 6A, 7A, and 8A.

Figure 10:
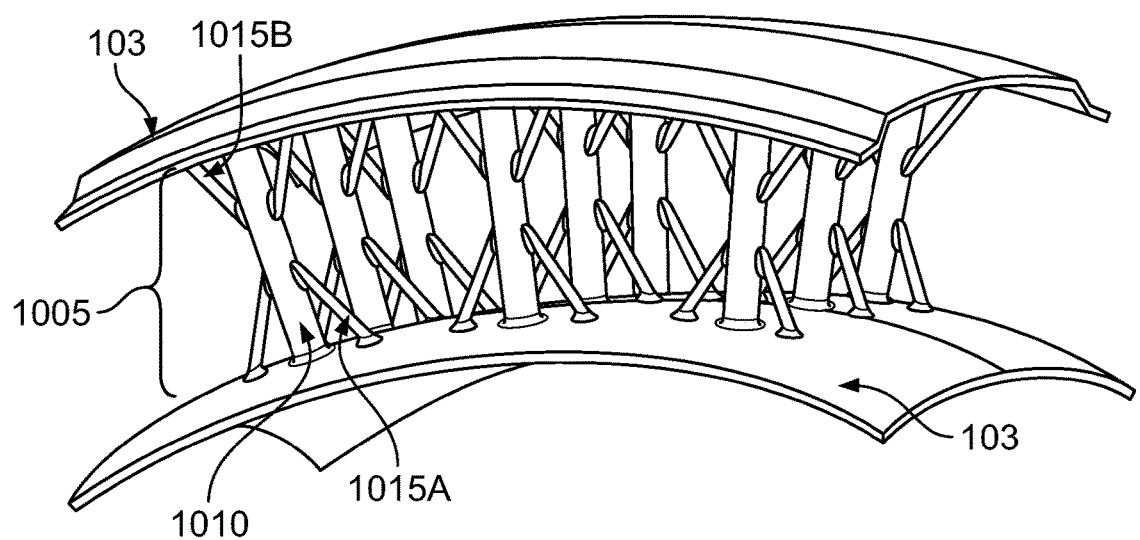
FIG. 10 is a perspective view of an embodiment of an impact absorbing structure having a base portion and angled support portions, in accordance with an embodiment.

FIG. 10 is a perspective view of another alternative embodiment of an impact absorbing structure 1005 having a base portion 1010 and angled support portions 1015A, 1015B (also referred to individually and collectively using reference number 1015). The base portion 1010 is coupled to each of the concentric surfaces 103 (similar to the embodiments described in conjunction with FIG. 2), while a support portion 1015A has an end coupled to the base portion 1010 and another end coupled to one or the concentric surfaces 103. In the example shown by FIG. 10, each base portion 1010 has two support portions 1015A coupled to the base portion 1010 and to one of the concentric surfaces 103 and also has two additional support portions 1015B coupled to the base portion 1010 and to the other concentric surface 103. However, in other embodiments, the base portion 1010 may have any suitable number of support portions 1015 coupled to the base portion 1010 and to one of the concentric surfaces 103. In some embodiments, the base portion can include different numbers of support portions 1015 coupled to the base portion and to a concentric surface 103 and/or coupled to the other concentric surface 103.

As depicted in this embodiment, a support portion 1015 can be coupled to the base portion 1010 at an angle and can be coupled to a concentric surface 103 at an additional angle. In various embodiments, the angle equals the additional angle. Varying the angle at which the support portion 1015 is coupled to the base portion 1010 or the additional angle at which the support portion 1015 is coupled to the concentric surface 103 can modify the structure's response to an incident force and/or critical force that, when applied, may cause the impact absorbing member 1005 to buckle.

Figure 11:
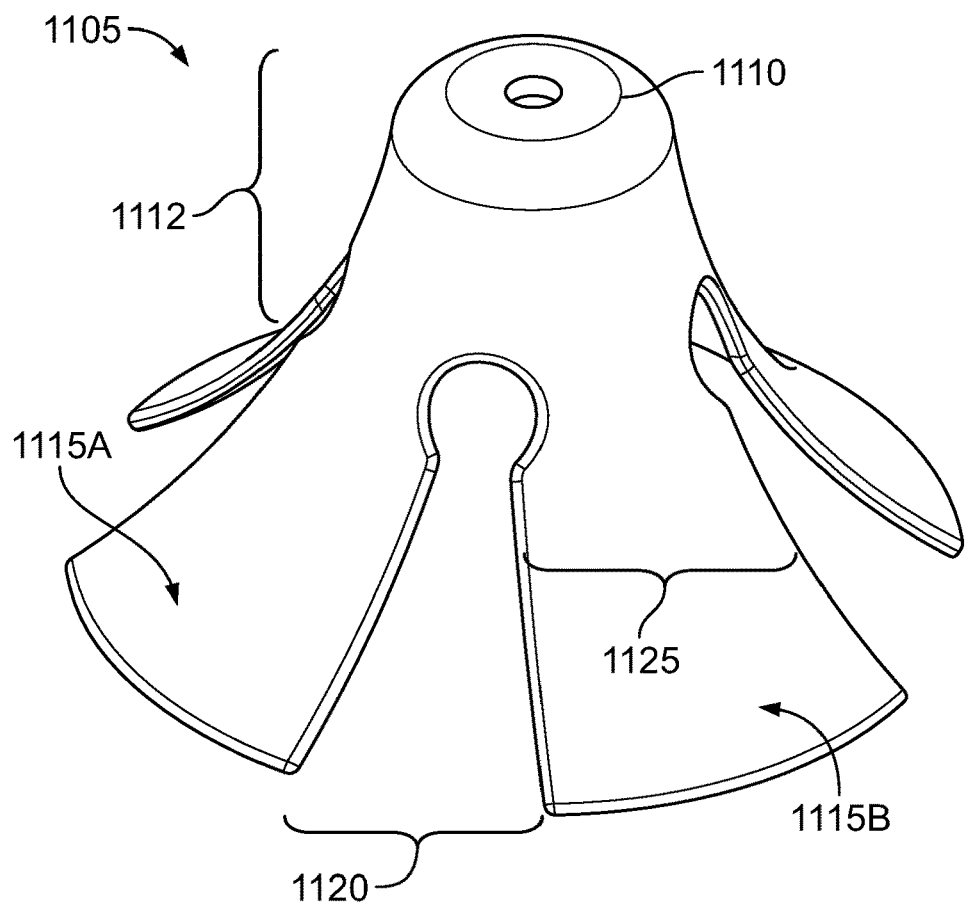
FIG. 11 is a perspective view of an embodiment of an impact absorbing structure having a cylindrical member coupled to multiple planar surfaces, in accordance with an embodiment.

FIG. 11 is a perspective view of another embodiment of an impact absorbing structure 1105 having a cylindrical member coupled to multiple planar surfaces 1115A, 1115B (also referred to individually and collectively using reference number 1115). The cylindrical member has a vertical portion 1112 having a height and having a circular base 1110 at one end. At an opposite end of the vertical portion 1112 from the circular base 110, multiple planar surfaces 1115A, 1115B are coupled to the vertical portion 1112. Different planar surfaces 1115 are separated by a distance 1120. For example, FIG. 11 shows planar surface 1115A separated from planar surface 1115B by the distance 1120. In various embodiments, each planar surface 1115 is separated from an adjacent planar surface 1115 by a common distance 1120; alternatively, different planar surfaces 1115 are separated from other planar surfaces 1115 by different distances 1120. Each planar surface 1115 has a width 1125, while FIG. 11 shows an embodiment where the width 1125 of each planar surface 1115 is the same, different planar surfaces 1115 may have different widths in 1125 in other embodiments. The planar surfaces 1115 are coupled to the opposite end of the vertical portion 1112 of the cylindrical member than the circular base 1110 around a circumference of the cylindrical member. Additionally, the circular base 1110 can be configured to be coupled to an outer shell of a helmet, while ends of the planar surfaces 1115A, 1115B not coupled to the vertical portion of the cylindrical member can be configured to be coupled to an inner shell of a helmet, such as the helmet described above in conjunction with FIGS. 6A, 7A, and 8A. Alternatively, the circular base 1110 can be configured to be coupled to an inner shell of a helmet, while ends of the planar surfaces 1115A, 1115B not coupled to the vertical portion of the cylindrical member may be configured to be coupled to an outer shell of a helmet, such as the helmet described above in conjunction with FIGS. 6A, 7A, and 8A In other embodiments, the circular base 1110 may be configured to be coupled to a concentric surface 103 and the ends of the planar surfaces 1115A, 1115B not coupled to the vertical portion of the cylindrical member are configured to be coupled to another concentric surface 103.

Figure 12:
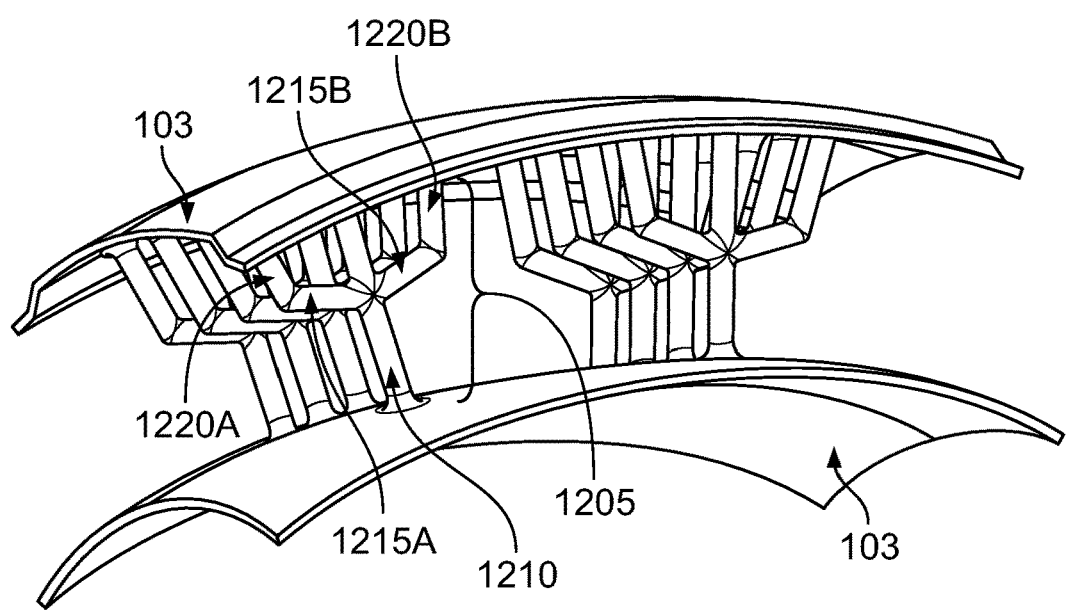
FIG. 12 is a perspective view of an embodiment of an impact absorbing structure having a base portion to which multiple supplemental portions are coupled, in accordance with an embodiment.

FIG. 12 is a perspective view of another alternative embodiment of an impact absorbing structure 1205 having a base portion 1210 to which multiple supplemental portions 1215A, 1215B (also referred to individually and collectively using reference number 1215) are coupled. Support portions 1220A, 1220B (also referred to individually and collectively using reference number 1220) are coupled to a concentric surface 103 and to a supplemental portion 1215A, 1215B.

As shown in FIG. 12, an end of a supplemental portion 1215A is coupled to the base portion 1210, while an opposing end of the supplemental portion 1215A is coupled to a support portion 1220A. The support portion 1220A has an end coupled to the opposing end of the supplemental portion 1215A, while another end of the support portion 1220A is coupled to a concentric surface 103. In various embodiments, an end of the base portion 1210 and the other ends of the support portions 1220 are each coupled to a common concentric surface 103, while an opposing end of the base portion 1210 is coupled to a different concentric surface 103.

Any number of supplemental portions 1215 may be coupled to the base portion 1210 of the impact absorbing structure in various embodiments. Additionally, the supplemental portions 1215 are coupled to the base portion 1210 at an angle relative to an axis parallel to the base portion 1210. In some embodiments, each supplemental portion 1215 is coupled to the base portion 1210 at a common angle relative to the axis parallel to the base portion 1210. Alternatively, different supplemental portions 1215 are coupled to the base portion 1210 at different angles relative to the axis parallel to the base portion 1210. Similarly, each support portion 1220 is coupled to a supplemental portion 1215 at an angle relative to an axis parallel to the supplemental portion 1215. In some embodiments, each support portion 1220 is coupled to a corresponding supplemental portion 1215 at a common angle relative to the axis parallel to the supplemental portion 1215. Alternatively, different support portions 1220 are coupled to a corresponding supplemental portion 1215 at different angles relative to the axis parallel to the corresponding supplemental portion 1215.

Figure 13A:
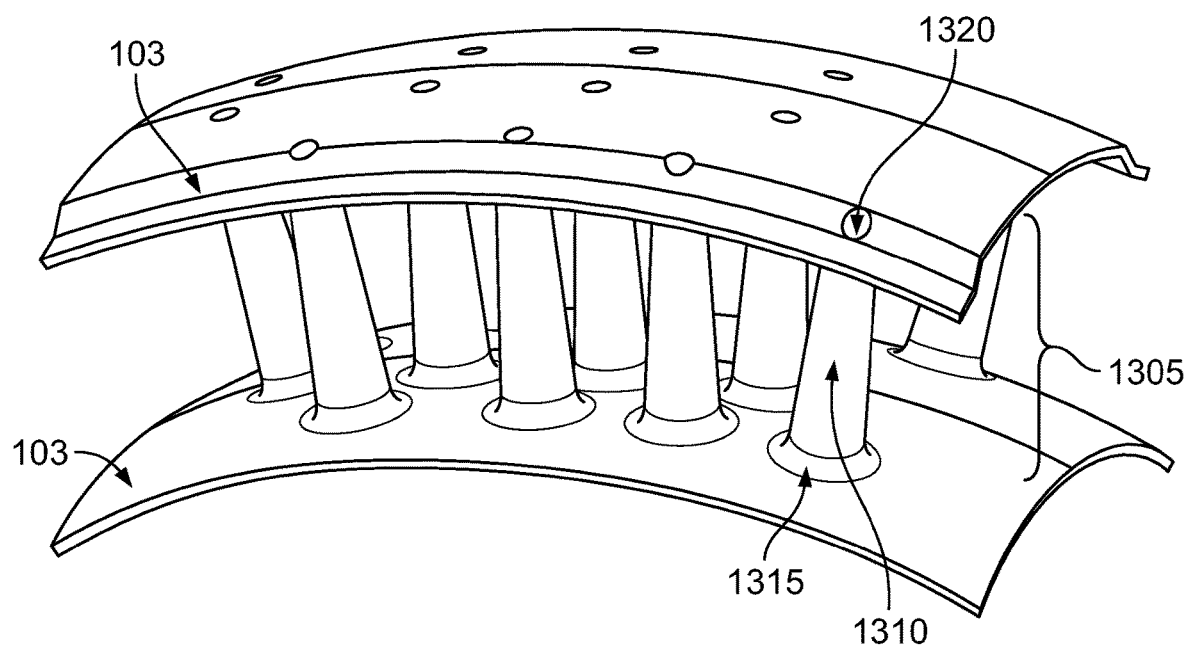
FIG. 13A is a perspective view of an embodiment of a conical impact absorbing structure, in accordance with an embodiment.

FIG. 13A is a perspective view of an embodiment of a conical impact absorbing structure 1305. The conical impact absorbing structure 1305 has a circular base 1315 and an additional circular base 1320 that has a smaller diameter than the circular base 1315. A vertical member 1310 is coupled to the circumference of the circular base 1315 and to a circumference of the additional circular base 1320. Hence, a width of the vertical member 1310 is larger nearer to the circular base 1315 and is smaller nearer to the additional circular base 1320. The circular base 1315 is configured to be coupled to a concentric surface 103, while the additional circular base 1320 is configured to be coupled to an additional concentric surface 103. In the example shown by FIG. 13A, the vertical member 1310 is hollow. Alternatively, a less rigid material, such as foam, may be injected into the interior of the vertical member 1310 to further dissipate energy from an impact.

Figure 13B:
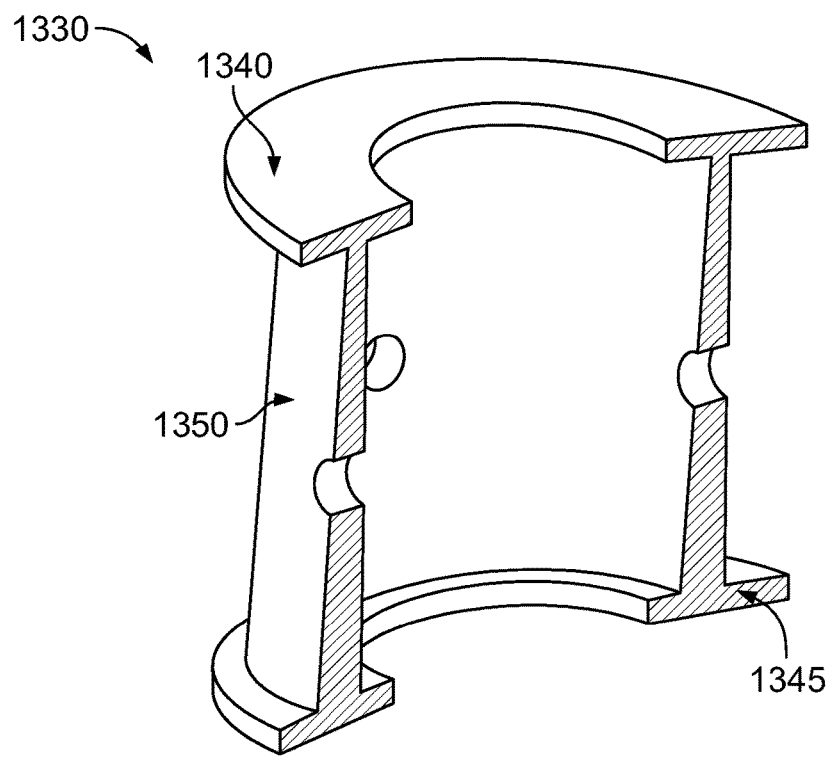
FIG. 13B is a cross-sectional view of an alternative impact absorbing structure, in accordance with an embodiment.

FIG. 13B is a cross-sectional view of an alternative impact absorbing structure 1330. In the example shown by FIG. 13B, the alternative impact absorbing structure 1330 has a circular base 1340 and an additional circular base 1345 that each have a common diameter. A vertical member 1350 is coupled to the circular base 1340 and to the additional circular base 1345. Because the diameter of the circular base 1340 equals the diameter of the additional circular base 1345, the vertical member 1350 can have a uniform width between the circular base 1340 and the additional circular base 1345. In the example of FIG. 13B, the vertical member 1350 is hollow. Alternatively, a less rigid material, such as foam, may be injected into the interior of the vertical member 1350 to further dissipate energy from an impact. The circular base 1345 is configured to be coupled to a concentric surface 103, while the additional circular base 1350 is configured to be coupled to an additional concentric surface 103.

Figure 14:
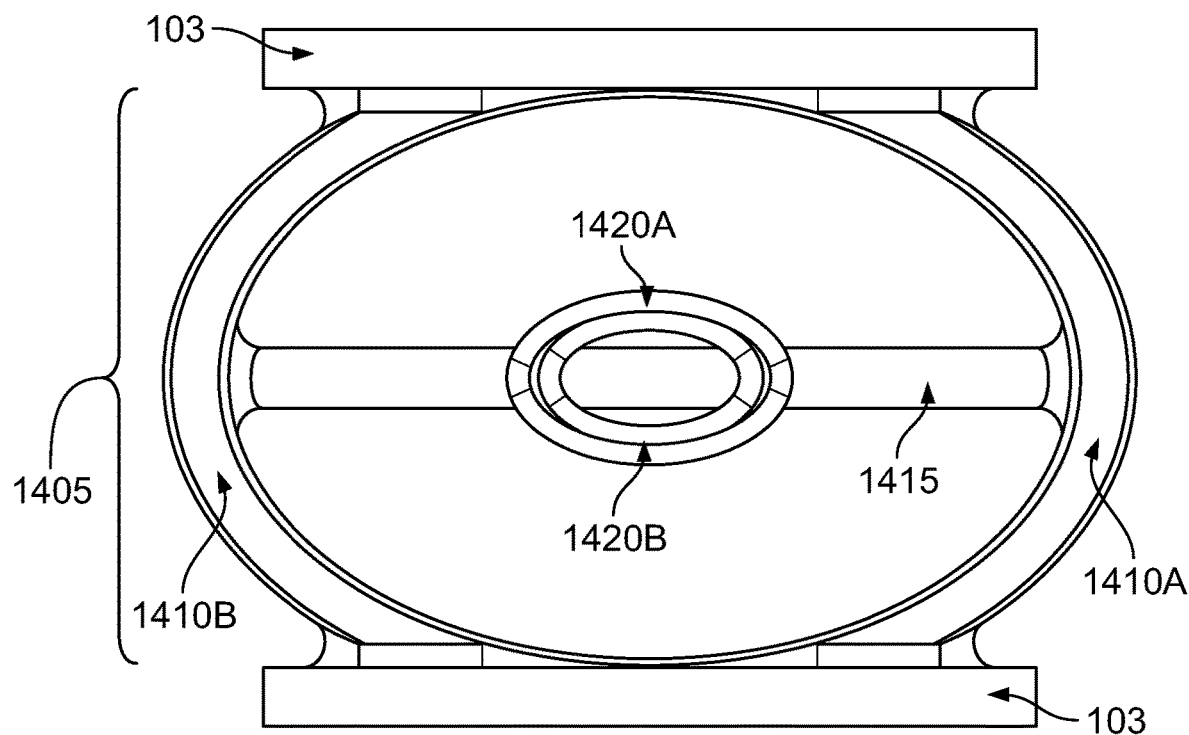
FIG. 14 is a side view of an impact absorbing structure having arched structures, in accordance with an embodiment.

FIG. 14 is a side view of an impact absorbing structure 1405 having arched structures 1410A, 1410B. In the example shown by FIG. 4, the impact absorbing structure 1405 has an arched structure 1410A coupled to a concentric surface 103 at an end and coupled to another concentric surface 103 at an opposing end. Similarly, an additional arched structure 1410B is coupled to the concentric surface 103 at an end, while an opposing end of the additional arched structure 1410B is coupled to the other concentric surface 103. A bracing member 1415 can be positioned in a plane parallel to the concentric surface 103 and the other concentric surface 103. An end of the bracing member 1415 is coupled to the arched structure 1410A, while an opposing end of the bracing member 1415 can be coupled to the additional arched structure 1410B. In various embodiments, the end of the bracing member 1415 is coupled to the arched structure 1410A at an apex of the arched structure 1410B relative to an axis perpendicular to the bracing member 1415. Similarly, the opposing end of the bracing member 1415 is coupled to the additional arched structure 1410B at an apex of the additional arched structure 1410B relative to the axis perpendicular to the bracing member 1415. However, in other embodiments, the bracing member 1415 may be coupled to any suitable portions of the arched structure 1410A and the additional arched structure 1410B along a plane parallel to the concentric surface 103 and the other concentric surface 103.

Additionally, a supporting structure 1420A can be coupled to a portion of a surface of the bracing member 1415 and to an additional portion of the surface of the bracing member 1415. Similarly, an additional supporting structure 1420B is coupled to a portion of an additional surface of the bracing member 1415 that is parallel to the surface of the bracing member 1415 and to an additional portion of the additional surface of the bracing member 1415. As shown in FIG. 14, the supporting structure 1420A is arched between the portion of the surface of the bracing member 1415 and the additional portion of the surface of the bracing member 1415. Similarly, the additional supporting structure 1420B is arched between the portion of the additional surface of the bracing member 1415 and the additional portion of the additional surface of the bracing member 1415.

Figure 15:
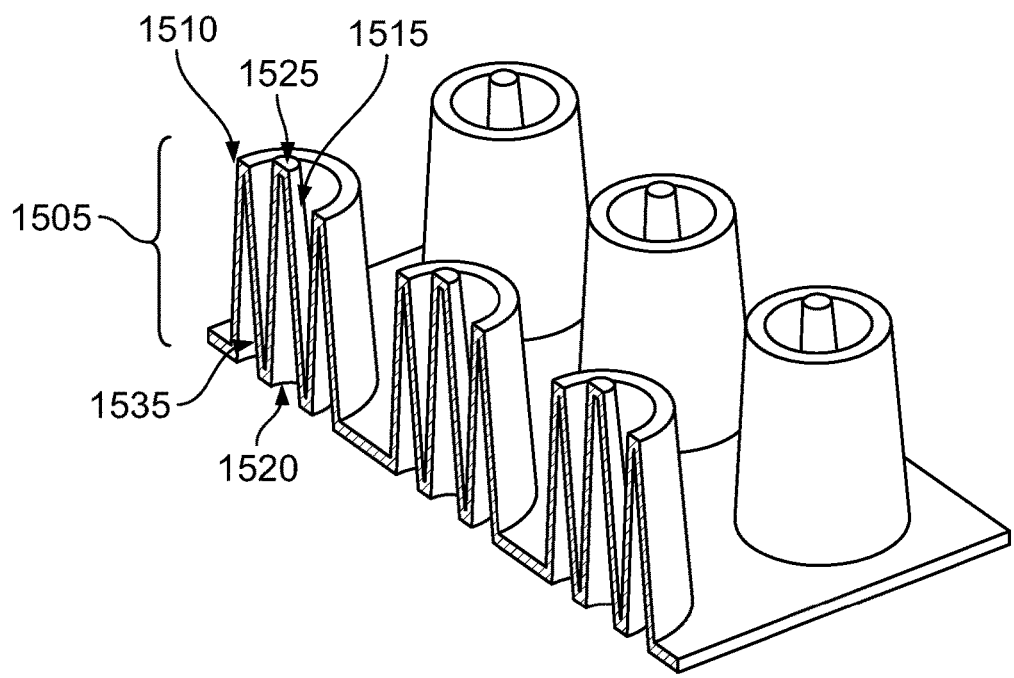
FIG. 15 is a perspective and cross-sectional view of an embodiment of an impact absorbing structure comprising a cylindrical structure enclosing a conical structure, in accordance with an embodiment.

FIG. 15 is a perspective and cross-sectional view of an embodiment of an impact absorbing structure 1505 comprising a cylindrical structure 1510 enclosing a conical structure 1515. In the example shown by FIG. 15, the impact absorbing structure 1505 has a cylindrical structure 1510 having an interior wall 1535 and an exterior wall. The cylindrical structure 1510 encloses a conical structure 1515 having a circular base 1520 at one end and an additional circular base 1525 at an opposing end. In various embodiments, the cylindrical structure 1510 and the conical structure 1515 can each have different durometers, so the cylindrical structure 1510 and the conical structure 1515 have different hardnesses. Alternatively, the cylindrical structure 1510 and the conical structure 1515 have a common hardness. The additional circular base 1525 has a smaller diameter than the circular base 1520. Additionally, the interior wall 1535 of the cylindrical structure 1510 may optionally taper from a portion of the cylindrical structure 1510 nearest the additional circular base 1525 of the conical structure 1515 to being coupled to a circumference of the circular base 1520 of the conical structure 1515. In some embodiments, such as shown in FIG. 15, a height of the conical structure 1515 is greater than a height of the cylindrical structure 1510, so the additional circular base 1525 of the conical structure 1515 protrudes above the cylindrical structure 1510. Alternatively, the height of the conical structure 1515 equals the height of the cylindrical structure 1510, so a top of the cylindrical structure 1510 is in a common plane as the additional circular base 1525 of the conical structure 1515. Alternatively, the height of the conical structure 1515 is less than the height of the cylindrical structure 1510. As an additional example, the conical structure 1515 and the cylindrical structure 1510 have equal heights. In various embodiments, the circular base 1520 of the conical structure 1515 is configured to be coupled to an inner shell of a helmet, while the additional circular base 1525 of the conical structure 1515 is configured to be coupled to an outer shell of a helmet, such as the helmet described above in conjunction with FIGS. 6A, 7A, and 8A. Alternatively, the circular base 1520 of the conical structure 1515 is configured to be coupled to an outer shell of a helmet, while the additional circular base 1525 of the conical structure 1515 is configured to be coupled to an inner shell of a helmet, such as the helmet described above in conjunction with FIGS. 6A, 7A, and 8A.

Figure 16:
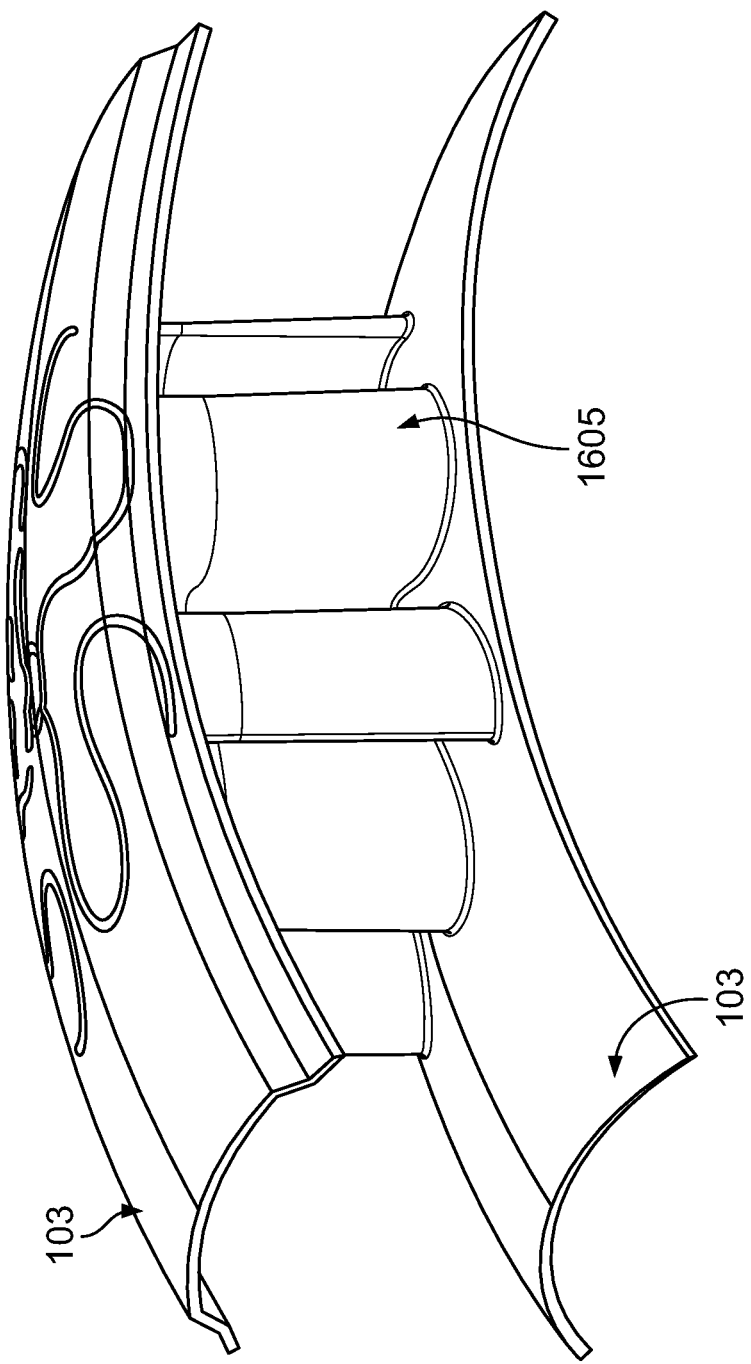
FIG. 16 is a perspective view of an impact absorbing structure, in accordance with an embodiment.

FIG. 16 shows an embodiment of another embodiment of an impact absorbing structure 1605. In the example shown by FIG. 16, the impact absorbing structure 1605 can include an open and/or closed polygon and/or irregular surface that undulates in a plane perpendicular to a plane including a concentric surface 103, which as depicted is coupled at one end to the concentric surface 103 and is coupled at an opposing end to an additional concentric surface 103. For example, the impact absorbing structure 1605 can have a sinusoidal cross section in a plane parallel to the plane including the concentric surface 103. However, in other embodiments, the impact absorbing structure 1605 may have any suitable profile in a cross section along the plane parallel to the plane, including the concentric surface 103.

Impact Absorbing/Mitigating Structures—Laterally Supporting Wall Impact Absorbing Structures In another embodiment, an impact absorbing structure may include laterally supported filament structures. The laterally supported filament structures comprise a plurality of filaments with a plurality of laterally supporting wall structures. Such supporting wall structures or support members may be desirably modified into any shape or configuration that reduces and distributes impact forces, as well as relieves specific stress concentration points within the impact mitigation structure. The supporting wall structure shape and/or configuration may include polygon shaped, re-entrant shapes, parabolic shapes, cone shapes, venturi shaped, hemispherical shaped, re-entrant flared shaped, and/or any combinations thereof. The presence of the laterally supporting wall structures and/or support members (which may include laterally supporting members extending between adjacent filaments, face sheets, other support elements and/or between various combinations thereof) will desirably prevent and/or inhibit buckling of the filaments and/or columns in a lateral direction away from the wall, as well as possibly prevent and/or inhibit sideways buckling of the filaments (and/or buckling towards the wall) to varying degrees—generally depending upon the thickness, structural stiffness and/or material construction of the various walls, as well as various other considerations.

In various embodiments, an impact mitigation layer can comprise an array of impact absorbing structures, the array of impact absorbing structures may comprise longitudinally extending vertical filaments, columns and/or other buckling structures, otherwise known as "open" laterally supported filament (LSF) structures. Each impact absorbing LSF structure comprises a plurality of connected support members, each connected support member having a first filament, a second filament and a connecting wall or connecting element. Each of the first and second filaments having an elongated body and high aspect ratio of greater than 3:1 to facilitate an elastic buckling response, the buckling being a lateral deflection away from a longitudinal axis of the filament. At least a portion of the first and second filament may further comprise a uniform and/or constant cross-sectional shape. Alternatively, at least a portion of the first and second filaments may have a substantially uniform and/or substantially constant cross-sectional shape, where substantially is defined as at least ninety percent of the filament body is uniform and/or constant cross-sectional shape. The connecting wall or element is coupled the first and second filament. The connecting wall or element may extend at least a portion of the length of the first or second filament. The connecting wall or element may comprise of different shapes and/or configurations, which includes polygon shaped, re-entrant shapes, parabolic shapes, cone shapes, venturi shaped, hemispherical shaped, re-entrant flared shaped, and/or any combinations thereof. The plurality of connected support members is positioned adjacent to each other to form a pattern, shape or structure. The symmetric pattern, asymmetric pattern, offset patterns, linear patterns, shape or structure comprises a circle, and/or a polygon. The polygons may comprise triangles, squares, rectangles, pentagons, hexagons, septagons, octagons, nonagons, decagons, and/or any combination thereof. The polygons may further comprise a regular or irregular polygon.

In various embodiments, an impact mitigation layer can comprise an array of impact absorbing structures, the array of impact absorbing structures may comprise longitudinally extending vertical filaments, columns and/or other buckling structures, otherwise known as "closed" laterally supported filament (LSF) structures. Each impact absorbing LSF structure comprises a plurality of connected support members, each connected support member having a filament and a connecting wall or connecting element. The filament having a high aspect ratio of greater than 3:1, and a uniform and/or constant cross-sectional shape. Alternatively, the filament may have a substantially uniform and/or substantially constant cross-sectional shape, where substantially is defined as at least ninety percent of the filament body is uniform and/or constant cross-sectional shape. The connecting wall or element is coupled the filament. The connecting wall or element may extend at least a portion of the length of the filament. The connecting wall or element may comprise of different shapes and/or configurations, which includes polygon shaped, re-entrant shapes, parabolic shapes, cone shapes, venturi shaped, hemispherical shaped, re-entrant flared shaped, and/or any combinations thereof. The plurality of connected support members is positioned adjacent to each other to form a pattern, shape or structure, and each of the plurality of connected support members are coupled to each other. The pattern, shape or structure comprises a circle, and/or a polygon. The polygons may comprise triangles, squares, rectangles, pentagons, hexagons, septagons, octagons, nonagons, decagons, and/or any combination thereof. The polygons may further comprise a regular or irregular polygon.

Figure 17A:
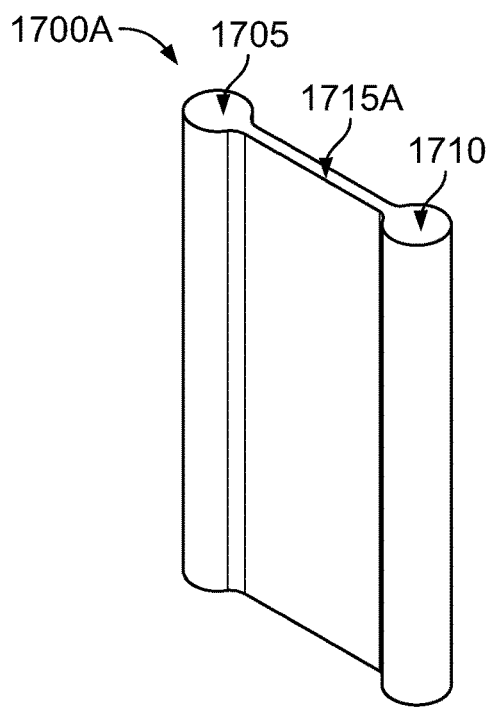
FIGS. 17A through 17C show perspective views of impact absorbing structures comprising connected support members, in accordance with an embodiment.
Figure 17B:
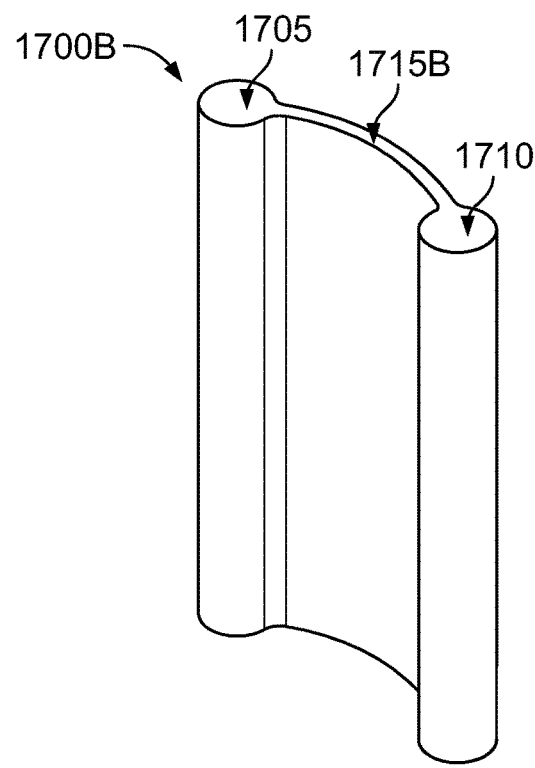
Figure 17C:
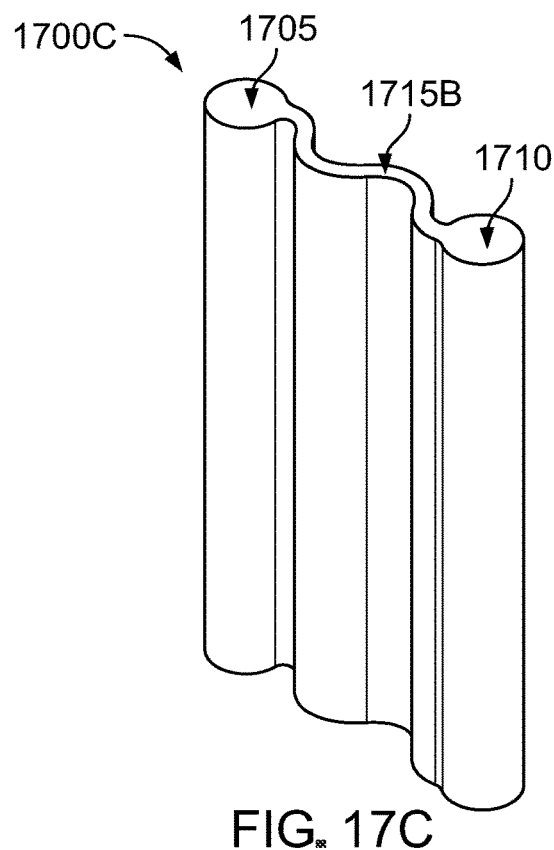

FIGS. 17A-17C show perspective views of additional embodiments of impact absorbing structures 1700A, 1700B, 1700C comprising connected support members 1705, 1710. Each support member 1705, 1710 has an end configured to be coupled to a concentric surface 103 and an opposing end configured to be coupled to another concentric surface 103. A support member 1705 is coupled to the other support member 1710 by a connecting element that is desirably in a plane perpendicular to a plane including the concentric surface 103, or in a plane perpendicular to another plane including the other concentric surface 103. In the example of FIG. 17A, an impact absorbing structure 1700A may include a rectangular sheet-like or wall-like structure 1715A connecting the support member 1705 to the other support member 1710, with this wall structure positioned perpendicular to the concentric surface 103 and to the other concentric surface 103. In various embodiments, an end of the rectangular structure 1715A is coupled to the concentric surface 103, while an opposite end of the rectangular structure 1715A is coupled to the other concentric surface 103.

FIG. 17B shows an impact absorbing structure 1700B including a non-planer surface or "arched" wall structure 1715B connecting the support member 1705 to the other support member 1710. The arched structure 1715B is perpendicular to the concentric surface 103 and to the other concentric surface 103 and is arched in a plane that is parallel to the concentric surface 103 and to the other concentric surface 103. In various embodiments, an end of the arched structure 1715B is coupled to the concentric surface 103, while an opposite end of the arched structure 1715B is coupled to the other concentric surface 103.

FIG. 17C shows an impact absorbing structure 1700B including a complex or "undulating" wall structure 1715C connecting the support member 1705 to the other support member 1710. The undulating structure 1715C can desirably be perpendicular to the concentric surface 103 and to the other concentric surface 103 and may include multiple arcs in a plane that is parallel to the concentric surface 103 and to the other concentric surface 103. For example, the undulating structure 1715C may have a sinusoidal cross section in a plane parallel to the plane including a concentric surface 103. In various embodiments, an end of the undulating structure 1715C is coupled to the concentric surface 103, while an opposite end of the undulating structure 1715C is coupled to the other concentric surface 103.

Figure 18:
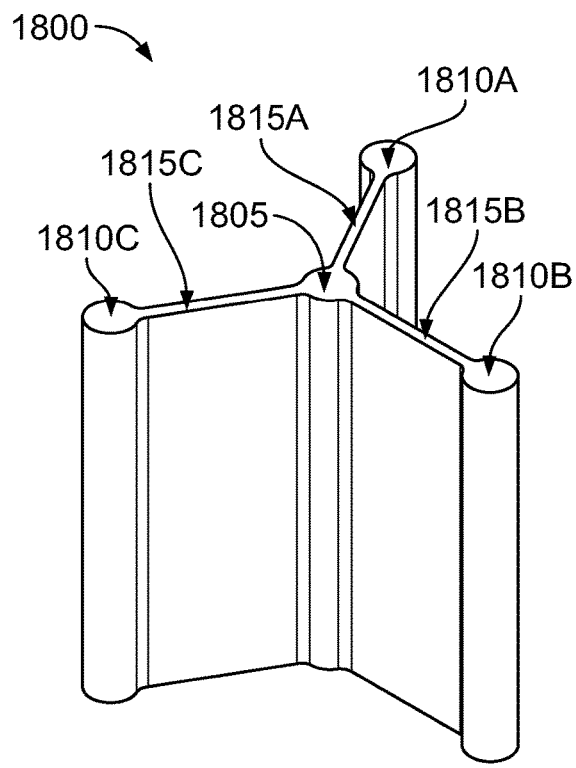
FIGS. 18 through 20 show example structural groups including multiple support members positioned relative to each other with different support members coupled to each other by connecting members, in accordance with an embodiment.

While FIGS. 17A-17C show examples of impact absorbing structures where a pair of support members are coupled to each other by a connecting member, any number of support members may be positioned relative to each other and different pairs of the support members connected to each other by connecting members to form structural groups. FIGS. 18-20 show exemplary structural groups including multiple support members positioned relative to each other with different support members or filaments coupled to each other by connecting members or walls. FIG. 18 shows an impact absorbing structure 1800 having a central support member 1805 coupled to three radial support members 1810A, 1810B, 1810C that are positioned along a circumference of a circle having an origin at the central support member 1805. The central support member 1800 is coupled to radial support member 1810A by connecting member 1815A and is coupled to radial support member 1810B by connecting member 1815B. Similarly, the central support member 1800 is coupled to radial support member 1810C by connecting member 1815C. While FIG. 18 shows an example where the connecting member 1815A, 1815B, 1815C are rectangular, while in other embodiments, the connecting members 1815A, 1815B, 1815C may be arched structures or undulating structures as described in FIGS. 17B and 17C or may have any other suitable cross section.

Figure 19A:
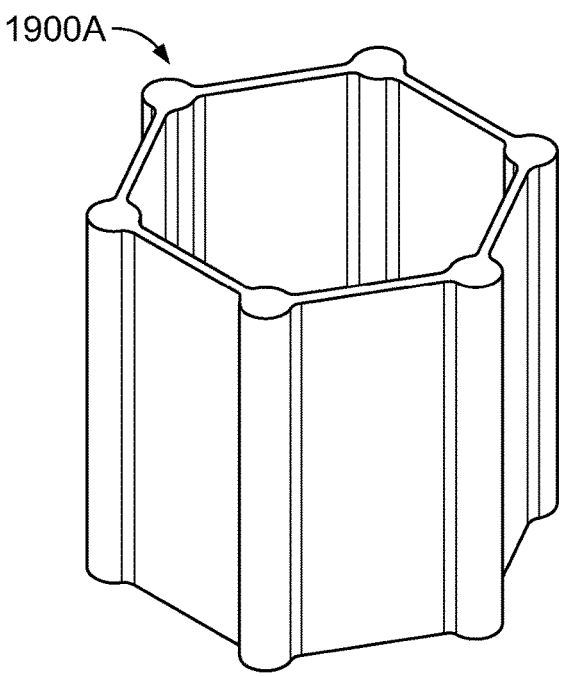
Figure 19B:
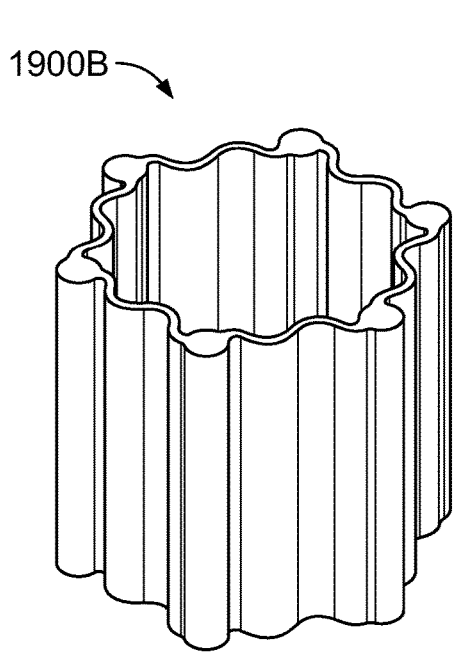
Figure 20:
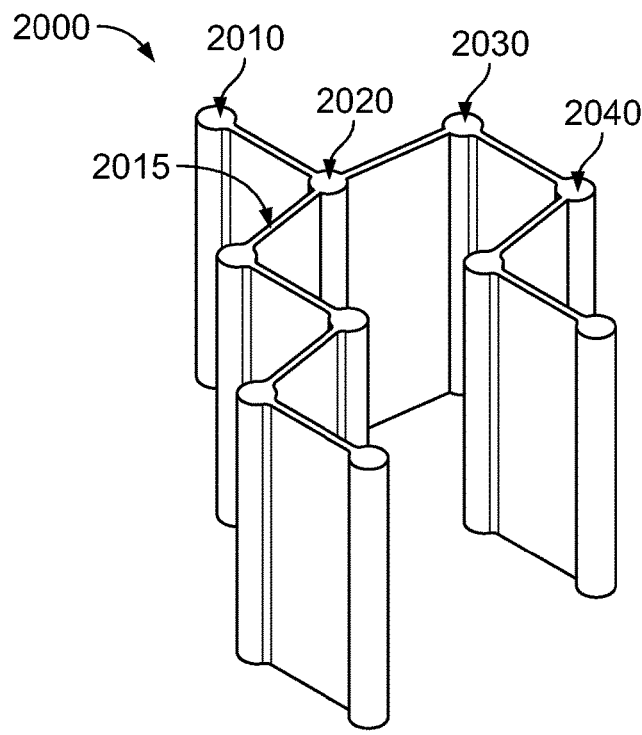

FIGS. 19A and 19B show perspective views of additional embodiments of impact absorbing structures 1900A and 1900B, comprising six support members or filaments coupled to each other by connecting members or walls formed in a hexagonal pattern. In the example shown by FIG. 19A, the impact absorbing structure 1900A has pairs of support members coupled to each other via rectangular connecting members to form a hexagon. The impact absorbing structure 1900B shown by FIG. 19B has pairs of support members coupled to each other via undulating support members to form a hexagon.

FIG. 20 is a perspective view of an impact absorbing structure 2000 comprising rows of offset support members coupled together via connecting members in an "open" polygonal structure. In the example of FIG. 20, support members are positioned in multiple parallel rows 2010, 2020, 2030, 2040, with support members in a row offset from each other so support members in adjacent rows are not in a common plane parallel to the adjacent rows. For example, support members in row 2010 are positioned so they are not in a common plane parallel to support members in row 2020. As shown in the example of FIG. 20, a support member in row 2020 is positioned so it is between support members in row 2010. Connecting members connect support members in a row 2010 to support members in an adjacent row 2020. In some embodiments, support members in a row 2010 are not connected to other support members in the row 2010 but are connected to a support member in an adjacent row 2020 via a support member 2015.

Figure 21A:
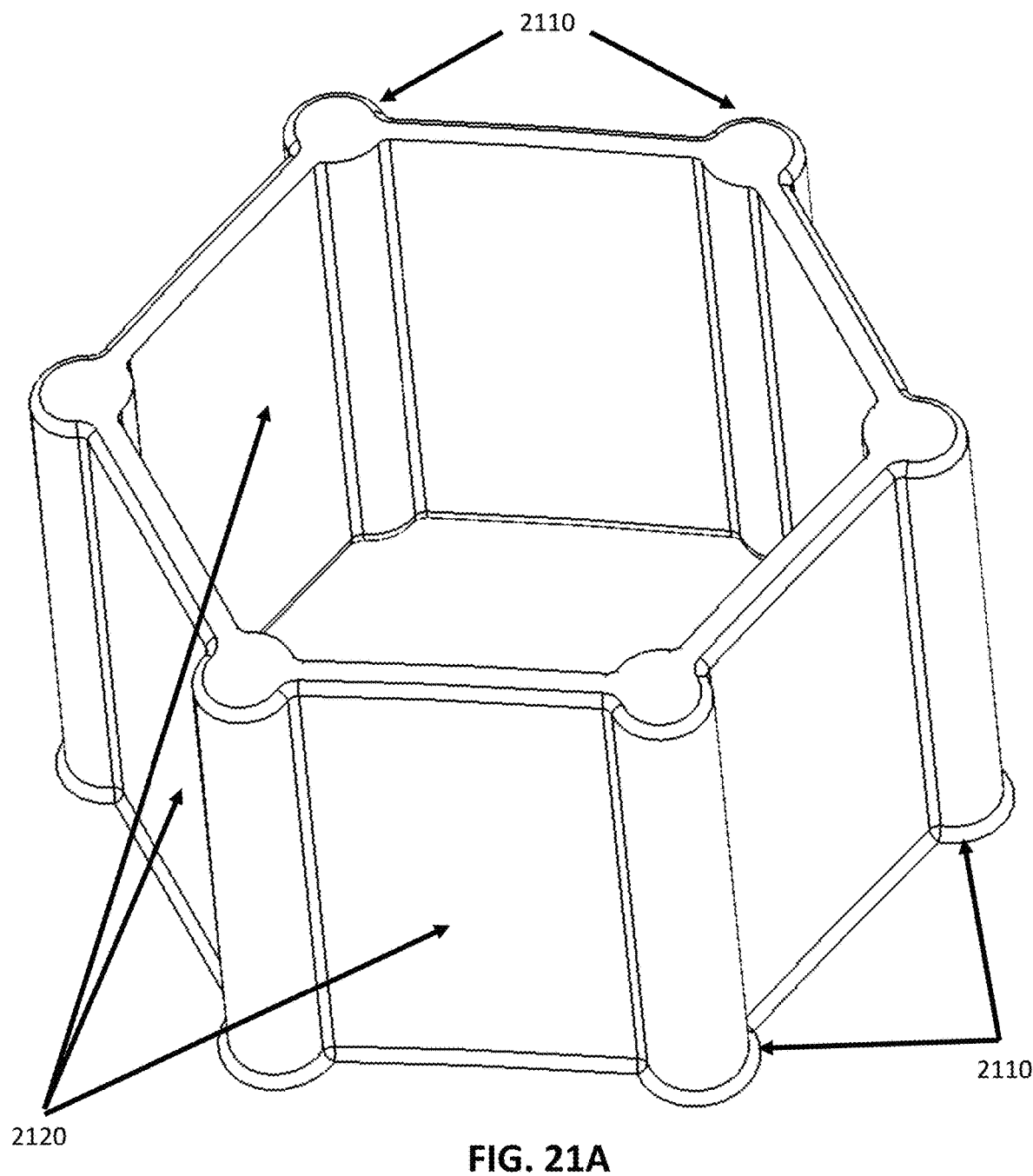
FIG. 21A depicts another exemplary embodiment of an improved impact absorbing element comprising a plurality of filaments interconnected by laterally positioned walls or sheets in a hexagonal configuration.

FIG. 21A depicts another view of the exemplary embodiment of an improved impact absorbing element and/or structure 2100 comprising a plurality of filaments 2110 that are interconnected by laterally positioned walls or sheets 2120 in a polygonal configuration. The polygonal structures 2120 may be manufactured as individual structures or in a patterned array. The manufacturing may include extrusion, investment casting or injection molding process. If manufactured as individual structures, each structure may be affixed to the desired product. Alternatively, if manufactured in a patterned array, the patterned array structures may be affixed to at least one face sheet. The polygon structures or shapes may comprise a triangle, a square, a rectangle, a pentagon, a hexagon, a heptagon, an octagon, a nonagon, a decagon, and/or any combination thereof. The polygon structures or shapes may be an irregular polygon, a regular polygon, a convex polygon, a concave polygon, a self-intersecting polygon.

In this embodiment, the filaments can be connected at a lower end and/or an upper end by a face sheet or other structure (not shown), which are/is typically oriented perpendicular to the longitudinal axis of the filaments. A plurality of sheets or lateral walls 2120 can be secured between adjacent pairs of filaments 2110, with each filament having a pair of lateral walls 2120 attached thereto. In the disclosed embodiment, the lateral walls 2120 can be oriented approximately 120 degrees apart about the filament axis, with each lateral wall 2120 extending substantially along the longitudinal length of the filament 2110. Alternatively, the lateral walls 2120 can be oriented approximately 75 degrees to 135 degrees apart about the filament axis, with each lateral wall 2120 extending at least a portion along the longitudinal length of the filament 2110 and/or extending along the entire longitudinal length of the filament 2110.

Figure 21B:
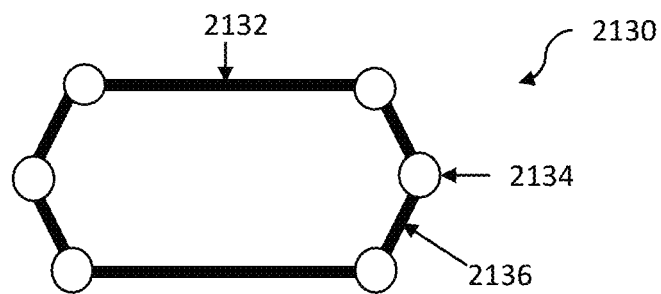
FIG. 21B-21E depicts top views of other alternative embodiments of an improved hexagonal impact absorbing element, with non-symmetrical arrangement of the filaments and walls or otherwise known as irregular polygons.

FIG. 21B illustrates an impact absorbing structure 2130 having different lateral wall widths 2132, 2136. The lateral walls 2132, 2136 may comprise the same widths between each filament 2134, or they may have different widths. Furthermore, the lateral walls 2132, 2136 may have different lateral wall heights, or may have the same lateral wall heights. The impact absorbing structure may comprise a plurality of filaments 2134 and a plurality of lateral walls 2132, 2136. At least one of the plurality of walls 2132 has a different lateral wall width than the adjacent lateral wall 2136 width.

Figure 21C:
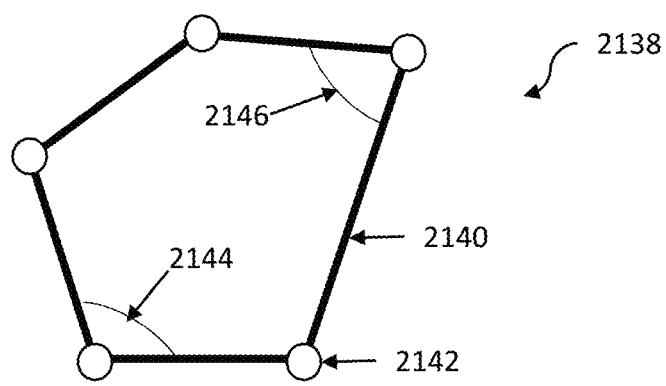
Figure 21D:
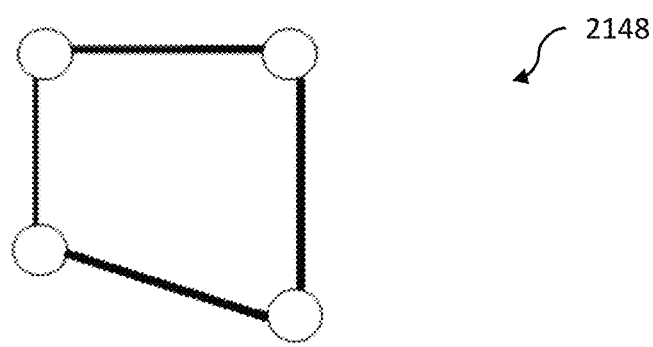
Figure 21E:
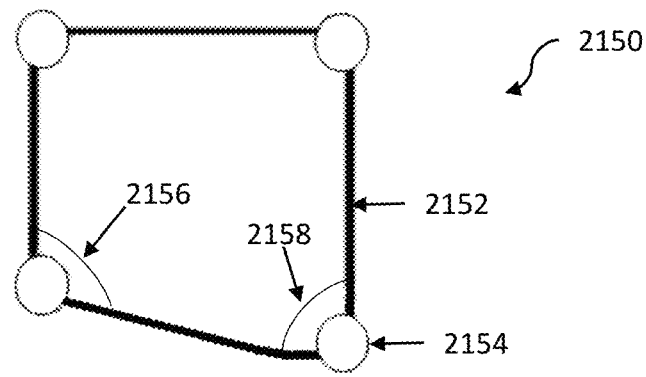

FIGS. 21C-21E illustrate impact absorbing structures with offset pattern, and/or an irregular polygon shape. An irregular impact absorbing polygonal structure 2138 may comprise a plurality of filaments 2142 in which some of the lateral walls 2140 may be arranged with interior angles between 75 degrees to 135 degrees. In one exemplary embodiment, the interior angle may comprise 120 degrees 144, while other walls 2140 may be arranged at a different interior angle 2146, the different interior angle 2146 may be greater than or less than 120 degrees (sec FIG. 21B). Such an irregular polygonal pattern may be used, in which at least one of the plurality of lateral walls 2140 are not symmetrical in their positioning and/or arrangement to the adjacent plurality of lateral walls 2140. For any of these embodiments, an upper and/or lower end of the lateral wall 2140 may be secured to one or more upper/lower face sheets (not shown), if desired. FIG. 21D also illustrates an alternate embodiment of an irregular polygon impact absorbing structure 2148.

FIG. 21E illustrates another alternative embodiment of an irregular polygon impact absorbing structure 2150. The irregular polygon impact absorbing structure comprises a plurality of filaments 2154, and a plurality of walls 2152, where each of the plurality of walls having a first portion and a second portion. The first portion of the lateral wall 2152 being coupled to a filament 2154 and having a first interior angle 2158 and the second portion of the lateral wall 2152 being coupled to an adjacent filament and having a second interior angle 2158. Such an irregular polygonal pattern may be used, in which at least one of the plurality of lateral walls 2152 are not symmetrical in their positioning and/or arrangement to the adjacent plurality of lateral walls 2152. For any of these embodiments, an upper and/or lower end of the lateral wall 2152 may be secured to one or more upper/lower face sheets (not shown), if desired.

Figure 22A:
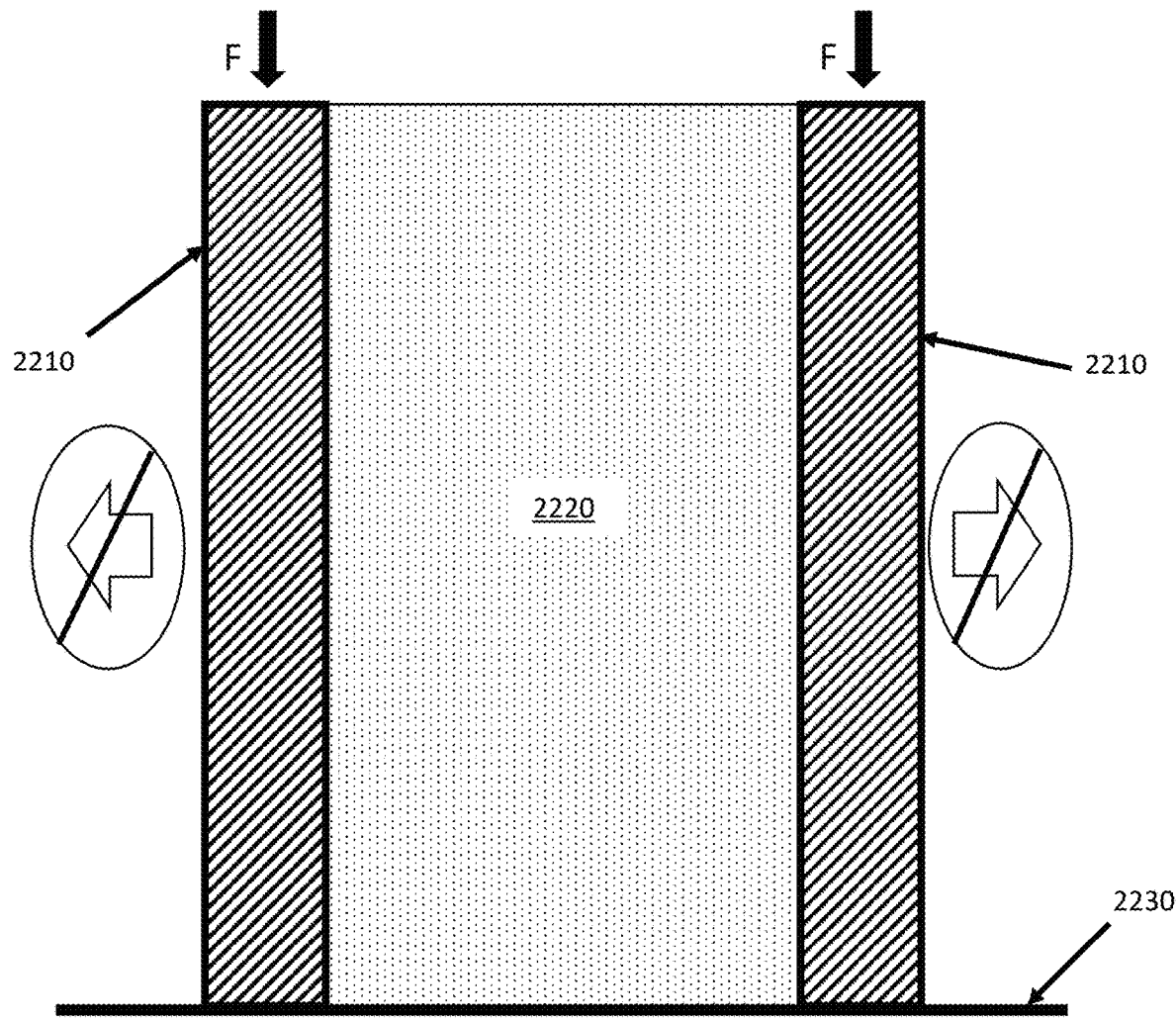
FIG. 22A depicts a side view of a portion of an impact absorbing structure, showing an exemplary pair of filaments connected by a lateral wall and lower face sheet.
Figure 22B:
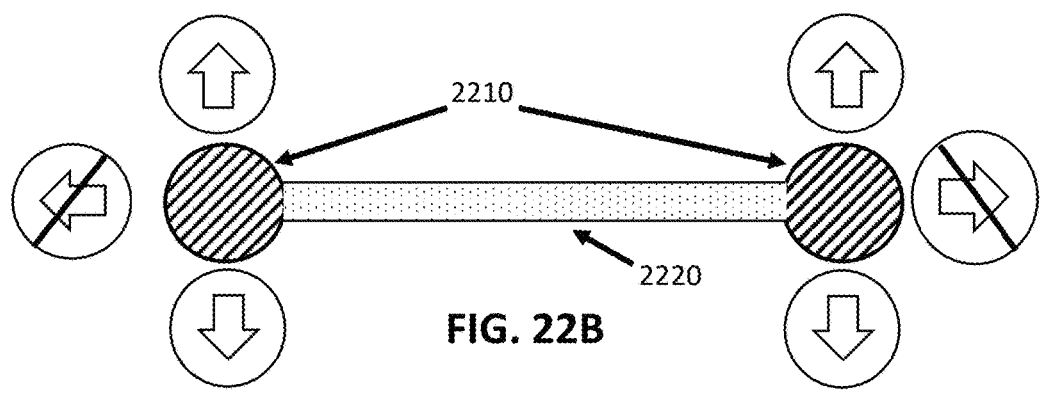
FIG. 22B depicts a top plan view of the impact absorbing structure portion of FIG. 22A with some exemplary buckling constraints identified.

FIG. 22A depicts a side view of an exemplary pair of filaments 2210 that are connected by a lateral wall 2220, with a face sheet 2230 connected at the bottom of the filaments 2210 and wall 2220. In this embodiment, a vertical force (i.e., an axial compressive "impact" F) downward on the filaments 2210 will desirably induce the filaments 2210 to compress to some degree in initial resistance to the force F, with a sufficient vertical force eventually inducing the filaments 2210 to buckle. However, the presence of the lateral wall 2220 will desirably prevent and/or inhibit buckling of the filaments 2210 in a lateral direction away from the wall, as well as possibly prevent and/or inhibit sideways buckling of the filaments 2210 (and/or buckling towards the wall 2220) to varying degrees—generally depending upon the thickness, structural stiffness and/or material construction of the various lateral walls 2220, as well as various other considerations. As best seen in FIG. 22B, the most likely direction(s) of buckling of the filaments 2210 as depicted may be transverse to the wall 2220, which stiffens the resistance of the filaments 2210 to buckling along various lateral directions, to a measurable degree in a desired manner.

Figure 22C:
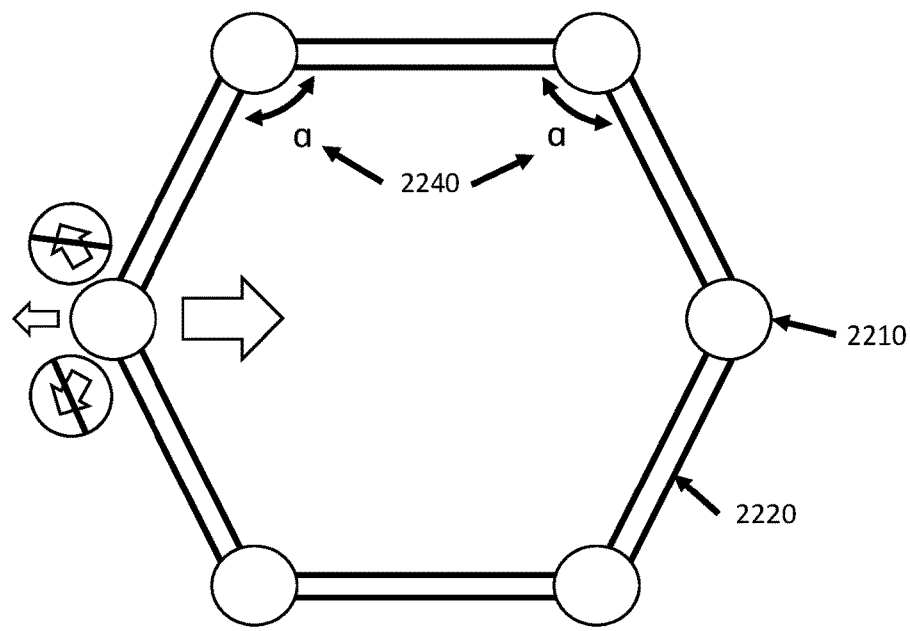
FIG. 22C depicts a top plan view of an exemplary hexagonal impact absorbing structure with some exemplary buckling constraints identified.

FIG. 22C depicts a top plan view of filaments 2210 and walls 2220 in an exemplary hexagonal configuration. Alternatively, it may be a polygonal configuration. In this embodiment, each filament 2210 is connected by walls 2220 to a pair of adjacent filaments, with two walls 2220 extending from and/or between each filament set. In this arrangement, an axial compressive force (not shown) will desirably induce each of the filaments to initially compress to some degree in resisting the axial force, with a sufficient vertical force inducing the filaments to buckle in a desired manner. The presence of the two walls 2220, however, with each wall separated at an approximately 120 degree angle α 2240, tends to limit lateral displacement of each filament 2210 away from and/or towards various directions, effectively creating a circumferential or "hoop stress" within the filaments/walls of the hexagonal structure that can alter, inhibit and/or prevent certain types, directions and/or degrees of bucking of the individual filaments, of the individual walls and/or of the entirety of the hexagonal structure and/or polygonal structure.

Figure 22D:
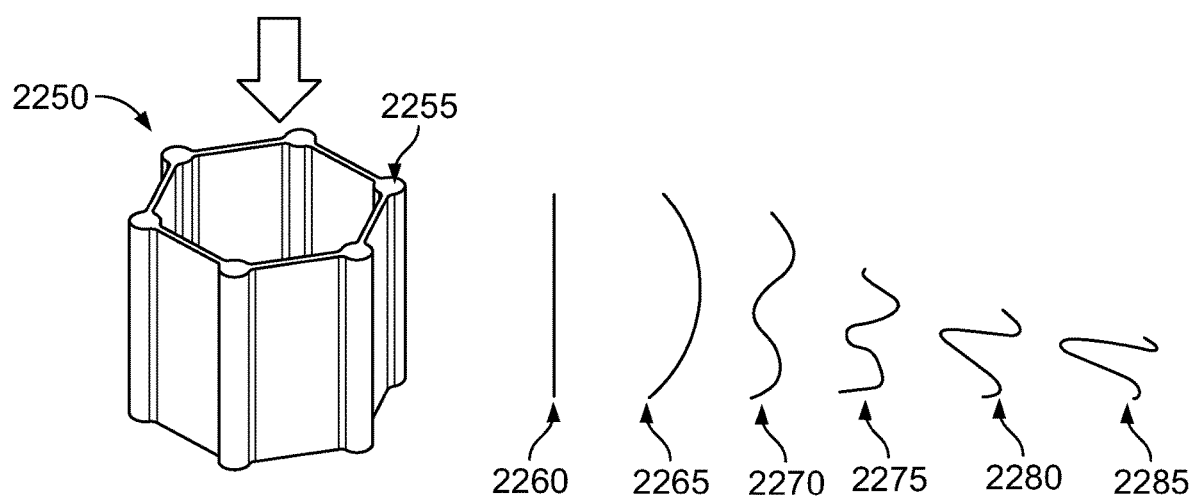
FIG. 22D depicts a perspective view of another embodiment of a hexagonal impact absorbing structure, with an exemplary potential mechanical behavior of one filament element undergoing progressive buckling depicted in a simplified format.

FIG. 22D shows a perspective view of an alternate embodiment of a polygonal absorbing element and/or structure 2250, with an exemplary progressive mechanical behavior of one filament 2255 (in this embodiment connected only to a face sheet at its bottom end) as the polygonal structure undergoes buckling induced by an axial compressive force. In this embodiment, the filament in initially in a generally straightened condition 2260, with the compressive force F initially causing the upper and/or central regions of the filament to displace laterally to some degree 2265 (corresponding to possible stretching, compression and/or "rippling" of the lateral walls), with the central region of the filament bowing slightly outward (causing a portion of the hexagonal or polygonal structure to assume a slight barrel-like shape). Further compression of the hexagonal or polygonal structure by the force may reach a point where one or more of the filaments 2255 begin to buckle 2270, which can include buckling of a portion of the filament 2255 inwards towards the center of the hexagonal or polygonal structure, with other portions of the filament 2255 buckling outward (i.e., potentially taking an "accordion" shape as the hexagonal structure buckles), which may be accompanied by asymmetric failure of some or all of the hexagonal structure (i.e., "toppling" or tilting of the hexagonal structure to one side). Further compression of the hexagonal or polygonal structure should desirably progressively increase the collapse of the filaments 2275, which may include filament and/or wall structures overlapping each other to varying degrees 2280. Eventually, increased the compressive loading should eventually completely collapse 2285 the hexagonal and/or polygonal structure and associated filaments/walls, at which point the array may reach a "bottomed out" condition, in which further compression occurs mainly via compressive thinning or elastic/plastic "flowing" of the collapsed material bed (not shown). Desirably, once the compressive load is removed, the individual filaments 2255 and/or walls of the hexagonal and/or polygonal structure will rebound to approximate their original un-deformed shape, awaiting a new load. Although, a hexagonal structure was used to describe the deformation behavior of the impact structure, it is understood that any polygonal configuration would have similar deformation behavior as described herein.

In various embodiments, the presence of the lateral walls between the filaments of the hexagonal and/or polygonal structure can greatly facilitate recovery and/or rebound of the filament and hexagonal structures as compared to the independent filaments within a traditional filament bed. During buckling and collapse of the filaments and hexagonal and/or polygonal structures, the lateral walls desirably constrain and control filament "failure" in various predictable manners, with the walls and/or filaments elastically deforming in various ways, similar to the "charging" of a spring, as the hexagonal structure and/or polygonal structure collapses.

When the compressive force is released from the hexagonal structure and/or any polygonal structure, the walls and filaments should elastically deform back to their original "unstressed" or pre-stressed sheet-like condition, which desirably causes the entirety of the hexagonal or polygonal structure and associated filaments/walls to quickly "snap back" to their original position and orientation, immediately ready for the next compressive force.

The disclosed embodiments also confer another significant advantage over current filament array designs, in that the presence, orientation and dimensions of the lateral walls and attached filaments can confer significant axial, lateral and/or torsional stability and/or flexibility to the entirety of the array, which can include the creation of orthotropic impact absorbing structures having unique properties when measured along different directions. More importantly, one unique features of these closed polygonal structures (and to some extent, open polygonal structures in various alternative configurations) is that the orthotropic properties of the hexagonal or polygonal structures and/or the entirety of the impact absorbing array can often be "tuned" or "tailored" by alterations and/or changes in the individual structural elements, wherein the alteration of one impact structure can significantly affect one property (i.e., axial load resistance and/or buckling strength) without significantly altering other properties (i.e., lateral and/or torsional resistance of the structural element). In various embodiments, this can be utilized to create a protective garment that responds differently to different forces acting in different areas of the garment.

Figure 23A:
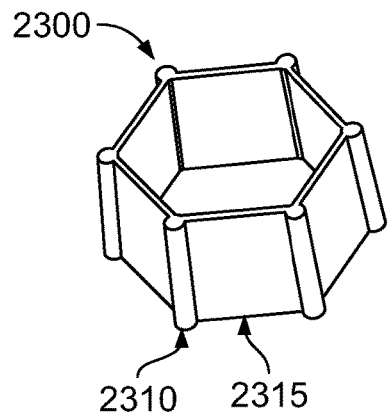
FIG. 23A-23C depicts alternative embodiments of hexagonal structure that can be available in different dimensions and/or configurations.
Figure 23B:
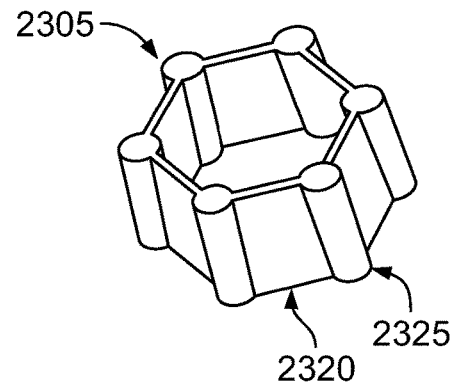
Figure 23C:
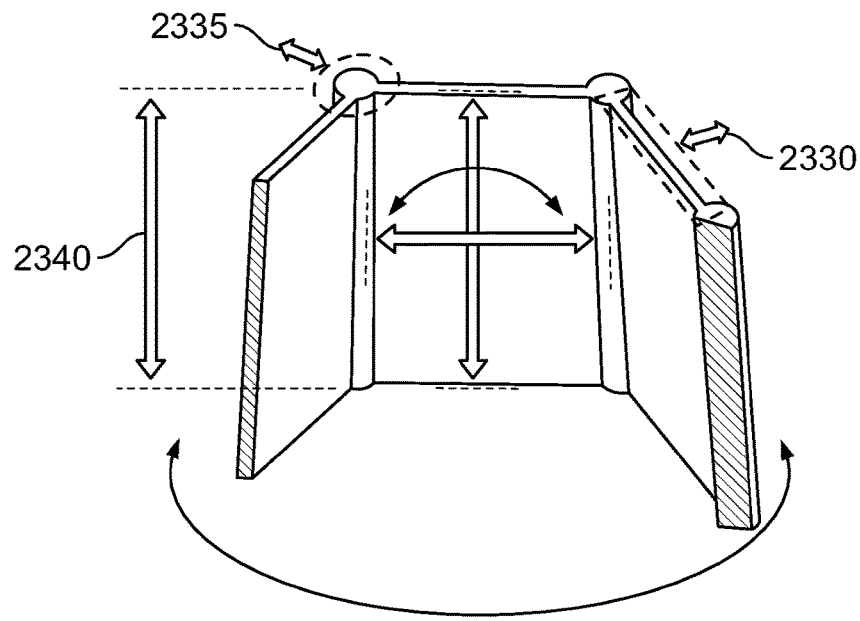

Desirably, alterations in the structural, dimensional, material components and/or the coupling of the lateral walls to a filament of a given design of an impact absorbing array will alter some impact absorbing structure of its orthotropic response to loading. For example, FIGS. 23A-23B depicts isometric views of two different alternate embodiments of an impact absorbing structure comprising laterally supported filaments 2300, 2305. The first hexagonal and/or polygonal structure 2300 having relatively thin, elongated, but small diameter filaments 2310 of a certain length, and a second hexagonal structure 2305 having relatively larger diameter filaments 2325 of the same height or offset. Each of the filaments 2310, 2325 having a thin, elongated shape that has at least a 3:1 aspect ratio or greater to make the filament 2310, 2320 prone to buckling. Furthermore, each of the polygonal impact structures 2300, 2305 comprises a plurality of lateral walls 2315, 2320, where at least one of the lateral walls 2315, 2320 and/or the filaments 2310, 2325 may have different widths 2330, different heights 2340, different diameters 2335, and/or different thicknesses (not shown). The plurality of polygonal laterally supported filament structures may comprise mixing-and-matching of different size and shape of filaments 2310, 2325 and lateral walls 2315, 2320. When incorporated into respective impact absorbing arrays of repeating elements and/or impact mitigation structures of similar design, these elements and/or impact structures would desirably perform equivalently in torsional and/or shear loading, with the second array (i.e., having the array having the second hexagonal elements and/or structures 2305) having greater resistance to deformation and/or buckling under axial compressive loading than the first array (having the first hexagonal or polygonal laterally supported filament structures 2300). In a similar manner, the thickness, dimensions and/or material composition of the lateral walls 2315, 2320 can have significant impact on the lateral and/or torsional response of the impact absorbing structure, with alterations in these structures desirably increasing, decreasing and/or otherwise altering the resistance of the impact structure and/or element's torsional and/or lateral loading response, while minimizing changes to the axial compression response. For example, one embodiment of a hexagonal and/or polygonal structure may have a tapered configuration. The hexagonal and/or polygonal structure can have a top surface and a bottom surface, with the bottom surface perimeter (and/or bottom surface thickness/diameter of the individual elements and/or impact structure) may be larger than the corresponding top surface perimeter (and/or individual element and/or impact structure thickness/diameter).

Figure 24:
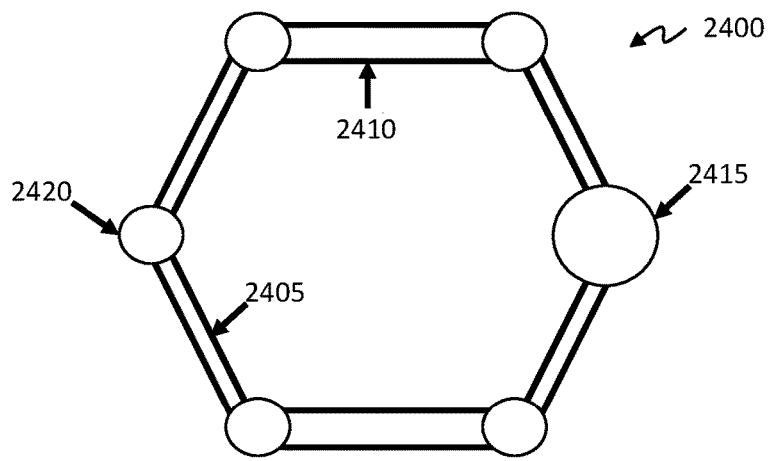
FIG. 24 depicts a top plan view of another embodiment of a hexagonal impact absorbing element incorporating lateral walls of differing thicknesses and different filament diameters in the same element.

If desired, the hexagonal and/or polygonal elements or structures of an impact absorbing array can include components of varying size, shape and/or material within a single element, such as filaments of different diameter and/or shape within a single element and/or within an array of repeating elements. For example, the orthotropic response of the polygonal structure and/or the hexagonal structure 2400 depicted in FIG. 24 can be altered by increasing the thickness of one set of lateral walls 2410, while incorporating thinner lateral walls 2405 in the remaining lateral walls, if desired. Furthermore, the orthotropic response of the polygonal structure and/or the hexagonal structure 2400 can be further altered by increasing the diameter of at least one filament 2415, while incorporating smaller diameter filaments 2420 in the remaining filaments, if desired. This can have the effect of "stiffening" the lateral and/or torsional response of the structure in one or more directions, while limiting changes to the axial response and/or controlling the axial response. As shown in FIG. 23B, a wide variety of structural features and dimensions, as well as material changes, can be utilized to "tune" or "tailor" the element to a desired performance, which could include in-plane and/or out-of-plane rotation of various hexagonal elements relative to the remainder of elements within an array.

Figure 25A:
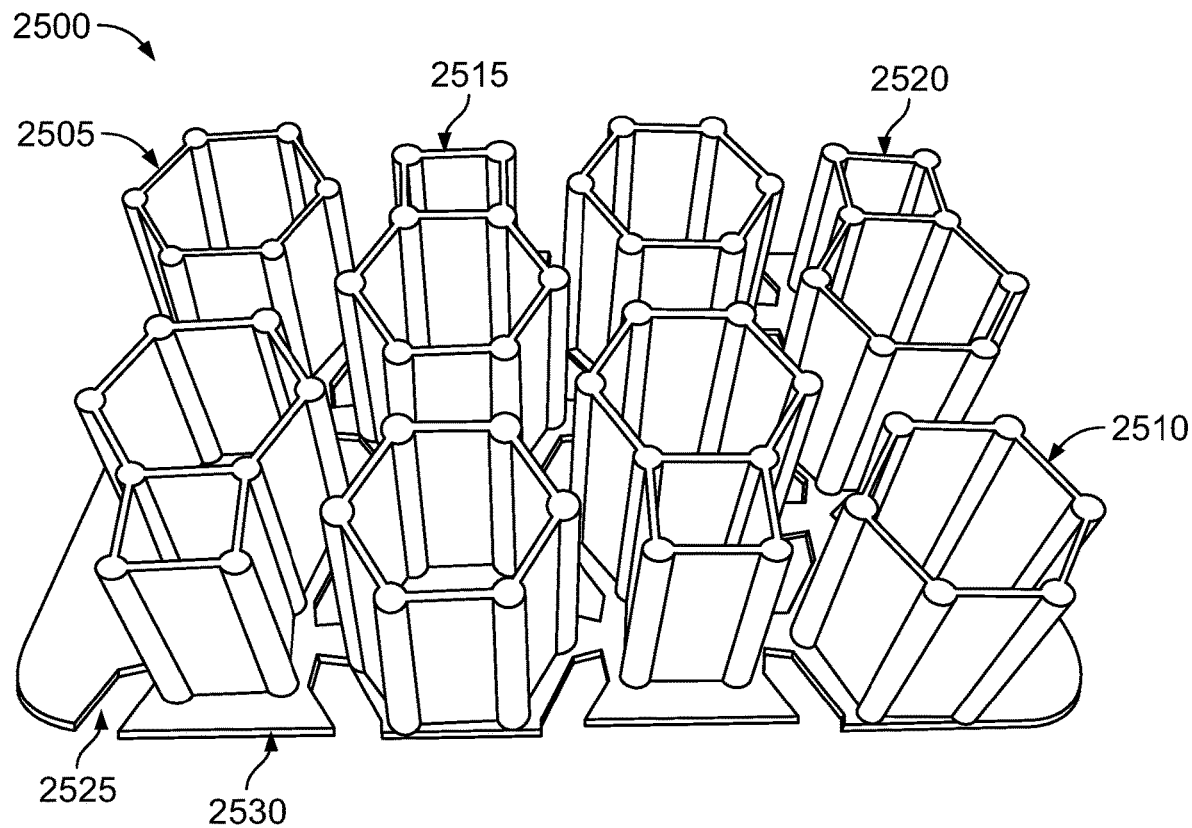
FIGS. 25A-25E depicts various isometric top and bottom plan views of different embodiments of polygonal impact absorbing arrays.
Figure 25B:
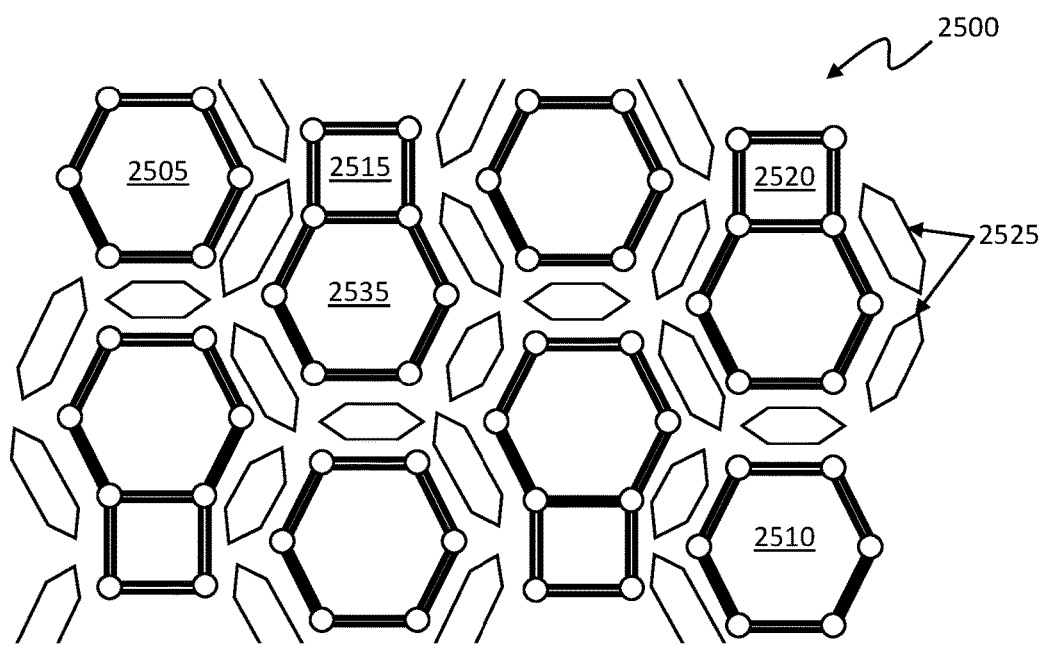
Figure 25C:
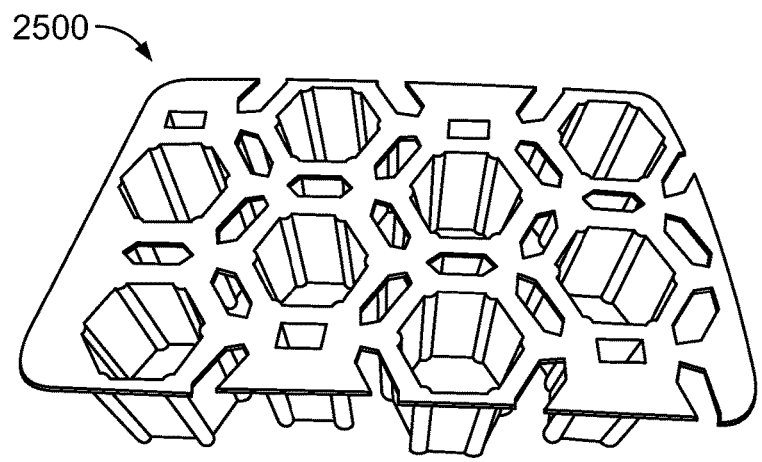

FIGS. 25A-25E depict various isometric and top views of alternate embodiments of impact absorbing structures comprising a plurality of polygonal laterally supported filament (LSF) structures. In various embodiments, one or more array elements and/or one or more polygonal LSF structures could comprise non-symmetrical open and/or closed polygonal structures, including polygonal structures of differing shapes and/or sizes in a single impact absorbing array. For example, FIGS. 25A-25C depict top and bottom perspective views of one embodiment of an impact absorbing structure that contains one or more different polygonal LSF structures 2500 in an array, which also incorporates closed polygonal elements, including hexagonal elements 2505 and 2510, and square elements 2515 and 2520. The impact mitigation layer may comprise a plurality of impact absorbing structures, the plurality of impact absorbing structures may comprise a plurality of polygonal LSF structures 2500 and a face sheet 2530.

The plurality of polygonal LSF structures 2500 is coupled to the face sheet 2530, the face sheet may include one or more perforations 2525. The one or more perforations 2525 increase flexibility to allow the plurality of polygonal LSF structures 2500 to conform to the curvature of a helmet and/or a wearer's head, as well as desirably reduce the weight of the face sheet 2530. These perforations 2525 may be positioned in a repeating pattern of similar size and/or shaped holes, or the perforations may comprise a variety of shapes, sizes and/or orientations in the face sheet 2530 of a single array. The perforated face sheet 2530 may be directly affixed to the product (e.g., helmet, footwear and protective clothing) or a thin-walled polycarbonate backsheet (not shown) may be additionally affixed to the perforated face sheet. Accordingly, the plurality of polygonal LSF structures 2500 may be affixed directly to the thin-walled polycarbonate backsheet (not shown). The perforated face sheet 2530 may have a back surface where the polycarbonate backsheet (not shown) may be affixed. The polycarbonate backsheet may improve load distribution throughout the hexagonal structures, may provide more comfort for direct contact with the wearer and/or may assist with a more uniform adherence to the product. The one or more perforations 2525 may comprise different shapes, including a circle and polygonal structures. The polygonal structures or shapes may comprise a triangle, a square, a rectangle, a pentagon, a hexagon, a heptagon, an octagon, a nonagon, a decagon, and/or any combination thereof.

FIG. 25B depicts a simplified top plan view of the array of FIG. 25A. If desired, the each of the plurality of polygonal LSF structures can be spaced apart and/or attached to each other at various locations, including proximate the peripheral edges of the array (which may allow for attachment of "stray elements" near the edges of the array, where a complete repeating pattern of a single polygonal element design may be difficult and/or impossible to achieve). In one embodiment, each of the plurality of polygonal LSF structures 2500 may be spaced apart 2505, 2510, where the filament or lateral walls are not shared. Alternatively, one or more the polygonal LSF structures 2500 may be coupled to together where at least one lateral wall and at least one filament is shared between one or more of the polygonal LSF structures 2515, 2535. Furthermore, the plurality of polygonal LSF structures 2500 may be in an offset pattern, where one or more polygonal LSF structures 2500 are not positioned parallel or co-linear with the adjacent one or more polygonal LSF structures 2500.

Figure 25D:
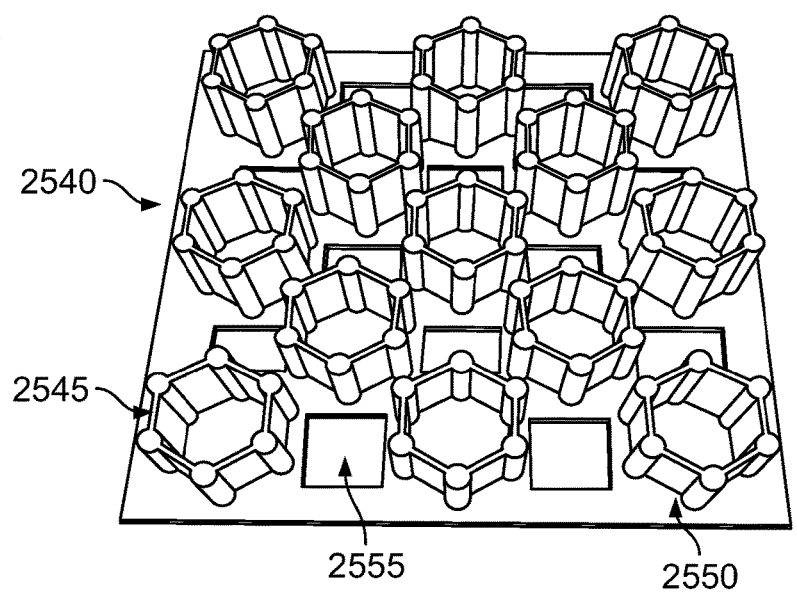
Figure 25E:
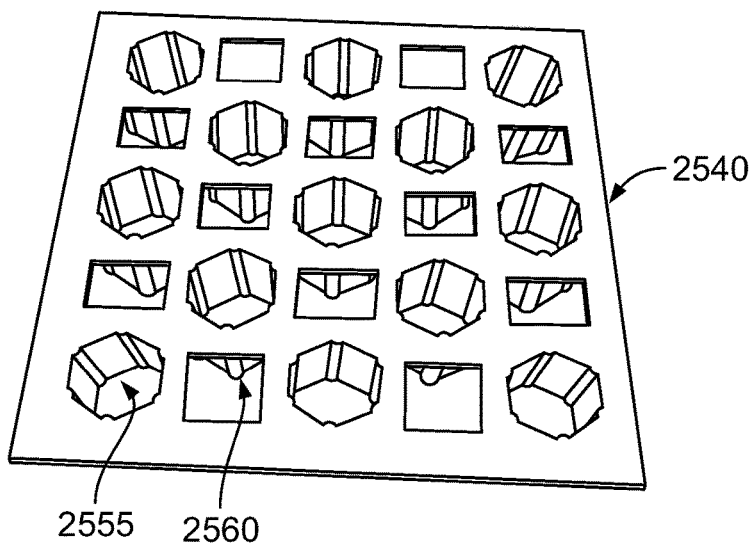

FIGS. 25D and 25E depict top and bottom perspective views of another alternative embodiment of a plurality of impact absorbing structures, the plurality of impact absorbing structures comprises a plurality of polygonal LSF structures 2540. The plurality of polygonal LSF structures 2540 may comprise a plurality of hexagonal LSF structures 2545, the plurality of hexagonal LSF structures 2545 connected to a lower face sheet 2550, wherein the lower face sheet 2550 comprises one or more perforations 2555. The lower face sheet 2550 is perforated by generally hexagonal shaped openings 2560 underneath the hexagonal LSF structures 2555 and square shapes perforations 2560 positioned between the hexagonal LSF structures 2545. The polygonal structures or shapes may comprise a triangle, a square, a rectangle, a pentagon, a hexagon, a heptagon, an octagon, a nonagon, a decagon, and/or any combination thereof.

Figure 25F:
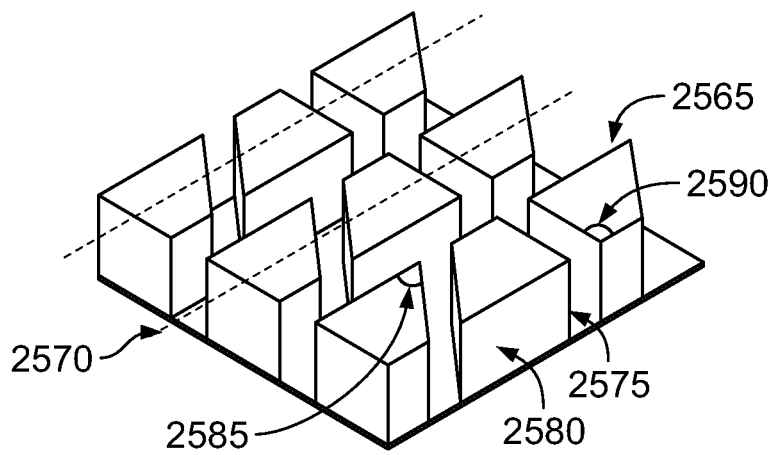
FIGS. 25F-25H depicts various isometric top plan views of different embodiments of polygonal impact absorbing arrays.
Figure 25G:
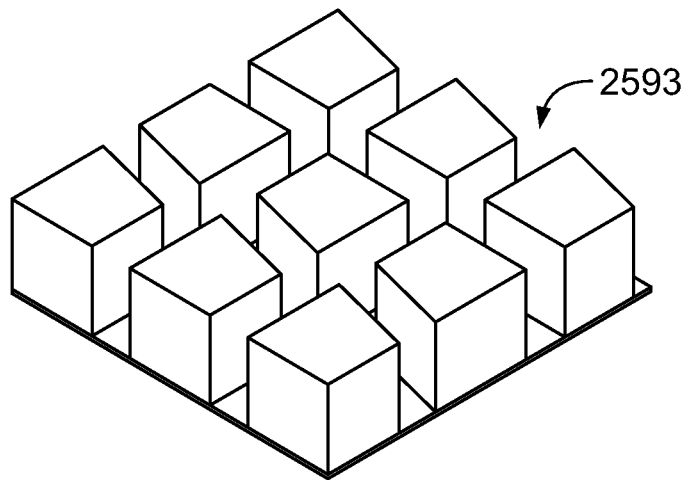
Figure 25H:
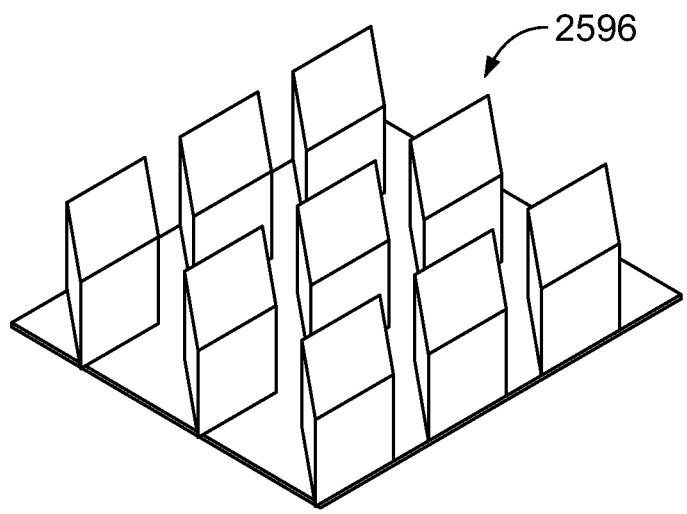

FIGS. 25F-25G depict isometric views of other alternative embodiments of a plurality of impact absorbing structures, the plurality of impact absorbing structures comprises a plurality of polygonal LSF structures 2565, 2593, 2596. In one embodiment, the polygonal LSF structures 2565 may comprise a plurality of irregular polygons. The plurality of polygonal LSF structures 2565 may be spaced apart from the adjacent plurality of polygonal LSF structure 2565 and aligned in a parallel or co-linear arrangement 2570 as shown in FIG. 25F. The plurality of polygonal LSF structures 2565 may comprise a plurality of filaments 2575, and a plurality of lateral walls 2580. The plurality of filaments 2575 are positioned to an adjacent plurality filaments 2575 to form a shape, the plurality of lateral walls 2580 are coupled to the plurality of filaments 2575 and to the adjacent plurality of filaments 2575, where the plurality of lateral walls 2580 may comprise at least one interior angle of 50 degrees 2585, and the other interior angles may be 75 degrees to 135 degrees 2590. Alternatively, the plurality of filaments 2575 are positioned to an adjacent plurality filaments 2575 to form a shape, the plurality of lateral walls 2580 couple the plurality of filaments 2575 to the adjacent plurality of filaments 2575, where the plurality of lateral walls 2580 may comprise at least one interior angle of 75 degrees, and the other interior angles may be 75 degrees to 135 degrees (see FIG. 25G). Furthermore, in an alternate embodiment, all interior angles may be at 50 degrees (see FIG. 25H).

Figure 26A:
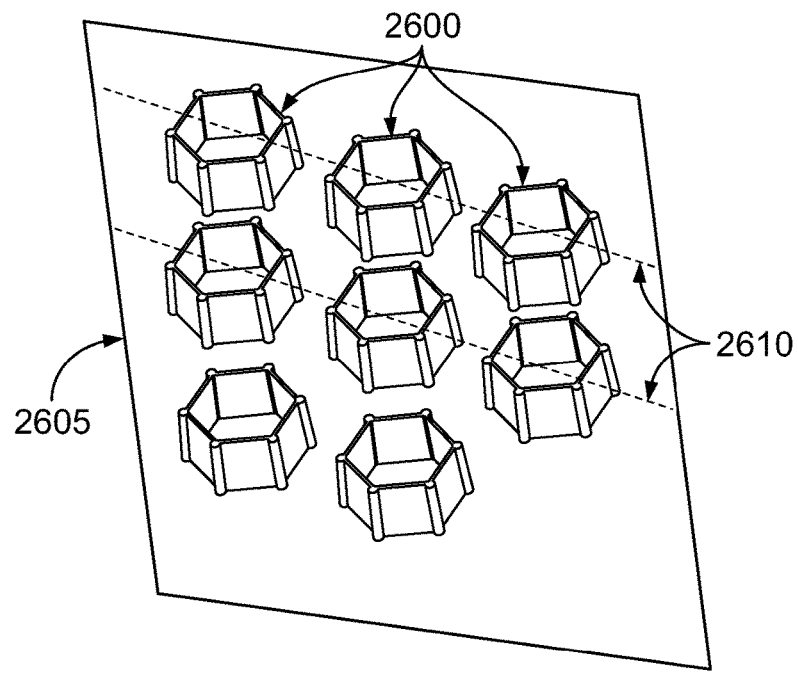
FIG. 26A depicts an alternative embodiment of an impact absorbing array comprising a plurality of hexagonal elements in a generally repeating symmetrical arrangement.
Figure 26B:
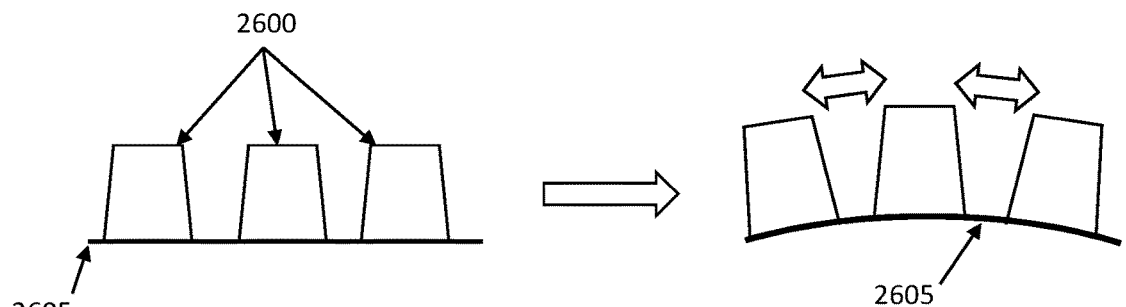
FIGS. 26B-26D depicts how elements of the impact absorbing array of FIG. 26A can be redistributed to accommodate bending of the lower face sheet.

FIG. 26A depicts an exemplary impact mitigation layer comprising a plurality of impact absorbing structures, the plurality of impact absorbing structures comprising a plurality of hexagonal elements 2600 in a generally repeating symmetrical arrangement 2610. In this embodiment, the elements 2600 are connected to each other by a lower face sheet 2605, the lower face sheet 2605 may comprise one or more perforations (not shown), which the one or more perforations (not shown) may comprise a pierced or "lace-like" lower face sheet, if desired. Alternatively, the impact mitigation layer may comprise a plurality of impact absorbing structures and a lower face sheet 2605. Accordingly, the impact mitigation layer may comprise a plurality of impact absorbing structures, a lower face sheet 2605 and an upper face sheet (not shown). An upper portion of each of the elements 2600 in this embodiment may desirably be connected by an upper face sheet (not shown), which consequently allows the lower face sheet 2610 (and thus the array) to easily be bent, twisted and/or otherwise shaped or "flexed" to follow a hemispherical or curved shape (See FIG. 26B), including an ability to deform the lower sheet and associated array elements around corners and/or edges or other complex surfaces, if desired. In this manner, the array elements can be manufactured in sheet form, if desired, and then the array sheet can be manipulated to conform to a desired shape (i.e., the hemispherical interior of an athletic or military helmet, for example) without significantly affecting the shape and/or impact absorbing performance of the hexagonal elements therein. In some embodiments, the lower face sheet may curve smoothly, while in other embodiments the lower face sheet may curve and/or flex primarily at locations between hexagonal or other elements, while maintaining a relatively flat profile underneath the individual polygonal elements or structures.

Figure 26C:
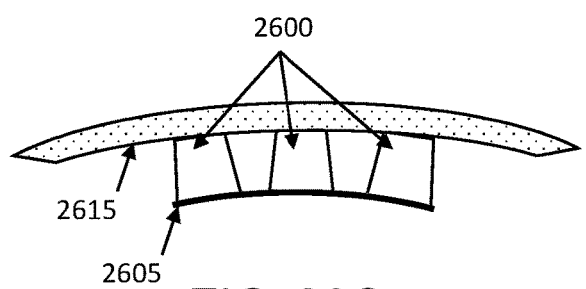
Figure 26D:
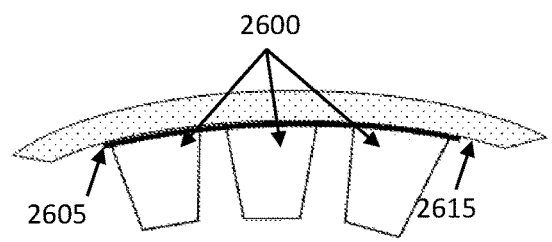

FIGS. 26C-26D illustrate a plurality of polygonal LSF structures 2600 in different positions and/or affixations arrangements with respect to a contact surface 2615. FIG. 26C depicts one embodiment of how flexing or bending of a flat array can result in repositioning of the polygonal elements relative to an external contact surface 2615. The external contact surface 2516 may comprise an inner shell, and outer shell, a fabric, a material, a polymer (e.g., a polycarbonate plate), and/or any combination thereof. For example, FIG. 26C shows that upward flexing of the center of the flat array (to match the curved inner surface of the helmet) can cause the upper ends of the individual elements to separate to some degree, which may affect the response of the array to incident forces on the helmet. In contrast, FIG. 26D depicts the same array with the center of the array flexed in an opposing direction, which brings the upper ends of the individual elements in closer proximity to each other, which can alter the response of the array to incident forces on the helmet as compared to that of FIG. 26C.

In various alternative embodiments, an upper face sheet can be connected to the upper portion of the elements, and/or the impact absorbing structures, if desired. In such arrangements, the upper face sheet could comprise a substantially flexible material that allows flexing of the array in a desired manner, or the upper face sheet could be a more rigid material that is attached to the array after flexing and/or other manipulation of the lower face sheet and associated elements has occurred, thereby allowing the array to be manufactured in a flat-sheet configuration.

Figure 27A:
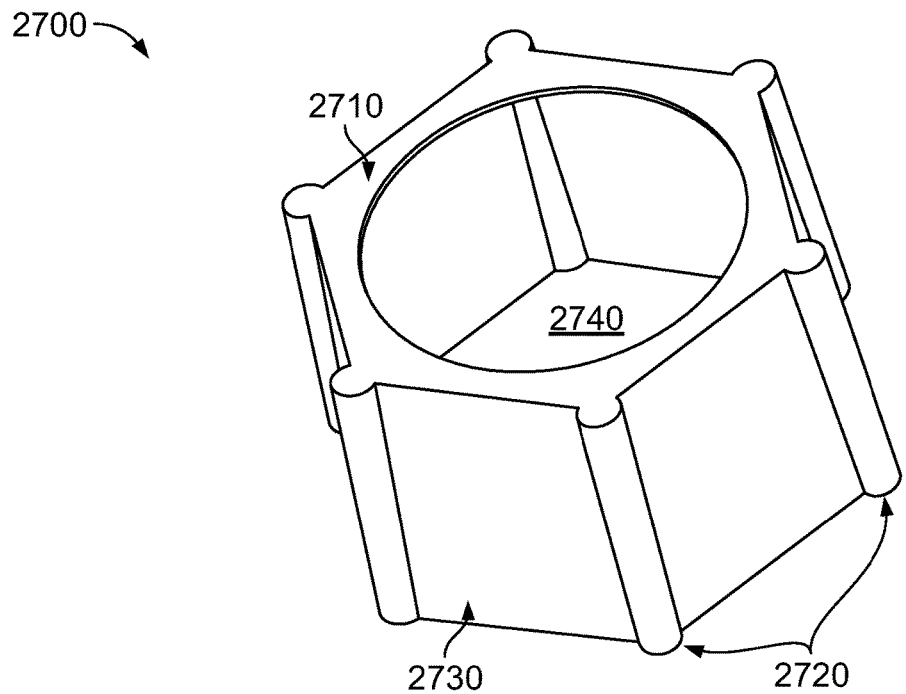
FIG. 27A depicts a perspective view of another alternative embodiment of a hexagonal impact absorbing structure which incorporates an upper ridge feature.
Figure 27B:
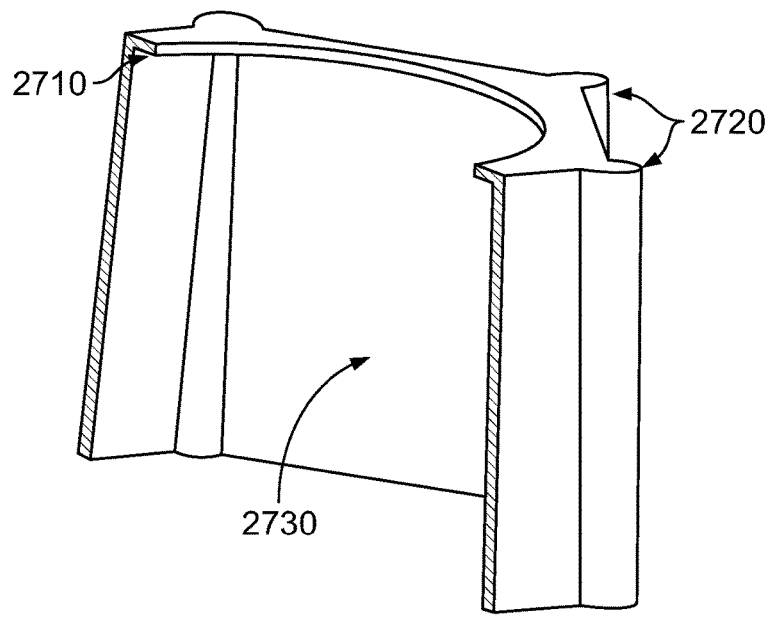
FIG. 27B depicts a cross-sectional view of the hexagonal impact absorbing structure of FIG. 27A.

FIGS. 27A and 27B depict perspective and cross-sectional views of one alternative embodiment of a hexagonal impact absorbing structure 2700. One or more of the polygonal and/or hexagonal impact absorbing LSF structure 2700 comprises a plurality of filaments 2720, a plurality of lateral walls 2730, and an upper ridge 2710. Each of the plurality of filaments 2720 having an upper end and a lower end, the upper ridge 2710 being coupled to upper end of each of the plurality of filaments 2720. Accordingly, each of the plurality of lateral walls 2730 may comprise an upper end and a lower end, the upper ridge 2710 being connected to the upper ends of the lateral walls 2730 and the upper end of each of the plurality of filaments 2720. In this embodiment, the upper ridge 2710 includes an opening or perforated central section 2740, the opening 2740 can be formed in a variety of opening shapes and/or configurations, including circular, oval, triangular, square, pentagonal, hexagonal, septagonal, octagonal and/or any other shape, including shapes that mimic or approximate the shape of the polygonal element. Also, the opening 2740 may be sized and configured to receive a connecting mechanism 2820 (see FIG. 28A). The upper ridge 2710 extending laterally or perpendicularly away from the upper end of each of the plurality of filaments 2720 and/or the upper end of each of the plurality of lateral walls 2730. In other alternative embodiments, the upper ridge could comprise a continuous sheet that covers the entirety of the upper surface of the element, or could include a plurality of perforations or holes (i.e., a perforated regular or irregular lattice and/or lace-like structure).

One significant advantage of incorporating an upper ridge 2710 into the hexagon impact absorbing LSF structure 2700 is a potential increase in the "stiffness" and rebound force/speed of the hexagon element and/or hexagon impact absorbing LSF structure 2700 as compared to the open elements of FIG. 26A. The addition of the upper ridge 2710 can, in various configurations, function in some ways similar to an upper face sheet attached to the element, in that the upper ridge 2710 can constrain movement of the upper end of the filaments 2720 in various ways, and also serve to stiffen the lateral walls 2730 to some degree. This can have the desired effect of altering the response of the element and/or polygonal LSF structure to lateral and/or torsional loading, with various opening sizes, configurations and sheet thickness having varying effect on the lateral and/or torsional response. Moreover, the addition of the upper ridge 2710 can increase the speed and/or intensity at which the element and/or polygonal LSF structure (and/or components thereof) "rebounds" from a compressed, buckled and/or collapsed state, which can improve the speed at which the array can accommodate repeated impacts. In addition, the incorporation of the upper ridge 2710 can reduce stress concentrations that may be inherent in the various component connections during loading, including reducing the opportunity for plastic flow and/or cracking/fracture of component materials during impacts and/or repetitive loading.

Figure 28A:
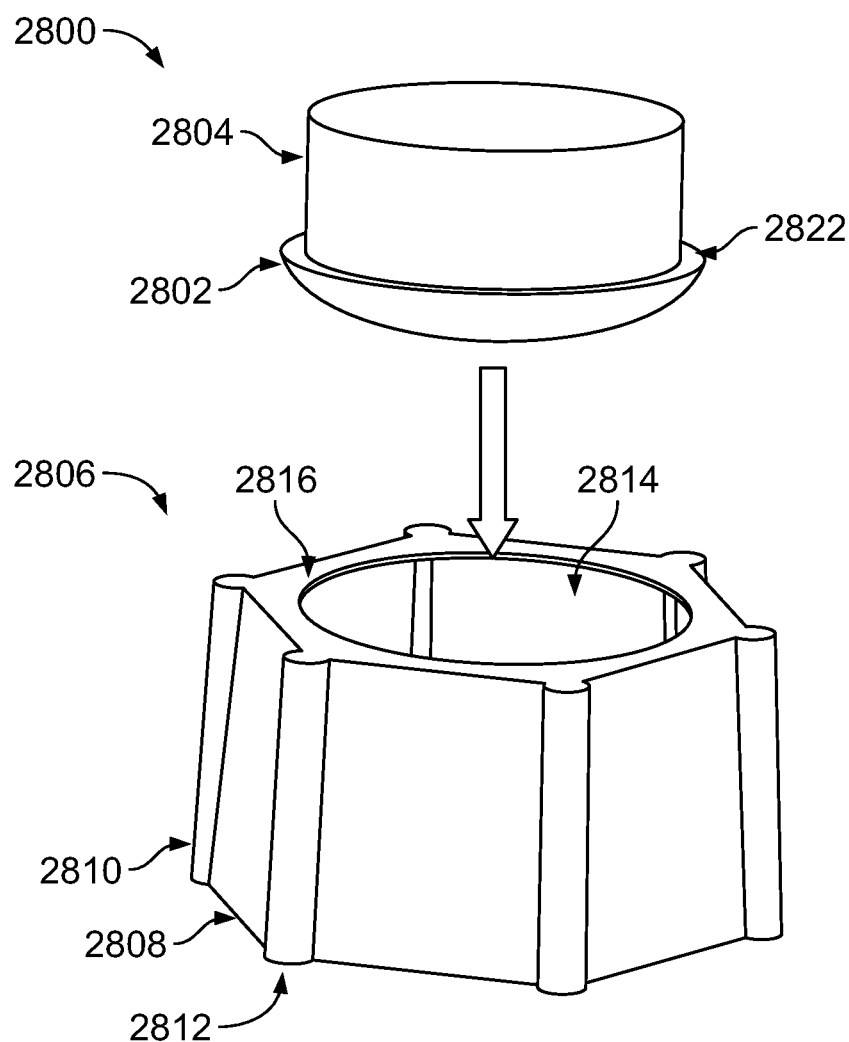
FIG. 28A depicts an engagement insert, grommet or plug for insertion into the hexagonal element of FIG. 27A.
Figure 28B:
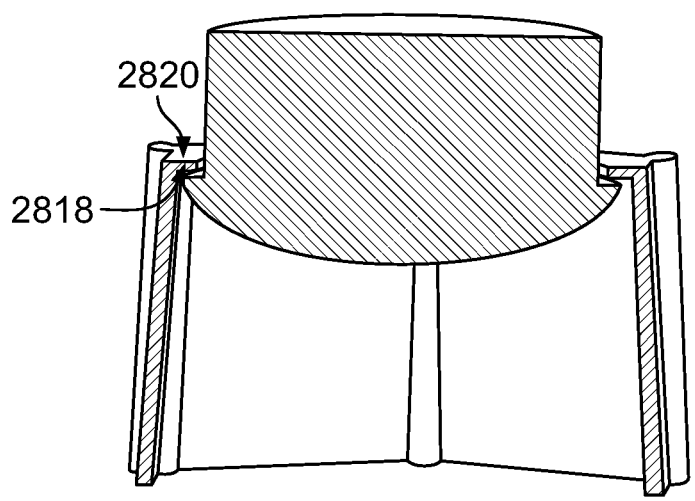
FIG. 28B depicts the insert of FIG. 28A engaged with the hexagonal element of FIG. 27A.

FIGS. 28A-28B depict a side view and a cross-sectional side view of an alternate embodiment of a polygonal LSF structure 2806. The impact mitigation layer may comprise a plurality of impact absorbing structures, the plurality of impact absorbing structures may comprise a plurality of polygonal LSF structures 2806 and at least one connection mechanism 2800. The plurality of polygonal LSF structures 2806 having a plurality of filaments 2810 and a plurality of lateral walls 2808, each of the plurality of filaments 2810 are positioned to an adjacent filament 2812 to form a polygonal shape. Each of the plurality of lateral walls 2808 couple each of the plurality of filaments 2810 to the adjacent filament 2810. Each of the plurality of polygonal LSF structures 2806 are spaced apart from an adjacent each of the plurality of polygonal LSF structures. At least one of the plurality of polygonal LSF structures 2806 may comprise an upper ridge 2816. The plurality of filaments 2810 having a first end and a second end, and the lateral walls 2808 having a first end and a second end. The upper ridge 2816 may be coupled to the first end of the plurality of filaments 2810 and the first end of the plurality of lateral walls 2808. The upper ridge 2816 having at least one opening 2814. The at least one opening 2814 is sized and configured to match or substantially match a lower portion 2804 of the connection mechanism 2806. The incorporation of the upper ridge 2616 can also facilitate connection of the upper end of the element to another structure, such as an inner surface of a helmet or other item of protective clothing. Upper ridge 2800 may have an external surface 2820 and an internal surface 2818. The polygonal structures or shapes may comprise a triangle, a square, a rectangle, a pentagon, a hexagon, a heptagon, an octagon, a nonagon, a decagon, and/or any combination thereof.

The connection mechanism 2806 may comprise an insert, grommet or plug having an upper portion 2802 and a lower portion 2804. The upper portion 2802 having a larger diameter or width than the lower portion 2802. The upper portion 2802 is desirably slightly larger than the at least one opening 2814, the upper portion 2802 comprising at mating surface 2822 that abuts or mates with the internal surface 2818 of the upper ridge 2800. The connection mechanism 2806 will get inserted through the at least one opening 2814 of the upper ridge 2840 of the polygonal LSF structure 2806. The upper portion 2802 of the connection mechanism 2806 having radiused or beveled edges and/or comprising a material sufficiently flexible to permit the upper portion 2802 to be easily inserted through the at least one opening 2814 and to deform slightly. Then, once the upper portion 2802 is through the at least one opening 2814, the connection mechanism 2822 will be pulled upwards to allow the mating surface 2822 of the upper portion 2802 to engage the internal surface 2818 of the ridge 2816, which desirably retains the upper portion 2802 of the connection mechanism 2800 within the polygonal LSF structure 2806. Ultimately, the connection mechanism 2800 lower portion 2804 may desirably be attached or secured to some other item such as the inner surface of the outer shell, and/or or external surface of an inner shell. If desired, the internal surface 2818 of the ridge 2816 and/or the engaging/mating surface 2822 of the upper portion 2802 could include a flat and/or saw-tooth configuration, for greater retention force. In various embodiments, the connection mechanism 2800 may be connected to the helmet or other item with an adjustable and/or sliding connector (not shown), for greater flexibility and/or comfort for the wearer.

Figure 28C:
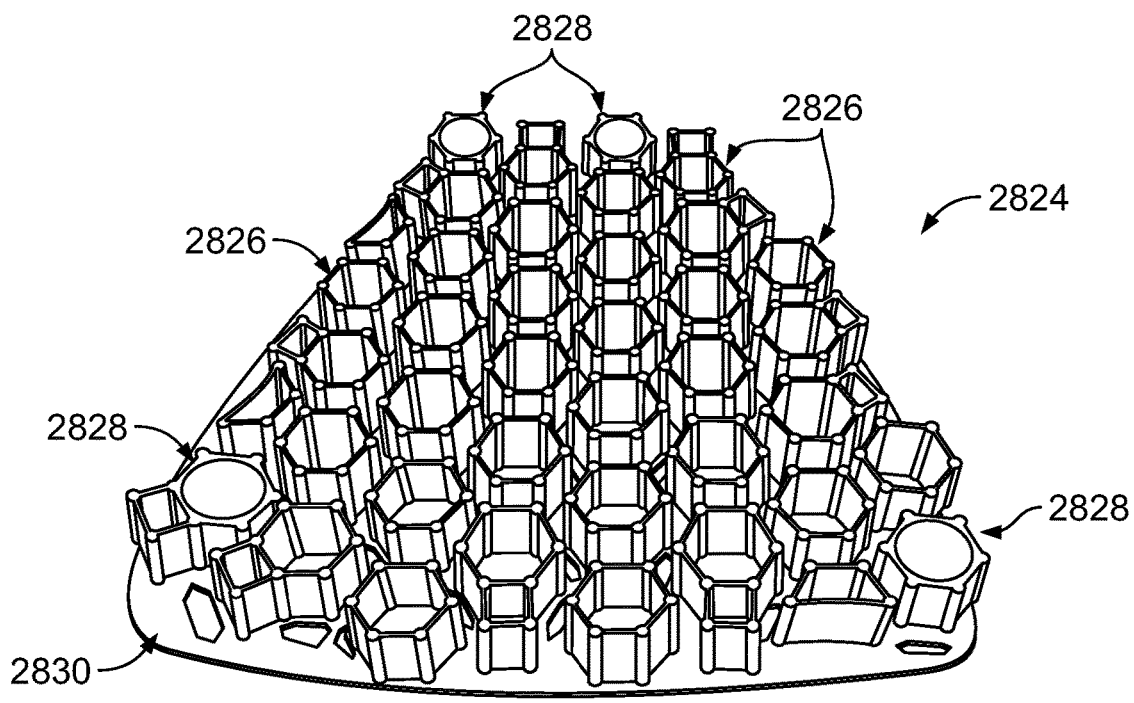
FIGS. 28C-28F depicts various alternative embodiments of impact absorbing arrays incorporating hexagonal elements with integral engagement features.
Figure 28D:
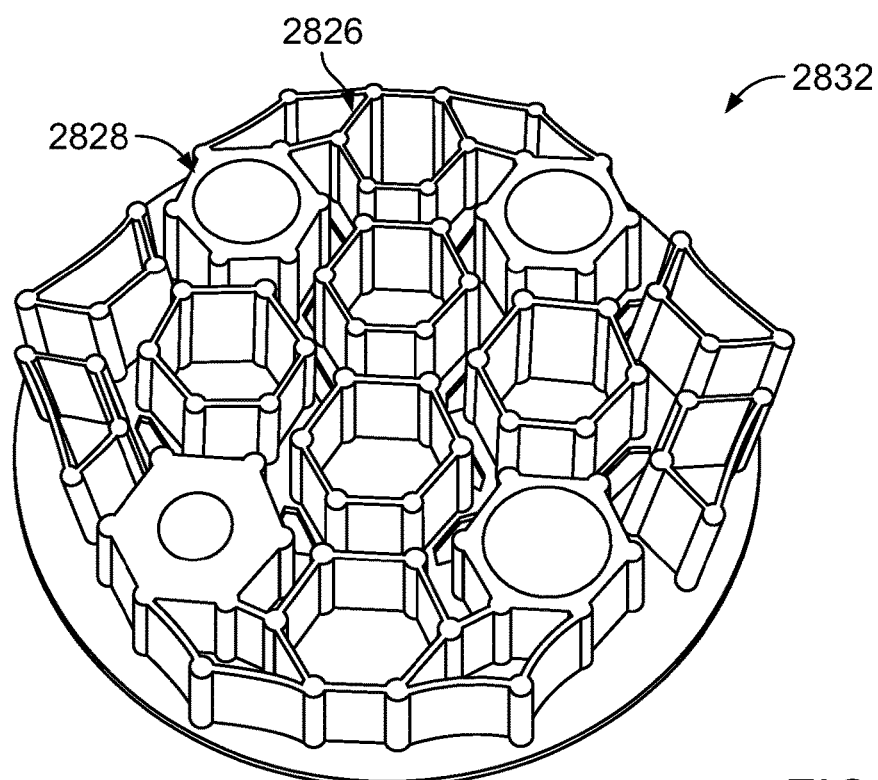
Figure 28E:
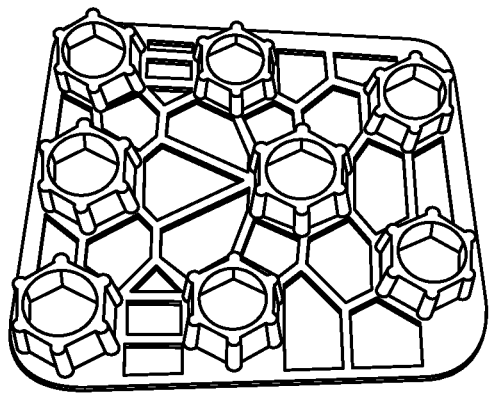
Figure 28F:
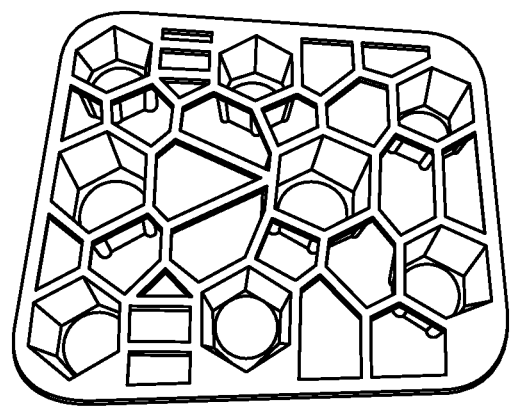

FIGS. 28C and 28D depict alternative impact absorbing array 2824, 2832 that comprises a plurality of hexagonal and/or polygonal LSF structures 2826, 2828. Each of the plurality of polygonal LSF structures 2826, 2828 are spaced apart to an adjacent polygonal LSF structure, each of the plurality of polygonal LSF structures may be coupled to a face sheet 2830. The plurality of polygonal LSF structures 2826, 2828 comprise polygonal LSF structures without ridges 2826 and polygonal LSF structures with ridges 2828. Each of these polygonal LSF structures with ridges 2828 may desirably be engaged with connection mechanisms 2800 for securement to other items. While various embodiments are depicted with the engaging elements proximate to a periphery of the array, it should also be understood that the engaging elements could similarly be incorporated throughout the array in various locations (see FIG. 28D), including the use of such elements in the center and/or throughout the entirety of the array. For example, FIGS. 28E and 28F depict an impact absorbing array comprising eight irregularly spaced hexagonal elements, with all of the hexagonal elements including an upper ridge that could permit the element to be utilized as an engaging element. If desired, 1, 2, 3, 4, 5, 6, 7 or all 8 of the depicted elements could be engaged to corresponding inserts, grommets or plugs (not shown) for securing the array in a desired location and/or orientation.

In various alternative embodiments, composite impact absorbing arrays could be constructed that incorporate various layers of materials, including one or more impact absorbing array layers incorporating closed and/or open polygonal element layers and/or another lateral wall supports. Desirably, composite impact absorbing arrays could be utilized to replace and/or retrofit existing impact absorbing layer materials in helmets and/or other articles of protective clothing, as well as for non-protective clothing uses including, but not limited to, floor mats, shock absorbing or ballistic blankets, armor panels, packing materials and/or surface treatments. In many cases, impact absorbing arrays such as described herein can be designed to provide superior impact absorbing performance to an equivalent or lesser thickness of foam or other cushioning materials being currently utilized in impact absorbing applications. Where existing impact absorbing materials can be removed from an existing item (a military or sports helmet, for example), one or more replacement impact absorbing arrays and/or composite arrays, such as those described herein, can be designed and retro-fitted in place of the removed material(s), desirably improving the protective performance of the item.

Depending upon layer design, material selections and required performance characteristics, impact absorbing arrays incorporating closed and/or open polygonal element layers and/or other lateral wall supports such as described herein can often be designed to incorporate a lower offset (i.e., a lesser thickness) than a layer of foam or other impact absorbing materials providing some equivalence in performance. This reduction in thickness has the added benefit of allowing for the incorporation of additional thicknesses of cushioning or other materials in a retrofit and/or replacement activity, such as the incorporation of a thin layer of comfort foam or other material bonded or otherwise positioned adjacent to the replacement impact absorbing array layer(s), with the comfort foam in contact with the wearer's body. Where existing materials are being replaced on an item (i.e., retrofitted to a helmet or other protective clothing item), this could result in greatly improved impact absorbing performance of the item, improvement in wearer comfort and potentially a reduction in item weight. Alternatively, where a new item is being designed, the incorporation of the disclosed impact absorbing array layer(s) can allow the new item to be smaller and/or lighter that its prior counterpart, often with a concurrent improvement in performance and/or durability.

Figure 28G:
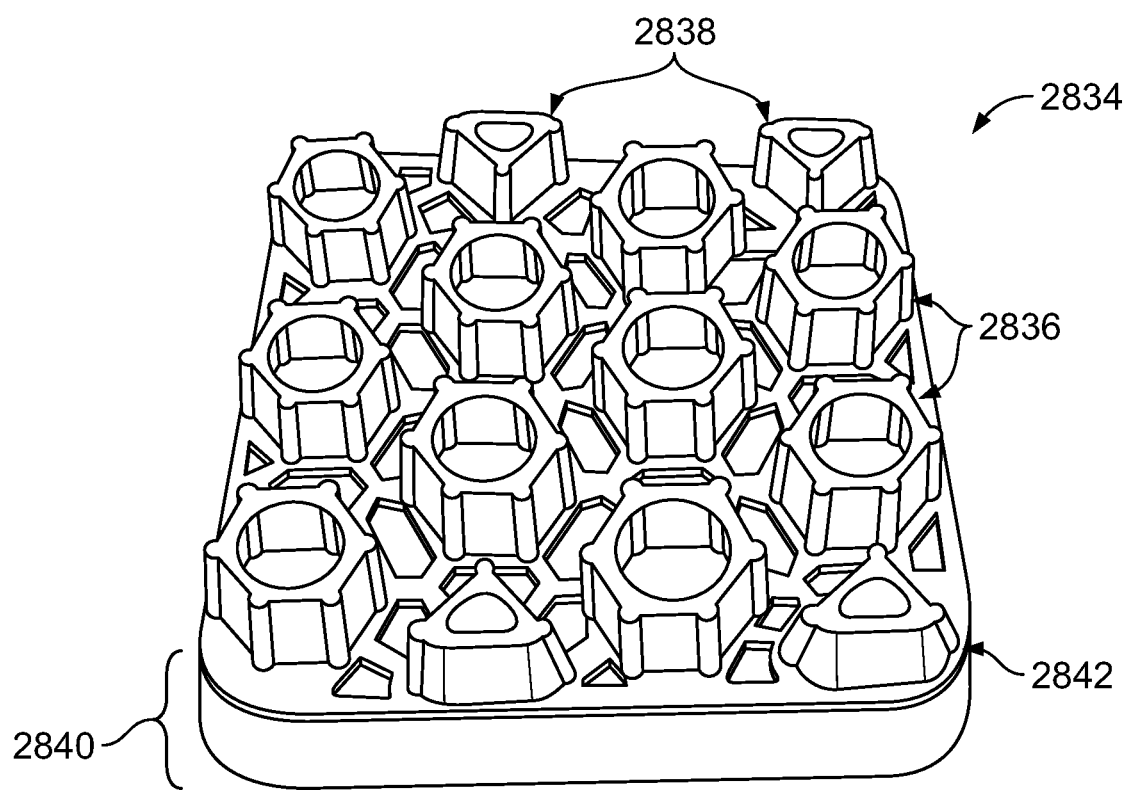
FIGS. 28G-28H depict isometric top and side views of another alternative embodiment of an impact absorbing array comprising polygonal LSF impact absorbing structures.
Figure 28H:
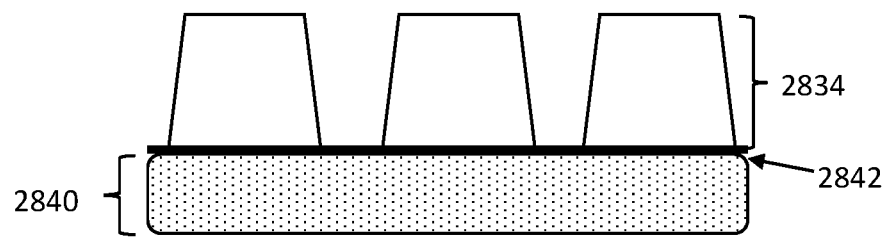

FIG. 28G-28H depicts an isometric and side view of another alternative embodiment of an impact absorbing array or "composite" array 2834. The impact absorbing array 2834 comprises a plurality of polygonal LSF structures 2836, 2838 and a face sheet 2844. The impact absorbing array 2834 may further comprise a foam layer 2840. The plurality of impact absorbing polygonal LSF structures 2836, 2838 may comprise a triangle, a square, a rectangle, a pentagon, a hexagon, a heptagon, an octagon, a nonagon, a decagon, and/or any combination thereof. The plurality of impact absorbing polygonal LSF structures 2836, 2838 are coupled to the face sheet 2842. The plurality of impact absorbing structures 2834 may be positioned in an array comprising fourteen regularly-spaced elements, 10 of which are hexagonal and 4 of which are approximately triangular elements, with all of the depicted elements including an upper ridge structure that could permit the element to be utilized as an engaging element. As depicted, the hexagonal and triangular elements each desirably utilize a different design, size, shape and/or other arrangements of plugs (not shown). If both differing plug types were utilized on a helmet or other protective garment, then the array for attachment thereto might need to be properly oriented and/or positioned relative to the plugs before attachment could be accomplished, which could ensure proper placement and/or orientation of the array in a desired location of a helmet or other item of clothing which corresponds to the different plugs for the triangular and hexagonal elements.

Figure 28I:
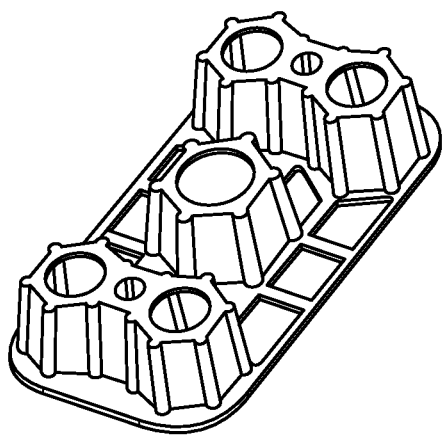
FIGS. 28I-28J depict isometric views of another alternative of an impact absorbing array comprising polygonal LSF impact absorbing structures.
Figure 28J:
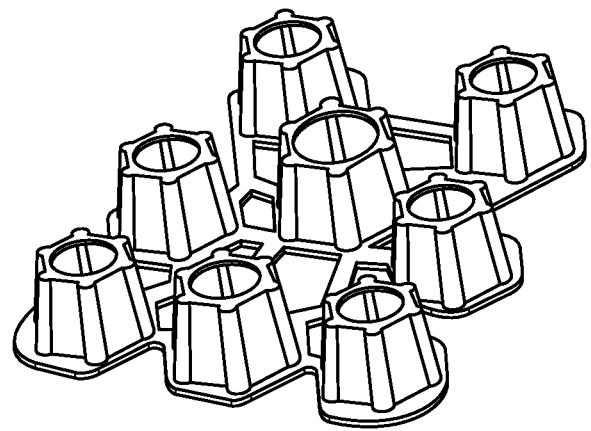

The lower face sheet 2842 may in turn secured to a foam layer 2840, which the foam layer 2840 may comprise a wide variety of foams or other materials. In the disclosed embodiment, the foam layer 2840 can comprise an open or closed cell "memory" foam, which is often utilized to contact a wearer's body to increase comfort, wearability and/or breathability of the impact absorbing array. The foam layer 2840 may be coupled to outer shell, an inner shell, a fabric, and/or any material used for protective gear/clothing. In use, the composite array 2834 can be inserted into a desired item of protective clothing, such as into the interior of a helmet, with the array facing towards and/or away from the wearer's body, depending upon design and user preference. If desired, the impact absorbing array 2834 and/or foam layer 2840 could be covered, encased and/or layered with a durable, lightweight, thin fabric (not shown). The fabric may be constructed as a fully integrated component of the array or could be removable and/or washable. The fabric may form a pouch allow the impact absorbing array 2834 and the foam layer 2840 to be inserted or disposed within the pouch. FIGS. 28I-28J depict an isometric view of an alternate embodiment of polygonal LSF impact absorbing structures.

Figure 29:
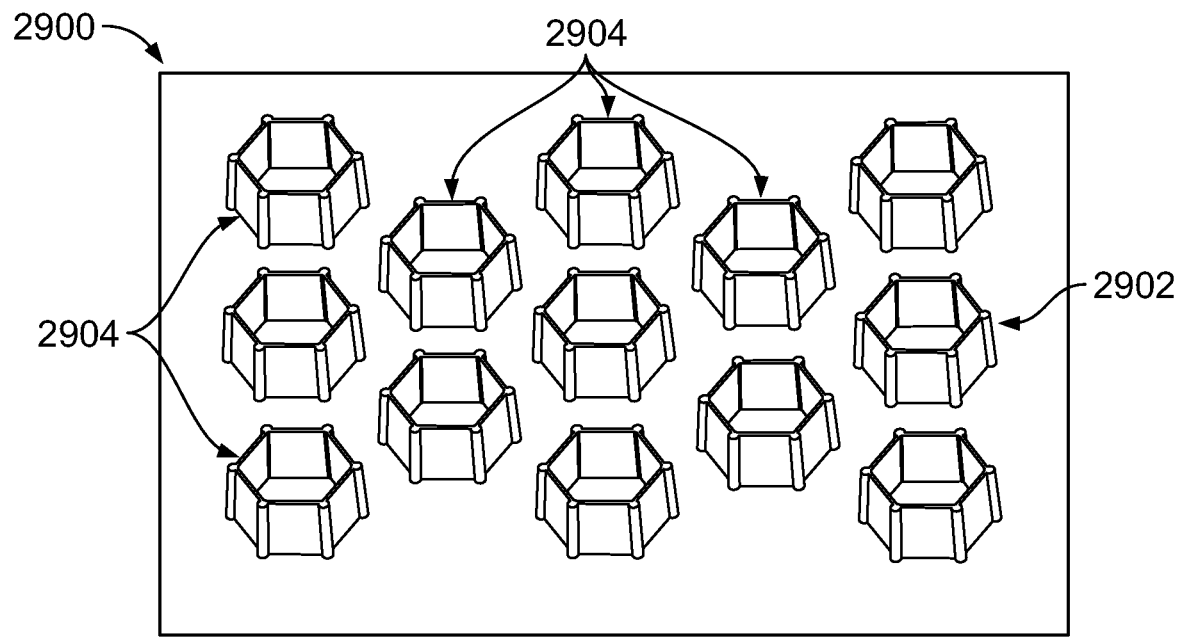
FIG. 29 is a simplified top perspective view of one embodiment of impact absorbing structures and lower face sheet.

FIG. 29 depicts an isometric view of another exemplary embodiment of an impact absorbing array 2900. The impact absorbing array 2900 comprises a plurality of polygonal LSF impact absorbing structures 2904, and a face sheet 2902. The plurality of polygonal LSF impact absorbing structures 2902 may be coupled to the face sheet 2904. The coupling may occur in an offset or straight set pattern. The straight set patterns are polygonal LSF structures are positioned co-linearly, which each row of a plurality of polygonal LSF structures are in parallel rows. The offset pattern comprises at least a first plurality of polygonal LSF structures that are co-linear, and a second set of second plurality of polygonal LSF structures that are co-linear, the first set of plurality of polygonal LSF structures are offset by at least one-half width of a polygonal LSF structure to the second set of plurality of polygonal LSF structures.

In various embodiments, the patterns of element placement and spacing of elements could vary widely, including the use of regular and/or irregular spacing or element placement, as well as higher and/or lower densities of elements in particular locations no a given array. For a given element design, size and/or orientation, the different patterns and/or spacing of the elements will often significantly affect the impact absorption qualities and/or impact response of the array, which provides the array designer with an additional set of configurable qualities for tuning and/or tailoring the array design such that a desired impact performance is obtained (or optimized) from an array which is sized and configured to fit within an available space, such as between a helmet and a wearer's head.

Figure 30A:
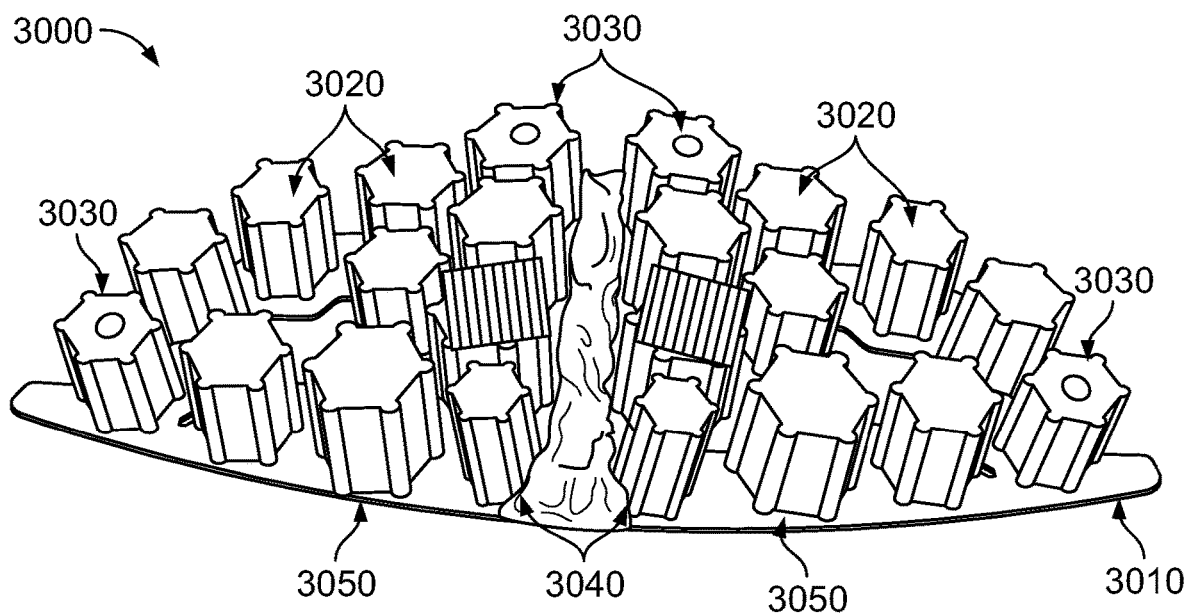
FIG. 30A depicts another alternative embodiment of an impact absorbing array incorporating some hexagonal elements having completely closed or sheet-like upper ridges.
Figure 30B:
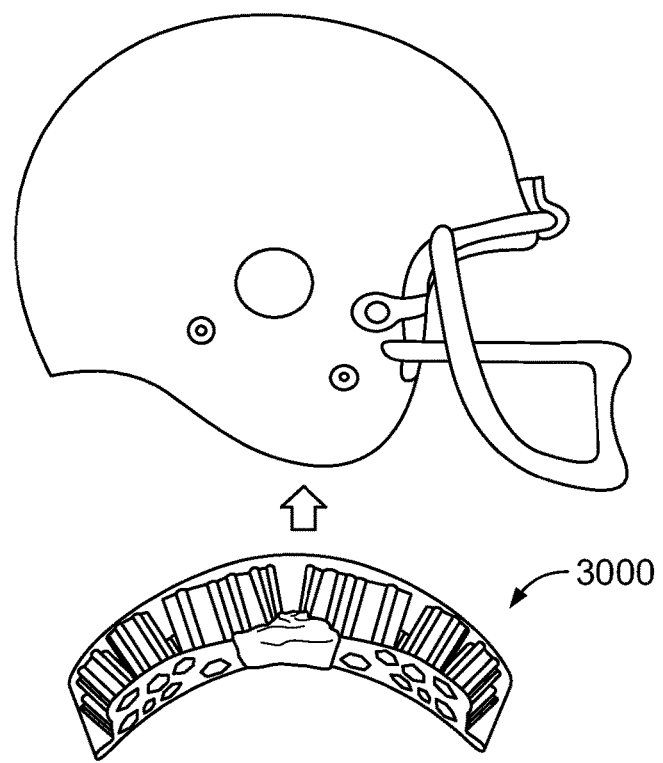
FIG. 30B depicts placement of the impact absorbing array of FIG. 30A into a helmet or other protective clothing, with the array flexed to accommodate a curved inner helmet surface.

FIG. 30A-30B depict a front perspective view and a side view of an alternate embodiment of an impact absorbing array 3000. The impact absorbing array 3000 comprises a plurality of impact absorbing structures, the plurality of impact absorbing structures comprising a plurality of polygonal and/or hexagonal impact absorbing LSF structures 3020 and a face sheet 3010. At least one of the pluralities of polygonal and/or hexagonal LSF structures 3020 having an upper ridge 3020, the upper ridge 3020 being coupled to a first end of the polygonal impact absorbing LSF structure 3020 and the upper ridge 3020 extending laterally or perpendicularly covering a first end of the polygonal impact absorbing structure 3020. The upper ridge 3020 comprising a sheet-like shape or lid. Desirably, this array can be manufactured in a generally flat configuration (i.e., by using injection molding, extrusion and/or casting techniques), and then the lower face sheet 3010 can be flexed or curved (see FIG. 30B) to accommodate a curved contact surface such as the interior of a helmet or other article of clothing. A first impact absorbing array may abut or contact the second impact absorbing array to create a seam (not shown) at the first face sheet 3010 and a second face sheet 3050. The first impact absorbing array and the second impact absorbing array may be coupled with a connection mechanism 3040. The connection mechanism 3040 may comprise a flexible material, glue, stitching, welding, etc.

The embodiment of FIG. 30A also depicts hexagonal elements of differing sizes incorporated into a single array, with a pair of smaller hexagonal elements 3040 proximate to a central region of the array, with larger hexagonal elements 3050 adjacent thereto. Such smaller elements can be designed to have some similar response to impact forces as the surrounding larger elements or can provide differing responses. In this embodiment, the smaller elements 3040 desirably have a higher filament density (i.e., the filaments are closer together), which can provide a greater axial impact response, but with smaller walls which reduces the response to lateral and/or torsional loading. The smaller elements 3040 can also fit into a smaller space in the array, such as proximate to the lower edge.

In various embodiments, an array can be designed that incorporates open and/or closed polygonal elements of different heights or offsets in individual elements within a single array. Such designs could be particularly useful when replacing and/or retrofitting an existing helmet or other item of protective clothing, in that the impact absorbing array might be able to accommodate variations in the height of the space available for the replacement array. In such a case, the lower face sheet of the replacement array might be formed into a relatively flat, uniform surface, with the upper ends of the hexagonal elements therein having greater or lesser offsets, with longer elements desirably fitting into deeper voids in the inner surface of the helmet. When assembled with the helmet, the lower face sheet of the replacement array may be bent into a spherical or semispherical surface (desirably corresponding to the wearer's head), with the upper surfaces of the elements in contact with the inner surface of the helmet.

Figure 31A:
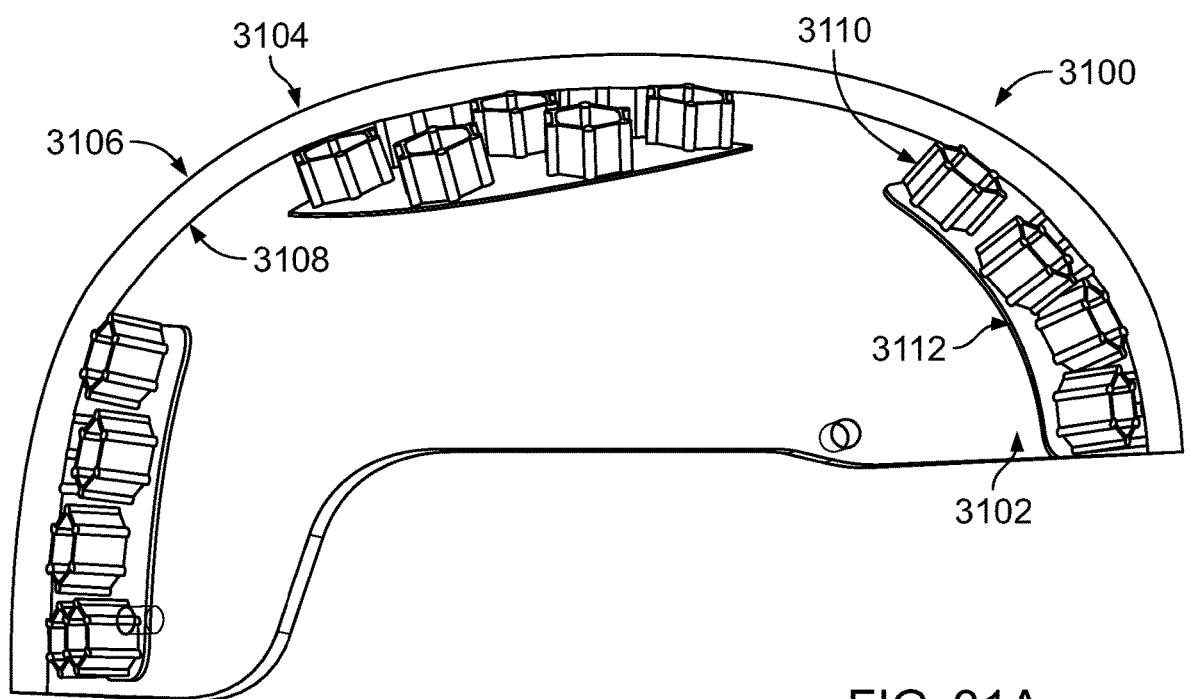
FIGS. 31A-31B depict a side perspective and lower perspective views, respectively, of one alternative embodiment of a protective helmet including impact absorbing arrays with polygonal LSF impact absorbing structures.
Figure 31B:
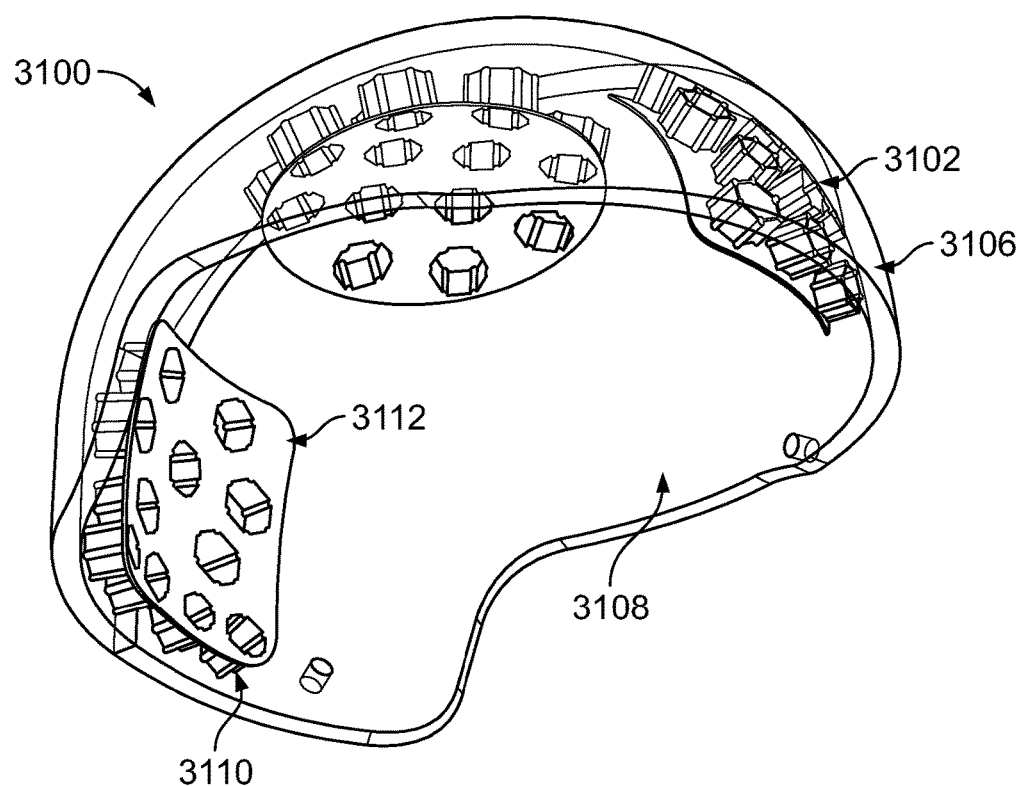

FIGS. 31A-31B depicts a protective helmet system 3100 with a plurality of polygonal impact absorbing LSF structures and/or arrays 3102. The helmet system 3100 may comprise an outer shell 3104 and a plurality of polygonal impact absorbing LSF structures and/or arrays 3102. The outer shell 3104 comprises an external surface 3106 and an internal surface 3108. The plurality of polygonal impact absorbing LSF structures and/or arrays 3102 comprising a plurality of polygonal LSF impact absorbing structures 3110 and a face sheet 3112. The plurality of impact absorbing structures and/or arrays 3102 may be coupled to an interior surface 3108 of the outer shell 3104. Alternatively, the plurality of impact absorbing arrays and/or structures 3201 may be coupled to an exterior surface of an inner shell (not shown).

Figure 31E:
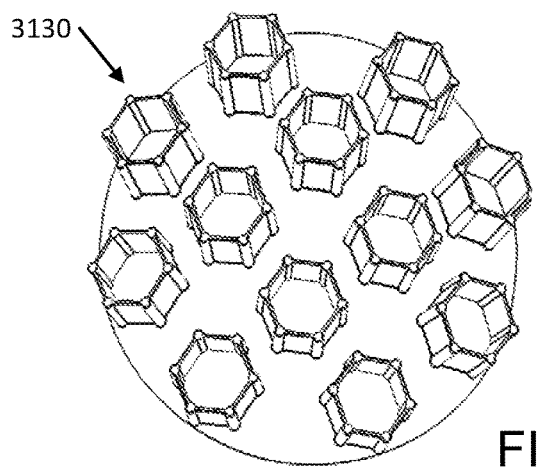

FIGS. 31C-31E depicts isometric views of an alternate embodiment of an impact absorbing array 3114, 3120, 3130. The impact absorbing array 3114, 3120 comprises a plurality of polygonal impact absorbing LSF structures 3116, 3122, 3124, 3126 and a face sheet 3118, 3128. The plurality of polygonal impact absorbing LSF structures 3116, 3122, 3124, 3126 is coupled to the face sheet 3118, 3128. The face sheet 3118 may comprise a rubber, foam, and/or a polymer. The plurality of polygonal impact absorbing LSF structures 3116, 3122, 3124, 3126 may comprise different heights and widths. If desired, one or more polygonal impact absorbing LSF structure 3115, 3122, 3124, 3126 in a single impact absorbing array 3114, 3120 could be of similar design, or various elements could incorporate differing designs in a single array, including variations in filament diameter and/or offset, length, wall thickness, wall dimensions, element orientation and/or wall angulation within a single element or between elements within the same array. Where the array is being retrofitted into an existing helmet design, it may be necessary to tune or tailor the array design such that a desired impact performance is obtained (or optimized) from an array which is sized and configured to fit within the available space between the helmet and the wearer's head.

The positioning and design of the various impact absorbing arrays 3114, 3120 can be selected to provide a desired orthogonal response for the array to various forces incident to the helmet (i.e., axial, lateral and/or torsional impacts on the outer helmet). The plurality of polygonal impact absorbing LSF structures 3116, 3122, 3124, 3126 may be positioned in different regions surrounding the wearers head, including a frontal region, a sphenoid region, an ethmoid region, a parietal region, a temporal region (right and left), an occipital region, and/or any combination thereof. Each impact absorbing structure and/or array 3102 can be customized to desired impact zones, the protective helmet profile or consumer's desired shape allowing variable offset and/or other variable dimensions of the each polygonal LSF structures on an array. The impact absorbing arrays 3102 could further comprise padding and/or cushioning materials such as foam pads to increase comfort and fit, if desired. For example, during a frontal impact, the relevant impact absorbing structure and/or array 3102 will desirably absorb, attenuate and/or ameliorate the effects of the frontal impact on the wearer, as described herein.

Figure 32B:
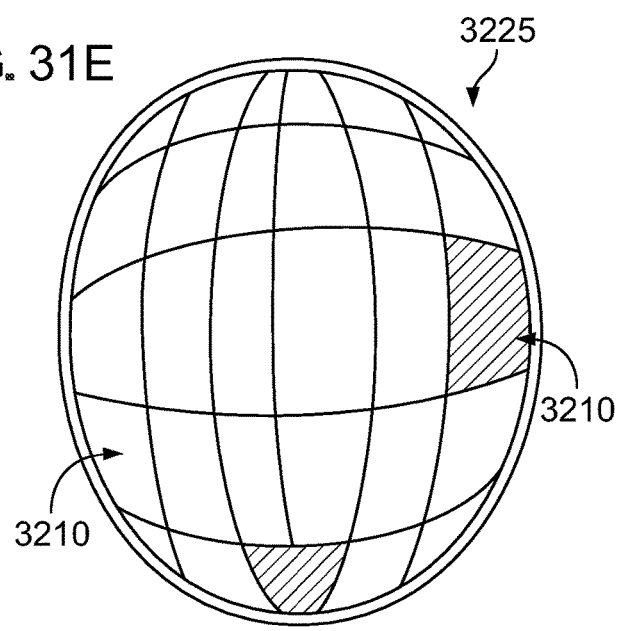
FIGS. 32A-32B depicts a perspective view of an inner shell or frame insert for securing modular impact absorbing arrays inside of a helmet or other protective garment.
Figure 32A:
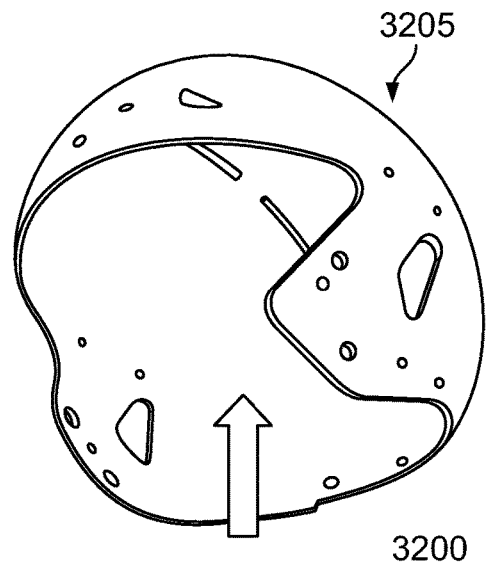
Figure 32A:
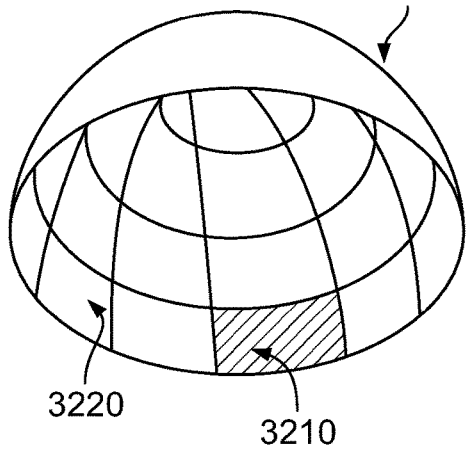

The plurality of impact absorbing structures may be coupled in a variety of different methods. In various embodiments, a protective helmet system 3100 or other article of protective clothing could incorporate perforations and/or openings (not shown) on an inner surface 3108 of the outer shell 3104. Accordingly, the protective helmet system may comprise an outer shell 3205, a grid or frame 3200, and one or more polygonal impact absorbing LSF structures or arrays 3210, 3220. The grid or frame 3200 affixed to the inner surface of the outer shell 3205. The grid or frame 3200 may have a first plurality of struts spaced apart from an adjacent first plurality of struts, and a second plurality of struts positioned perpendicular to the second plurality of struts creating one or more openings 3220. Such an arrangement creates a grid-like or other pattern may desirably be sized and/or configured for attaching the various polygonal impact LSF absorbing structures 3210 therein. Alternatively, an inner shell or other insert 322 (See FIGS. 32A and 32B) could be provided that is positioned within and/or adjacent to the outer helmet shell, with the inner shell having openings, spaces, depressions and/or voids 3220 formed therein. In use, the inner shell 3225 could be attached to the outer shell 3205 (which could include permanent as well as non-permanent fixation to the outer shell 3205, if desired), with one or more impact absorbing arrays 3210 attached to the inner shell 3225, with the array(s) comprising a plurality of open and/or closed hexagonal elements, the elements including features for connecting to one or more of the openings or depressions 3220 of the inner shell 3225. Also, the impact absorbing arrays 3210 may be coupled to an inner surface and/or an outer surface of the inner shell 3225. If desired, the impact absorbing array(s) 3210 could comprise a composite or multi-layered array including open and/or closed polygonal impact absorbing elements layered with a foam layer and/or a covering sheet (i.e., a thin fabric layer), with the multi-layered array fitting into place into one or more of the openings in the inner shell of the helmet.

In various embodiments, the inner shell could be customized and/or particularized for a specific helmet design, which could include the ability to retrofit an existing protective helmet by removing existing pads and/or cushioning material and replacing some or all of them with an inner shell and appropriate impact absorbing arrays, as described herein. If desired, the customized inner shell could include modularly replaceable arrays of different sized, designs and/or thicknesses, which could include foam and/or fabric coverings for wearer comfort.

In at least one alternative design, the openings in the inner shell could be relatively small, circular openings formed in a regular or irregular array, such as in a colander-like arrangement, whereby the modular or segmented arrays and/or pads could include plugs or grommets sized and/or shaped to fit within the openings for securement to the inner shell. This arrangement could allow the arrays/pads to be secured the various locations and/or orientations within the helmet, desirably accommodating a wide variety of head shapes and/or sizes as well as providing improved comfort and/or safety to the wearer.

Figure 33A:
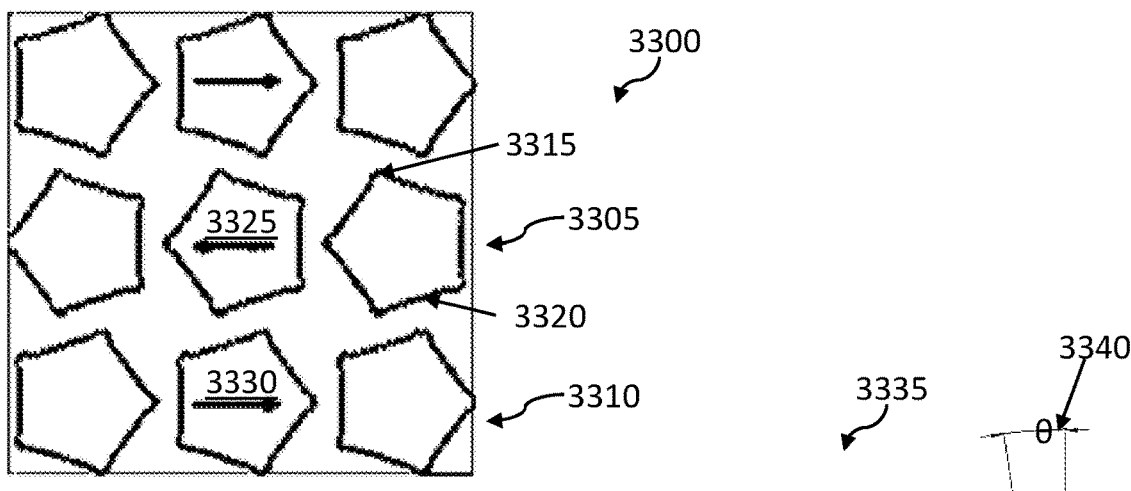
FIGS. 33A-33B depicts a top and side plan view of various exemplary embodiments of a tapered or frustum shaped hexagonal structure and/or rotated polygonal impact structures.
Figure 33B:
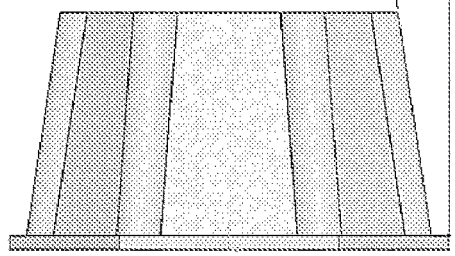

FIGS. 33A-33B depict a top view and side view of alternate embodiments of an impact absorbing structure comprising a polygonal LSF impact absorbing structures. As described herein, the impact mitigation layer may comprise a plurality of impact absorbing structures that form an array. The plurality of impact absorbing structures may comprise a plurality of polygonal LSF impact absorbing structures, the plurality of polygonal LSF impact absorbing structures being a pentagon LSF impact absorbing structure 3300. The pentagonal LSF impact absorbing structure 3300 comprises five filaments 3315 and five walls 3320, the five walls 3320 couple the five filaments 3315 together to form a pentagonal shape. The plurality of polygonal LSF impact absorbing structures may be further positioned in a uniform, symmetrical pattern, where each of the polygonal LSF impact absorbing structures are co-linear with the adjacent polygonal LSF impact absorbing structures. Alternatively, the plurality of polygonal LSF impact absorbing structures may be an offset pattern, which an adjacent polygonal LSF impact absorbing structure is positioned or spaced apart from the first polygonal LSF impact absorbing structure in a lateral direction at least half the width of a polygonal LSF impact absorbing structure. Accordingly, a plurality of the polygonal LSF impact absorbing structures may be rotated clockwise and/or counterclockwise 5 to 30 degrees off its longitudinal axis. FIG. 33B depicts a side view of an alternate embodiment of a polygonal LSF structure 3335. The polygonal LSF structure 3335 may comprise a frustum shape. The frustum shape may be determined from an angle θ 3340. The angle θ 3340 may have a range of 5 degrees to 60 degrees.

Figure 34A:
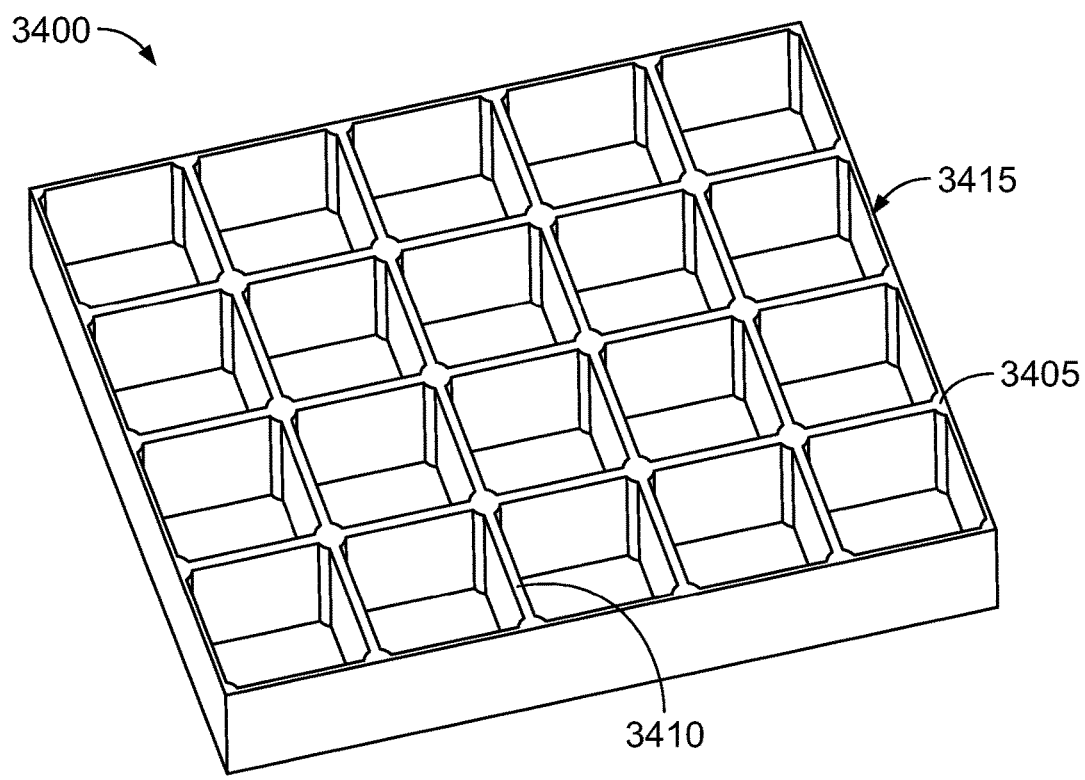
FIGS. 34A-34D depicts an isometric top view and top plan views of alternate embodiments of an impact absorbing array.
Figure 34B:
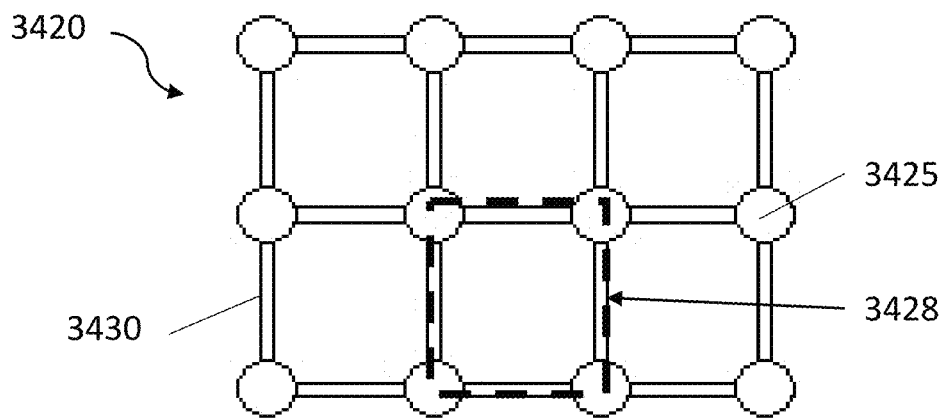
Figure 34C:
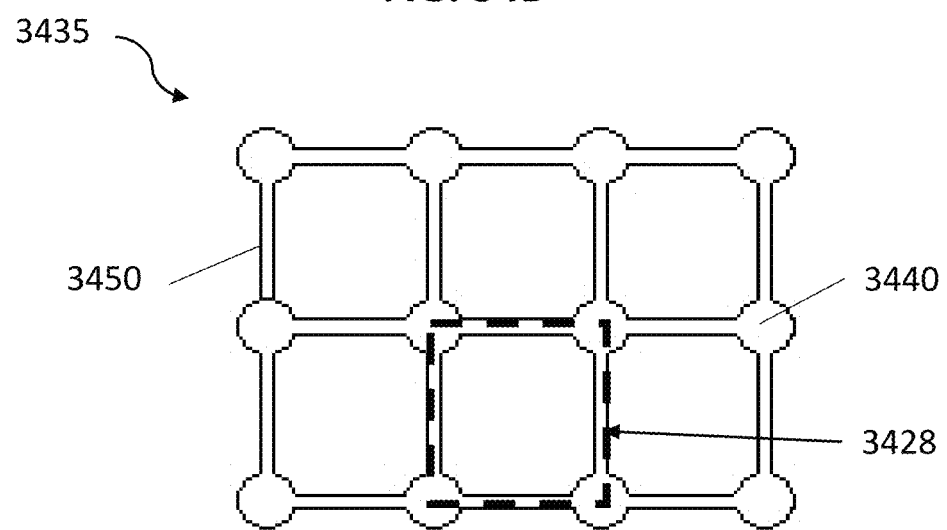
Figure 34D:
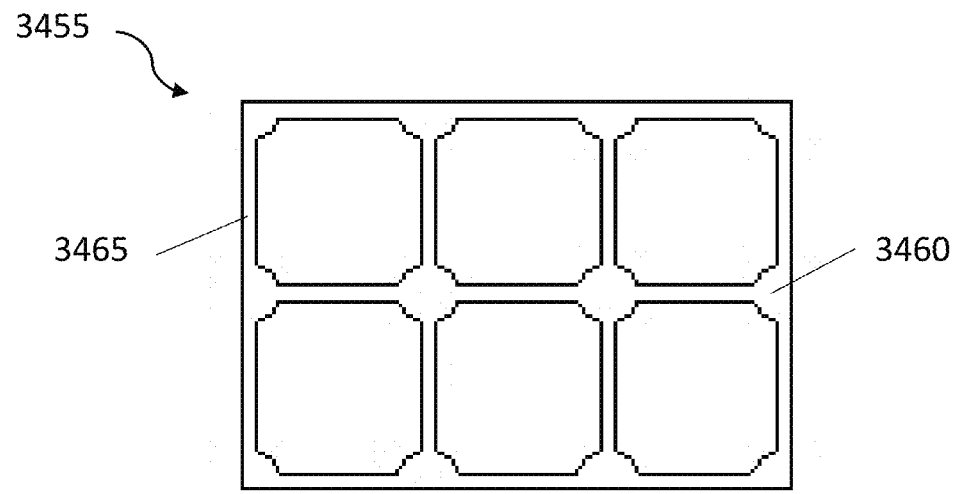

FIGS. 34A and 34D illustrates an isometric and top views of alternate embodiments of an impact absorbing structure. The impact absorbing structure 3400,3455 comprises a plurality of filaments 3405, 3460 each of the plurality of filaments 3405,3460 are coupled to at least two lateral support wall members 3410, 3465, each of the at least two lateral support wall members 3410,3465 having a length and width; each of the at least two support wall members 3410,3465 are coupled to a filament from 0 degrees to 90 degrees apart to form a connecting member. Desirably, any number of lateral support wall members 3410,3465 may be positioned relative to each other and different pairs of the support members 3410, 3465 connected to each other by a plurality of connecting members to form structural groups. The structural groups may include regular or irregular polygons. The structural group may be comprising a perimeter wall 3415. At least a portion of the impact absorbing structure may comprise a portion of filaments 3405,3460 and/or at least a portion of lateral support wall members 3410, 3465 having half-a width 3505 of a lateral support wall member 3410, 3464, and half width 3510 of a filament 3405,3460.

The perimeter wall 3415 may surround the structural group on all sides, and/or at least two sides. The perimeter wall 3415 may extend parallel to a longitudinal axis of a filament 3405 and/or extend perpendicular to a lateral support wall member 3410. FIGS. 34B-34C illustrates top views of another alternate of impact absorbing structures 3420, 3435 may comprise one or more connecting members, the one or more connecting members comprises at least one filament 3425,3440 and at least two lateral support walls 3430, 3450. The at least two lateral support walls 3430, 3450 are coupled to the filament 3425, 3440 having an interior angle of 0 degrees to 90 degrees. The one or more connecting members are coupled together to form a structural group 3428. The structural groups may include regular or irregular polygons. At least one filament 3425, 3440 and at least one lateral support wall 3430, 3450 may have a shared at least one filament.

Figure 34E:
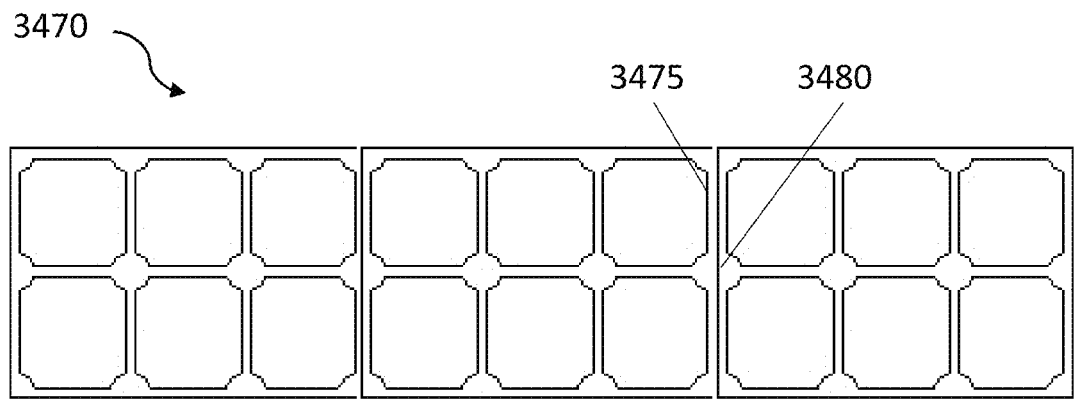
FIGS. 34E-34F depicts top plan views of alternate embodiments of an impact absorbing array of FIGS. 34A-34D in different layouts or orientations.
Figure 34F:
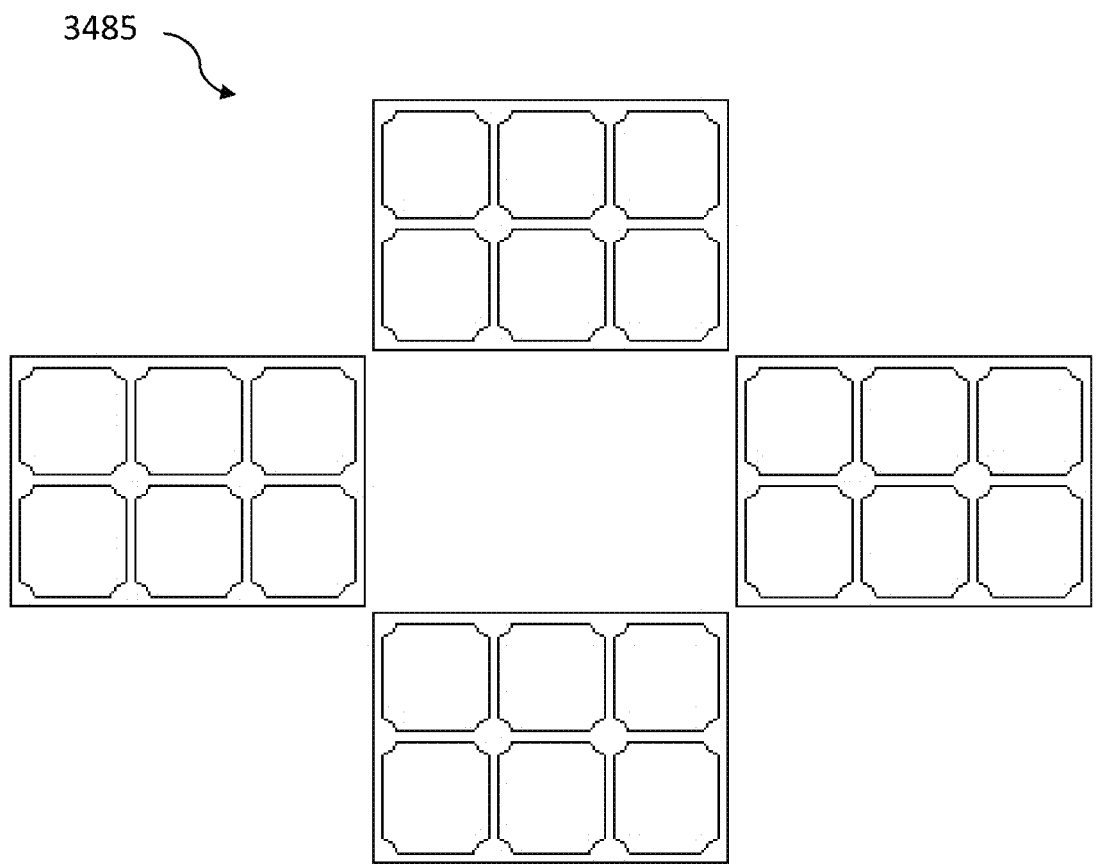

FIGS. 34E-34F depict top views of alternate embodiments of a plurality of polygonal LSF impact absorbing structures 3470, 3485 being positioned into different patterns. The plurality of polygonal LSF impact absorbing structures 3470, 3485 may be further positioned in a uniform, symmetrical pattern, where each of the polygonal LSF impact absorbing structures 3470, 3485 are co-linear with the adjacent polygonal LSF impact absorbing structures, allowing a plurality of polygonal LSF impact absorbing structures 3470, 3485 to be parallel to the adjacent plurality of polygonal LSF impact absorbing structures. Alternatively, the plurality of polygonal LSF impact absorbing structures 3470, 3485 may be an offset pattern, which an adjacent plurality of polygonal LSF impact absorbing structures 3470, 3485 is positioned or spaced apart from the first plurality of polygonal LSF impact absorbing structures at least half the width of a polygonal LSF impact absorbing structure. Accordingly, a plurality of the polygonal LSF impact absorbing structures 3470, 3485 may be rotated clockwise and/or counterclockwise 5 to 30 degrees off its longitudinal axis.

Figure 35A:
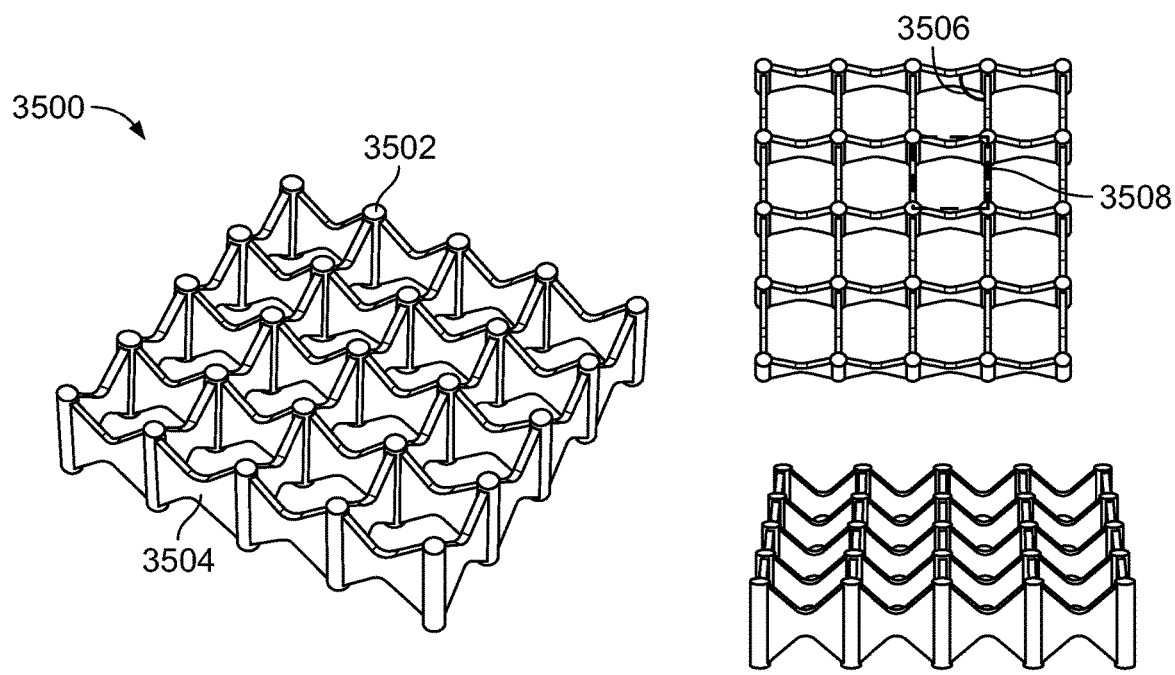
FIG. 35A-35B depicts various views of two alternate embodiments of an impact absorbing structures.
Figure 35B:
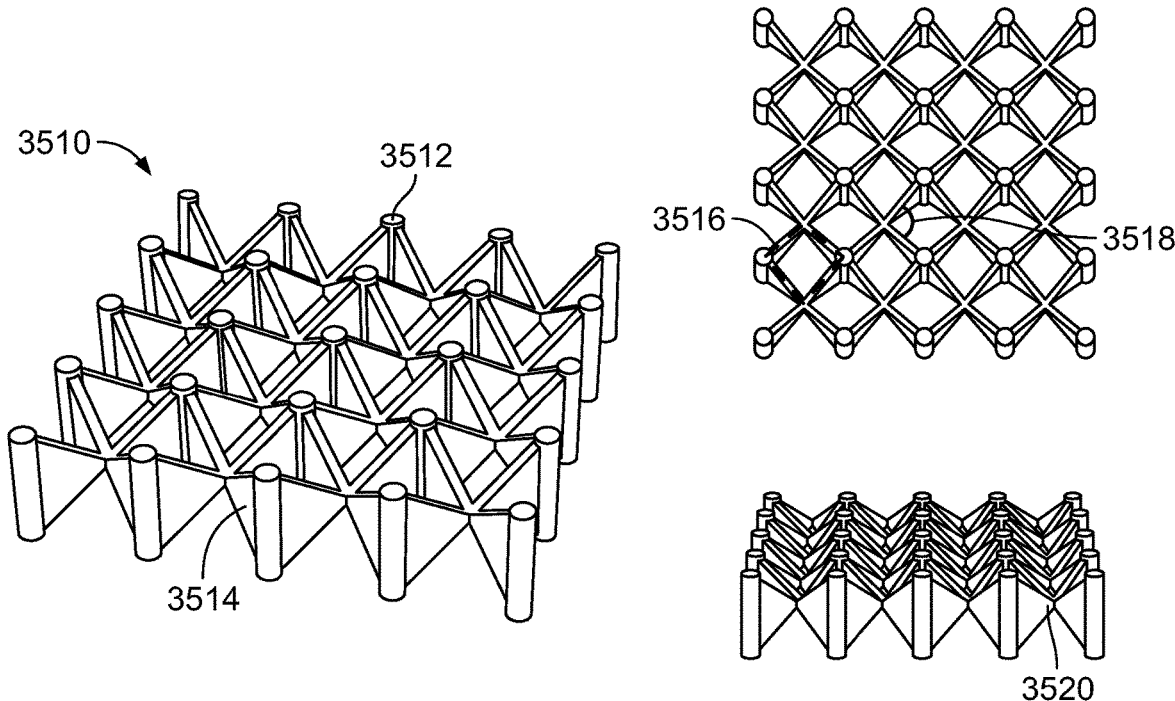

FIGS. 35A-35B illustrate two alternate embodiments of impact absorbing structures. FIG. 35A shows an impact mitigation structure 3500 comprising a plurality of filaments 3502, each of the plurality filaments 3502 are coupled to at least one or at least two lateral support wall members 3504, each of the at least one or at least two lateral support wall members 3504 is shaped and configured as a "bowtie" or a "re-entrant" shape. The at least one lateral support wall member 3504 may be coupled to the filament 3502 having an interior angle 3506 of 90 degrees along the its longitudinal axis to create a connecting member. The interior angle 3506 may comprise 90 degrees to 180 degrees. A plurality of connecting members may be coupled to an adjacent plurality of connecting members to form an array of structural shapes 3508. Furthermore, the structural shape 3508 may have at least one filament 3502 and at least one support wall 3504 that is shared with the adjacent structural shape 3508. The structural shape 3508 may comprise a regular or irregular polygon. Desirably, any number of lateral support wall members 3504 may be positioned relative to each other and different pairs of the support members connected to each other by connecting members to form structural groups.

Alternatively, FIG. 35B shows an impact mitigation structure 3510 comprising a plurality of filaments 3512 each of the plurality filaments 3512 are coupled to at least one lateral support wall member 3514 to create a plurality of connecting members having at least one interior angle 3518 of 90 degrees. Accordingly, the interior angle 3518 may be 30 to 90 degrees. Each of the at least one lateral support wall member 3514 is shaped and configured as a triangular shape. The at least one lateral support wall member 3351 has a first surface and a second surface; the first or second surface may be coupled to the filament a 3512 long the filament's 3512 longitudinal axis, and the first or second surface coupled to an adjacent at least one support wall member 3514. The first or second surface coupled to an adjacent at least one support wall 3514 first or second surface, allowing the first of second surface of the adjacent at least one support wall 3514 to intersect 3520. Desirably, a plurality of connecting members are positioned adjacent to each other to form structural groups 3516, the structural groups 3516 comprises regular or irregular polygons.

Figure 36A:
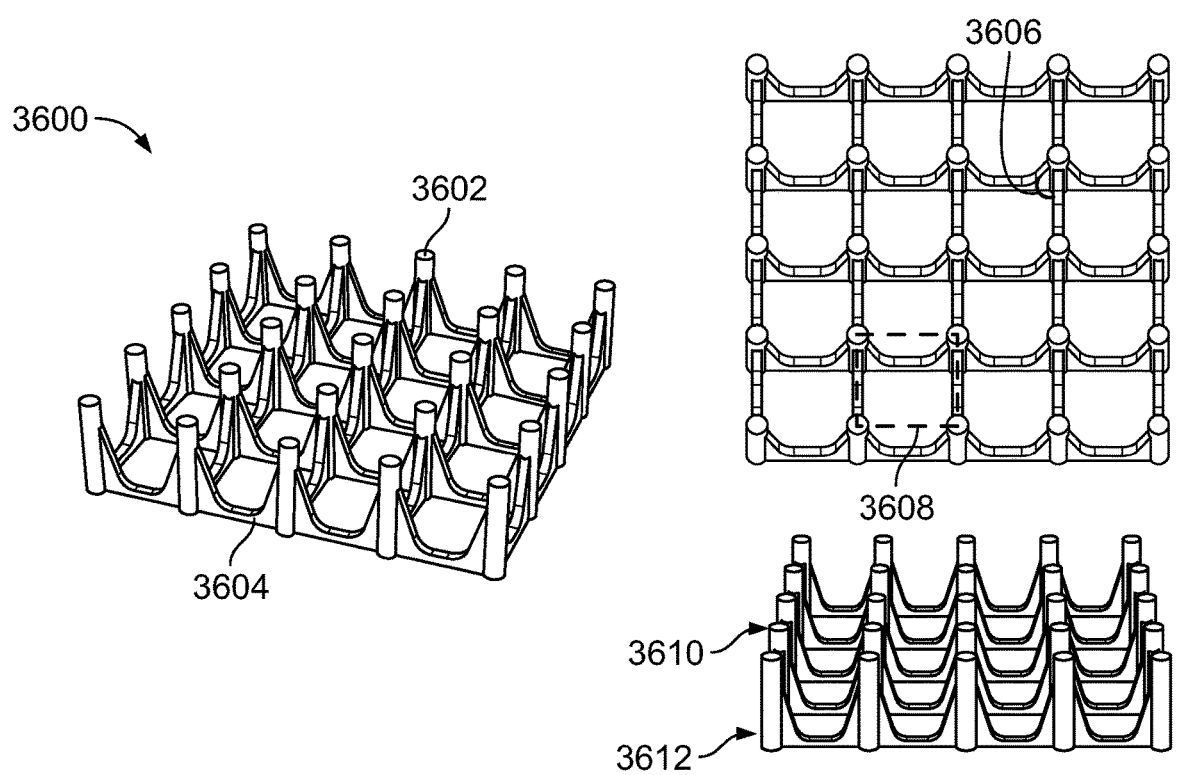
FIGS. 36A-36B depicts various views of two alternate embodiments of an impact absorbing structures.
Figure 36B:
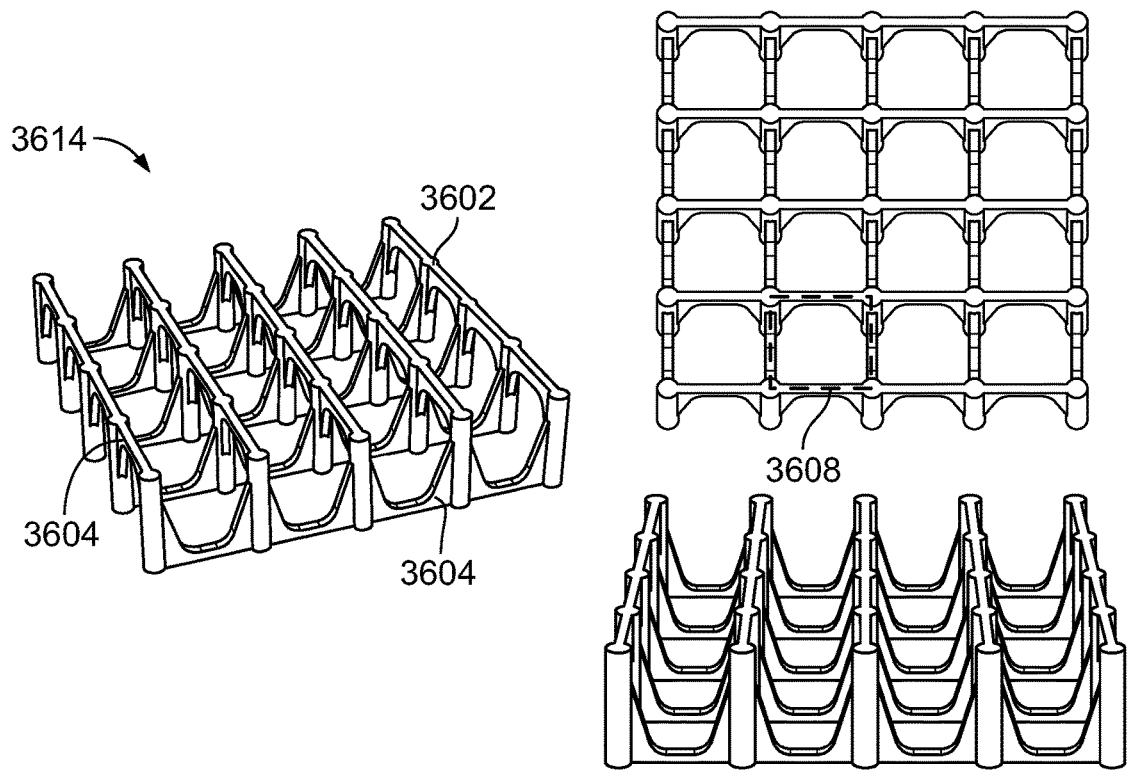

FIG. 36A-36B illustrate two alternate embodiments of impact absorbing structures. FIG. 36A shows an impact mitigation structure 3600 comprising a plurality of filaments 3602 and a plurality of lateral support walls 3604. Each of the plurality filaments 3602 are coupled to at least one support wall member 3604. More specifically, each of the plurality of filaments 3602 having a first end 3610 and a second end 3612, each of the at least one support wall member 3604 being coupled to the second end 3612. Each of the at least one support wall member 3604 is shaped and configured as a "parabolic" shape, at least a portion of the at least one lateral support wall member 3604 extends along a longitudinal axis of the plurality of filaments 3602. Furthermore, the at least one lateral support wall member 3604 may have a first surface and a second surface, the first surface comprises a parabolic or convex shape, and the second surface comprises a flat planar surface, the flat planar surface extends laterally away from the second end 3612 of the filament 3602. The at least one lateral support wall member 3604 may be coupled to the filament 3602 having an interior angle 3506 of 90 degrees, the interior angle 3606 may comprise a range of 30 degrees to 180 degrees along the its longitudinal axis. Desirably, any number of support wall members 3604 may be positioned relative to each other and different pairs of the support members connected to each other by connecting members to form structural groups 3608. Alternatively, each of the plurality of filaments 3602 having a first end 3610 and a second end 3612, each of the at least one support wall member 3604 being coupled to the first end 3612. Furthermore, the at least one lateral support wall member 3604 may have a first surface and a second surface, the second surface comprises a parabolic or convex shape, and the first surface comprises a flat planar surface, the flat planar surface extends laterally away from the first end 3610 of the filament 3602.

Alternatively, FIG. 36B shows an impact mitigation structure 3614 comprising alternating lateral support walls 3604. The impact mitigation structure 3614 comprises a plurality of filaments 3602, each of the plurality filaments 3602 are coupled to at least one support wall member 3604, each of the at least one support wall member 3604 is shaped and configured as a "parabolic" shape. The at least one support wall member 3604 may be coupled to at least a portion of the filament along the its longitudinal axis. The at least one support wall member 3604 may alternate coupling to a portion of the filament 3602 near the top or the bottom of the filament longitudinal axis. Desirably, any number of lateral support wall members 3604 may be positioned relative to each other and different pairs of the support members connected to each other by connecting members to form structural groups 3608. Alternatively, each of the plurality of filaments 3602 having a first end 3610 and a second end 3612, a first plurality of lateral support wall member 3604 being coupled to the first end 3612 of a plurality of filaments 3602, and a second plurality of lateral support wall members 3604 being coupled to the second end 3612 of a plurality of filaments 3602. Furthermore, the at least one lateral support wall member 3604 may have a first surface and a second surface, the second surface comprises a parabolic or convex shape, and the first surface comprises a flat planar surface, the flat planar surface extends laterally away from the first end 3610 and/or second end 3612 of the filament 3602.

Figure 37A:
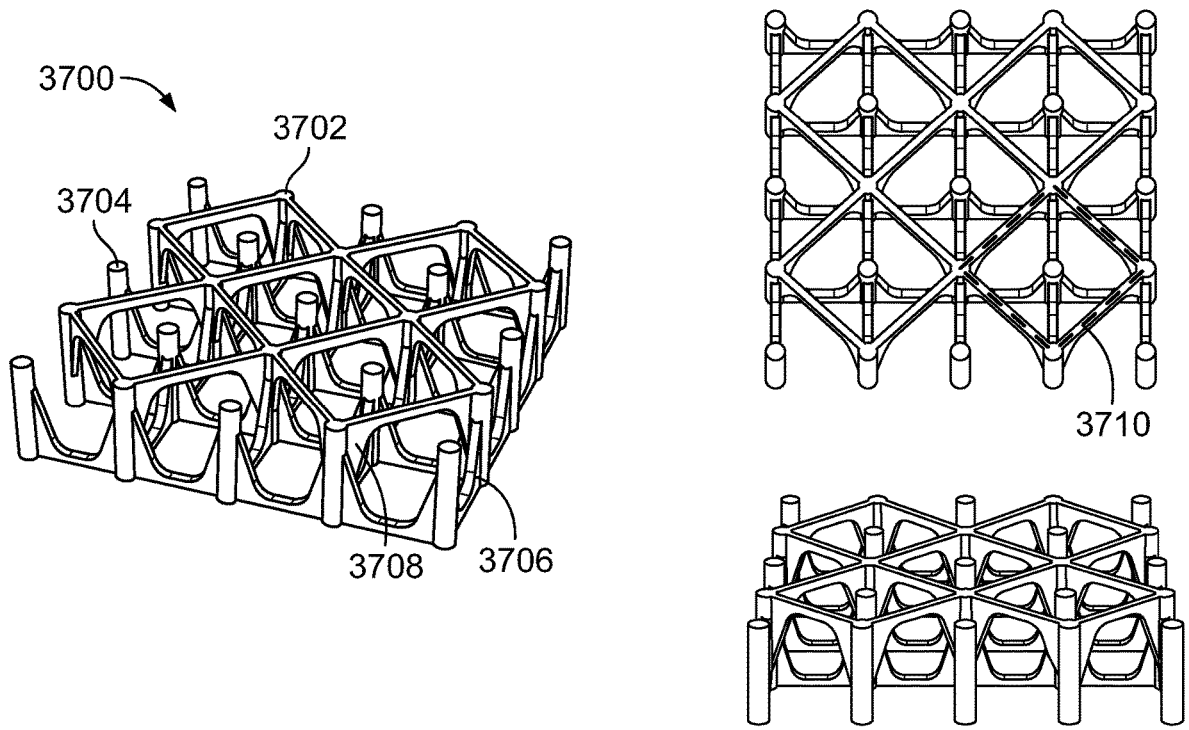
FIGS. 37A-37C depicts various views of three alternate embodiments of an impact absorbing structures.
Figure 37B:
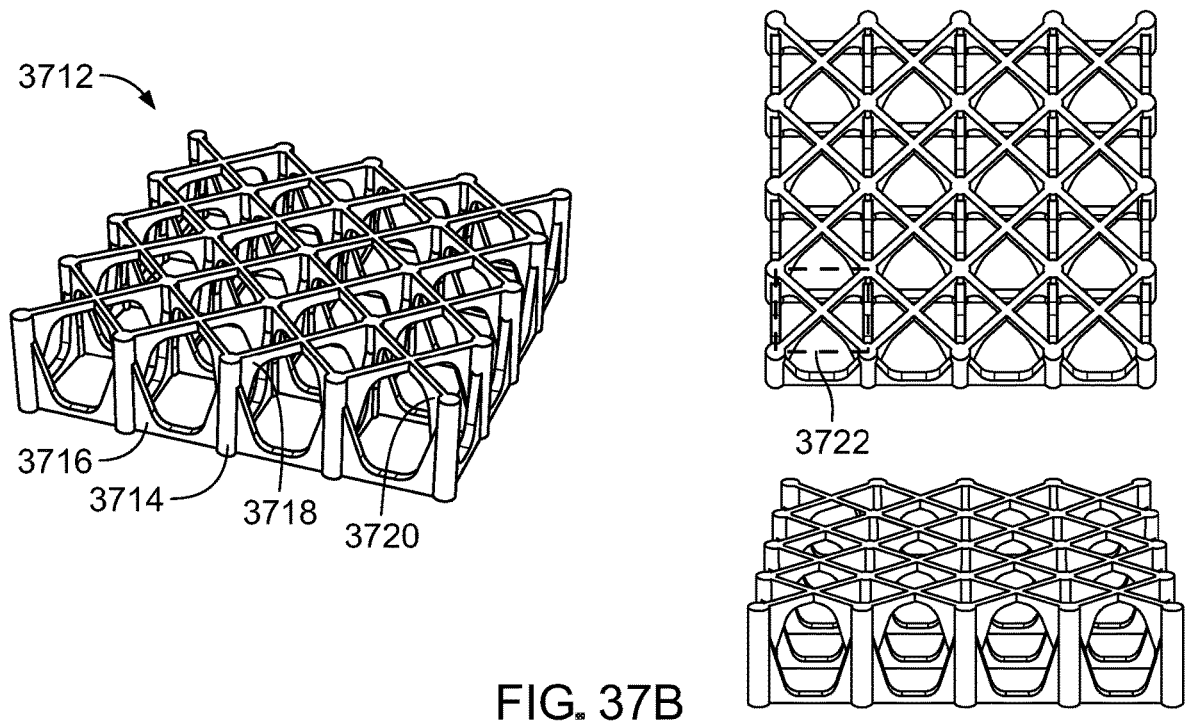
Figure 37C:
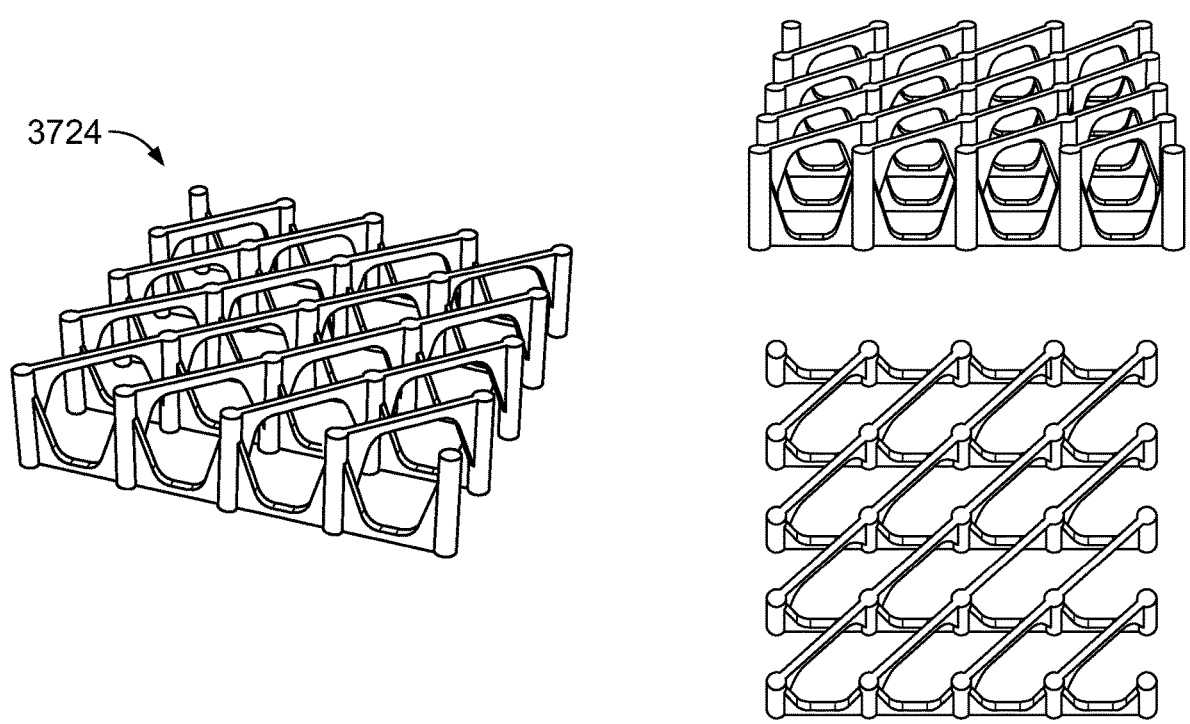

FIG. 37A-37C illustrate three alternate embodiments of impact absorbing structures. FIG. 37A shows an impact mitigation structure 3700 comprising a plurality of filaments 3702, 3704, each of the plurality of filaments 3702, 3704 are coupled to at least one lateral support wall member 3706, 3708, each of the at least one lateral support wall member 3706, 3708 is shaped and configured as a "parabolic" shape. The at least one lateral support wall member 3706, 3708 may be coupled to an adjacent at least one lateral support wall member 3354 forming a square or diamond shape cavity; the diamond or square shaped cavity to have a filament disposed within. Desirably, any number of support wall members may be positioned relative to each other and different pairs of the support members connected to each other by connecting members to form structural groups 3710, the structural groups 3610 may be a polygon or irregular polygons. In another embodiment, the impact mitigation structure 3700 comprises a first plurality of filaments 3702 and a second plurality of filaments 3704, and each of the first plurality of filaments 3702 and the second plurality of filaments 3704 having a first end and a second end. The impact mitigation structure 3700 further comprises a first plurality of lateral support wall members 3706 and a second plurality of lateral support wall member 3708. The first plurality of lateral support wall members 3706 may be coupled to a second end of a first plurality of filaments 3704, and the second plurality of filaments 3702 having a first plurality of lateral support wall members 3706 being coupled to a second end, and a second plurality of lateral support wall members 3708 being coupled to the first end. Each of the first 3706 and the second 3708 lateral support wall members comprises a first surface and a second surface, the second surface comprises a parabolic or convex shape, and the first surface comprises a flat planar surface, the flat planar surface extends laterally away from the first end and/or second end of the filament 3702. The first plurality of lateral support wall members 3706 being a different width from the second plurality of lateral wall support members 3708. Additionally, the first plurality of lateral support wall members 3706 is placed in one orientation, and the second plurality of lateral support wall members 3708 is placed in a second position, the second position being perpendicular to the first plurality of lateral support wall members 3706.

Alternatively, FIG. 37B shows an impact mitigation structure 3712 with intersecting lateral support wall members 3716, 3718, 3720. The impact mitigation structure 3712 comprising a plurality of filaments 3714, each of the plurality filaments 3714 are coupled to at least one support wall member 3716, 3718, 3720 to create a connecting member. Each of the at least one support wall member 3716, 3718, 3720 is shaped and configured as a "parabolic" shape. A plurality of connecting members are positioned adjacent to each other to form a structural group 3722, the structural group 3722 may comprise a polygon and/or an irregular polygon. The at least one support wall member 3716, 3718, 3720 may intersect with an adjacent at least one support wall member 3716, 3718, 3720. In another alternative embodiment, FIG. 37C shows an impact mitigation structure 3410 comprising a plurality of filaments 3340, each of the plurality filaments 3340 are coupled to at least one support wall member 3356, each of the at least one support wall member 3356 is shaped and configured as a "parabolic" shape. In addition, a series of upper support bands can extend across and/or be attached to an upper end of various filaments. In another embodiment, the impact mitigation structure 3712 comprises a plurality of filaments 3714, each plurality of filaments 3714 having a first end and a second end. The impact mitigation structure 3712 further comprises a first plurality of lateral support wall members 3716, a second plurality of lateral support wall member 3718 and a third plurality of lateral support wall members 3718. The plurality of filaments having the first plurality of lateral support walls 3716 coupled to a second end, the second and third plurality of lateral support walls 3718 being coupled to a first end, the second and third plurality of lateral support walls 3718, 3720 being perpendicular to each other, and intersecting at the center portion of both the second and third plurality of lateral support walls 3718, 3720. FIG. 37C depicts an alternate embodiment of an impact structure 3724 with lateral support walls in parallel rows.

Figure 38:
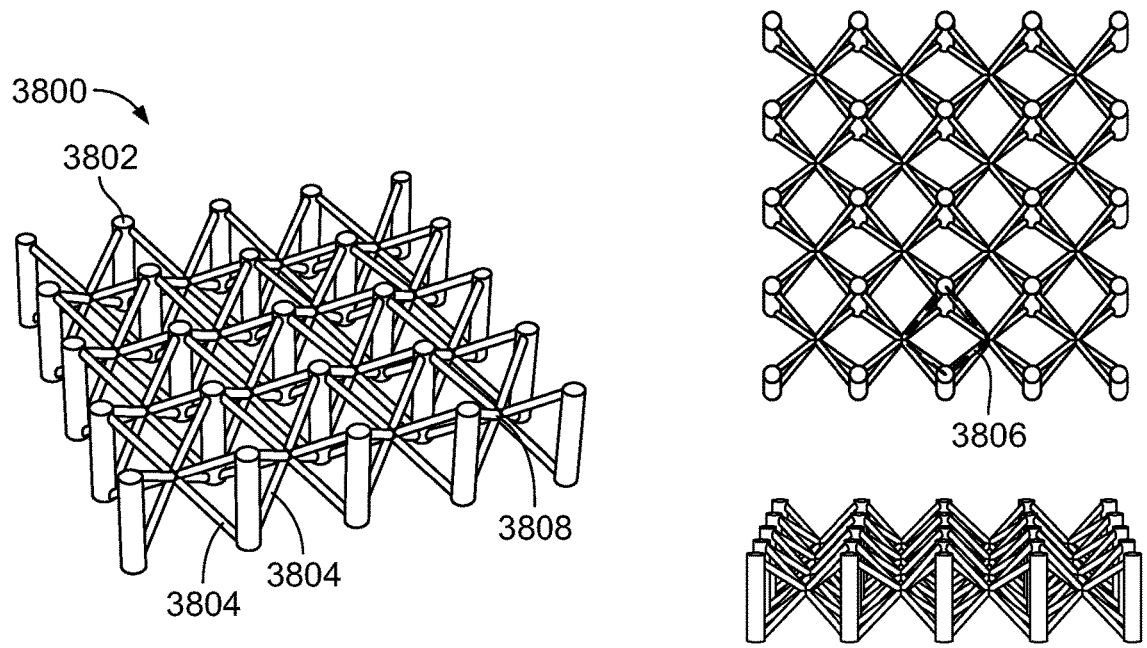
FIG. 38 depicts various views of an alternate embodiment of an impact absorbing structure.

FIG. 38 illustrates various views of another alternate embodiment of an impact absorbing structure 3800. The impact absorbing structure 3800 comprises a plurality of filaments 3802, each of the plurality of filaments 3804 are coupled to at least two support wall members 3804 to form a connecting member. A plurality of the connecting members is coupled to each other to form a structural group 3806, the structural group may be a regular polygon or an irregular polygon. Each of the at least two support wall member 3804 is shaped and configured as a "cylindrical tube," the cylindrical tube may be hollow or solid. The cross-section of the cylindrical tube may have a uniform or non-uniform shape along its longitudinal axis. The least two support wall members 3804 having a first surface and a second surface. The first or second surface may be coupled to each of the plurality of filaments 3802 and/or the first or second surface of the lateral support walls 3804 may be coupled to an adjacent first surface or second surface of the at least two support wall member 3804 at an intersection 3808. The intersection 3808 being positioned within a central portion of the plurality of filaments 3802.

Impact Absorbing Pads with Impact Mitigation Structures

Figure 39A:
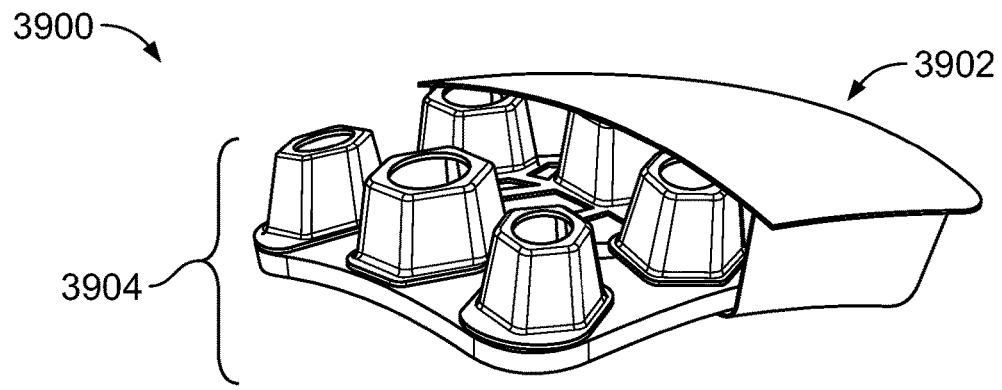
FIGS. 39A-39C depicts various views of two alternate embodiments of an impact absorbing pads.
Figure 39B:
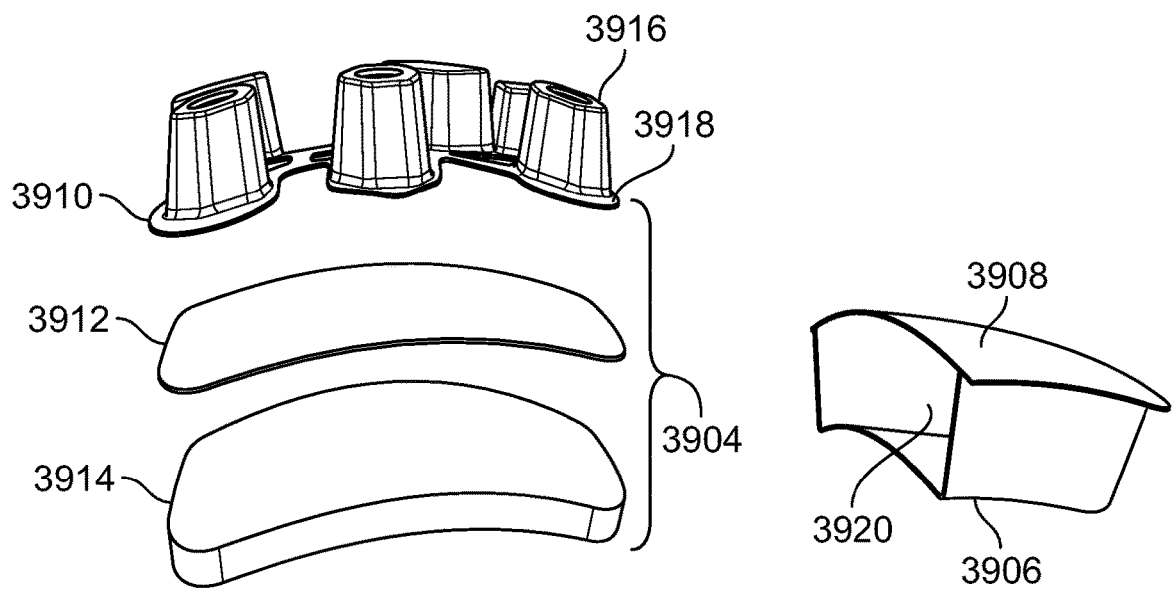

FIG. 39A-39B depicts an isometric and side view of one embodiment of impact mitigation pad 3900. The impact mitigation pad 3900 may comprise at least one impact mitigation assembly 3904 and an enclosure 3902. The at least one impact mitigation assembly 3904 comprises an impact absorbing array 3910, at least one plate 3912 and at least one foam layer 3914. The impact absorbing array 3910 comprises one or more impact absorbing structures 3916. The impact absorbing array 3910 may further comprise a face sheet 3918. The at least one plate 3912 may be a rigid or semi-rigid material, the rigid or semi-rigid material may comprise a metal or polymer (e.g., polycarbonate). The one or more impact absorbing structures may comprise LSF impact absorbing structure, branched impact absorbing structure, an intersecting impact absorbing structure, an arched impact absorbing structure, and additional impact absorbing structures, and/or any combination thereof. The at least one plate 3912 may have a width range of ¼ mm to 8 mm.

The at least one foam layer 3914 may comprise a single layer or multiple layers, which any of the layers may be comprised of various types of foam. The at least one foam layer can include polymeric foams, quantum foam, polyethylene foam, polyurethane foam (foam rubber), XPS foam, polystyrene, phenolic, memory foam (traditional, open cell, or gel), impact absorbing foam (e.g., VN600), latex rubber foam, convoluted foam ("egg create foam"), Evlon foam, impact hardening foam, 4.0 Custula comfort foam (open cell low density foam) and/or any combination thereof. The at least one foam layer may have an open-cell structure or closed-cell structure. The at least one foam layer can be further tailored to obtain specific characteristics, such as anti-static, breathable, conductive, hydrophilic, high-tensile, high-tear, controlled elongation, and/or any combination thereof. The at least one foam layer 3914 may have a thickness ranging from 7 mm to 25 mm.

Figure 39C:
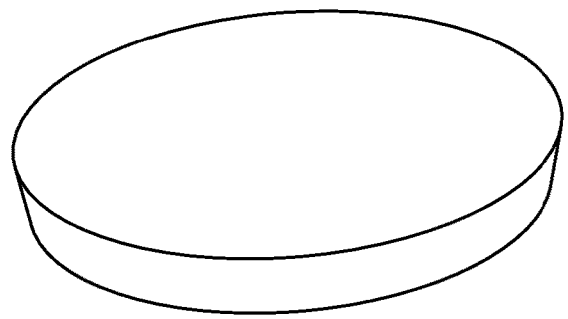

The enclosure 3902 may comprise a first material 3906 and a second material 3908. The first material 3906 and a second material 3908 may be the same material or different materials. The first material 3906 and a second material 3908 may comprise flexible fabric, the flexible fabric having 2-way stretch or 4-way stretch properties, have at least one surface with adhesive, waterproof material, breathable material, and/or be Velcro or a Velcro-like material. The first material 3906 is coupled to the second material 3908 to form a pouch or cavity. The at least impact mitigation structure 3916 can include any embodiments disclosed herein, the at least one impact mitigation structure 3916 may be coupled or mated to a top surface of the plate 3912, the at least one foam layer 3914 being coupled or mated to a bottom surface of the plate 3912. The entire impact mitigation assembly 3904 may be disposed within the enclosure 3902, or more specifically, be disposed within the pouch or cavity 3920 of the enclosure 3902. The impact mitigation assembly 3904 may be affixed within the pouch or cavity 3920 and/or be "free floating" within the pouch or cavity 3920 of the enclosure 3902. A plurality of impact mitigation pads 3900 may be coupled to a helmet. Alternatively, the impact mitigation pads 3900 may comprise at least one impact mitigation assembly 3904 and at least one enclosure 3902. The at least one impact mitigation assembly 3904 comprises an impact mitigation array 3910, and at least one foam layer 3510. The impact mitigation array 3910 may comprise a plurality of impact mitigation structures 3916, the plurality of impact mitigation structures 3916 coupled to a facesheet 3918. The enclosure comprises a first material 3906 and a second material 3908. The first material 3906 and a second material 3908 may be the same material or different materials. The impact mitigation pads 3900 may have various shapes and configurations, the shapes and configurations may comprise a circle, a regular polygon or irregular polygon. For example, FIG. 39A illustrates a rectangle shaped impact mitigation pad, and FIG. 39C illustrates a circular shaped impact mitigation pad. The regular or irregular polygons may comprise a triangle, a square, a rectangle, a pentagon, a hexagon, a heptagon, an octagon, a nonagon, a decagon, and/or any combination thereof.

Figure 40A:
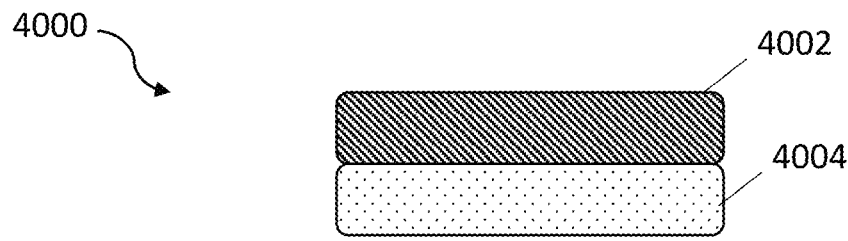
FIGS. 40A-40D depicts various top views of alternate embodiments of various impact absorbing pad configurations.
Figure 40B:
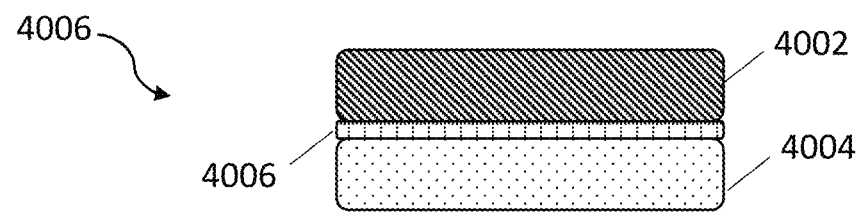
Figure 40C:
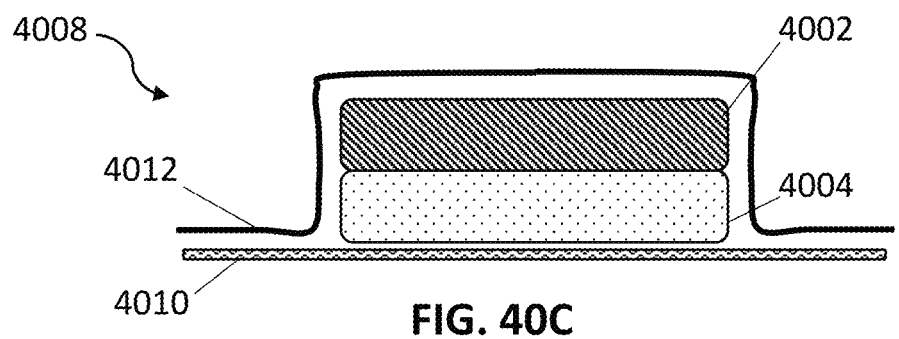
Figure 40D:
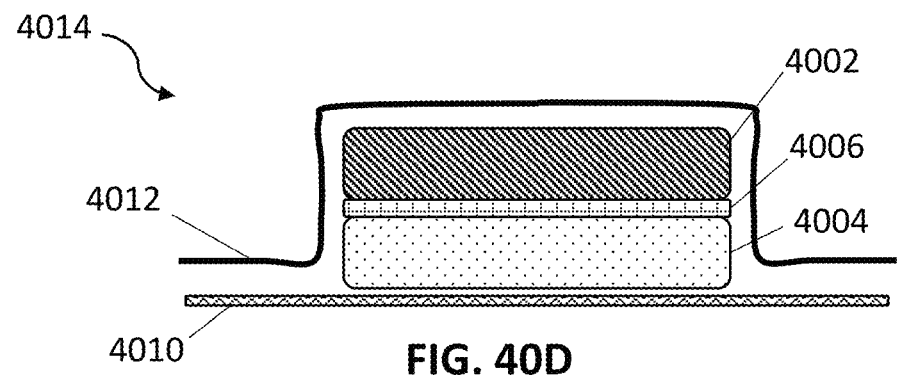

FIGS. 40A-40D illustrate various cross-section views of various embodiments of impact mitigation pad configurations 4000, 4006, 4008, 4014. The impact mitigation pad 4000 may comprise one or more impact mitigation assemblies and/or one or more impact mitigation structures 4002 and at least one foam layer 4004 as shown in FIG. 40A. The one or more impact mitigation structures 4002 is coupled to the at least one foam layer 4004. In another embodiment, the impact mitigation pad 4006 comprises one or more impact mitigation structures 4002, a plate 4006, and at least one foam layer 4004 as shown in FIG. 40B. The one or more impact mitigation structures 4002 are coupled or mated to a top surface of the plate 4006, the at least one foam layer 4004 is coupled or mated to a bottom surface of the plate 4006. In another embodiment, the impact mitigation pad 4008 comprises one or more impact mitigation structures 4002, at least one foam layer 4004, a first material 4010 and a second material 4012 as shown in FIG. 40C. The one or more impact mitigation structures 4002 arc coupled or mated to the at least one foam layer 4004, the one or more impact mitigation structures 4002 and at least one foam layer 4004 is disposed between the first material 4104 and the second material 4012. The first material 4010 is coupled to the second material 4012 to encase or enclose the one or more impact mitigation structures 4002 and at least one foam layer 4004. In another embodiment, the impact mitigation pad 4008 comprises one or more impact mitigation structures 4002, a plate 4006, at least one foam layer 4004, a first material 4010 and a second material 4012 as shown in FIG. 40D. The one or more impact mitigation structures 4002 are coupled or mated to a top surface of the plate 4006, the at least one foam layer 4004 is mated or coupled to a bottom surface of the plate 4006. The one or more impact mitigation structures 4002, the plate 4006 and at least one foam layer 4004 is disposed between the first material 4104 and the second material 4012. The first material 4010 is coupled to the second material 4012 to encase or enclose the one or more impact mitigation structures 4002, the plate 4006 and at least one foam layer 4004.

Figure 42:
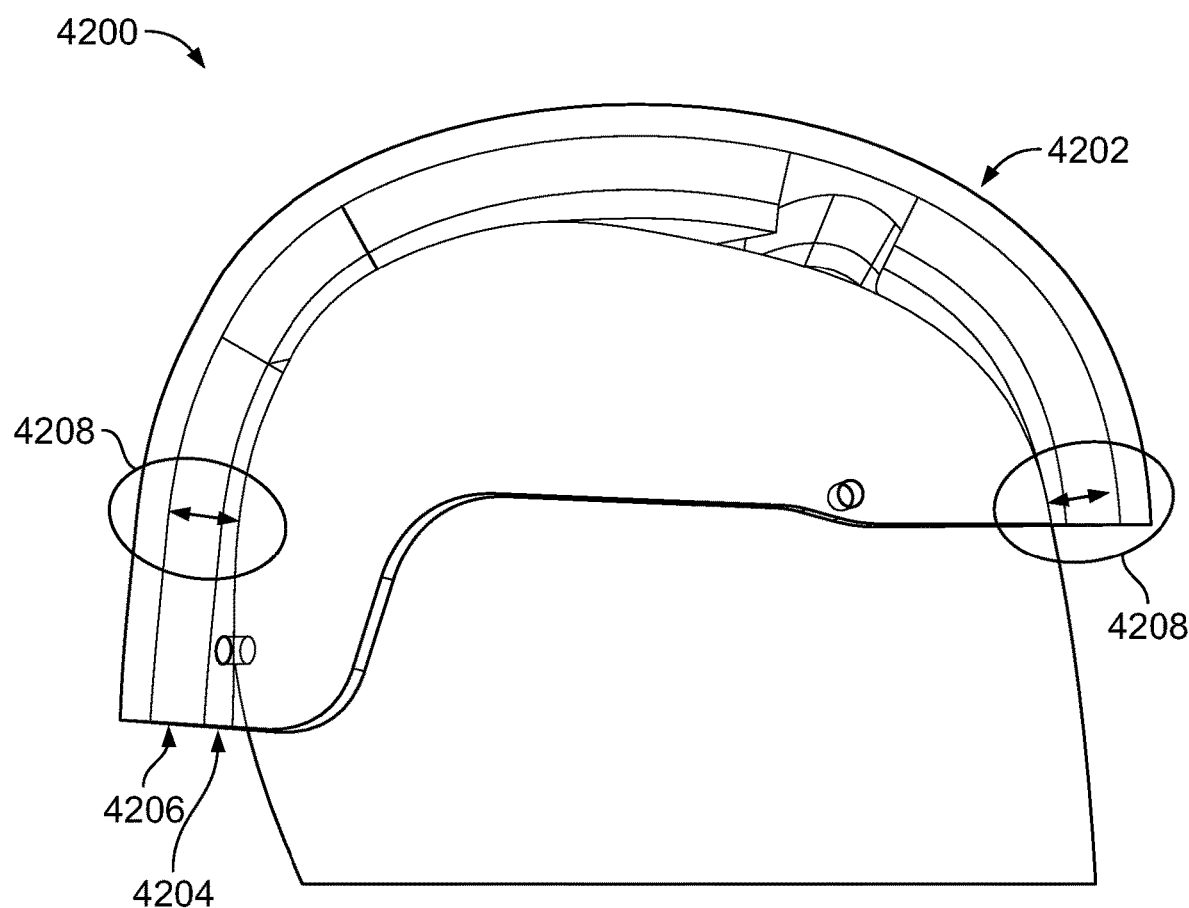
FIG. 42 depicts a side view of one embodiment of a helmet and offsets.

In another embodiment, the impact mitigation structure may be incorporated into an impact mitigation structure assembly. For example, FIG. 42A shows one embodiment of an impact mitigation structure assembly 3500 that comprises at least one impact mitigation structure 3520 and at least one foam layer 3510. The at least impact mitigation structure can include any embodiments disclosed herein, the at least one impact mitigation structure 3520 may be coupled to the at least one foam layer 3510. The at least one impact mitigation structure assembly 3500 may be coupled to a helmet structure. The at least one foam layer 3510 may comprise a single layer or multiple layers, which any of the layers may be comprised of various types of foam. The at least one foam layer can include polymeric foams, quantum foam, polyethylene foam, polyurethane foam (foam rubber), XPS foam, polystyrene, phenolic, memory foam (traditional, open cell, or gel), impact absorbing foam (e.g., VN600), latex rubber foam, convoluted foam ("egg create foam"), Evlon foam, impact hardening foam, 4.0 Custula comfort foam (open cell low density foam) and/or any combination thereof. The at least one foam layer may have an open-cell structure or closed-cell structure. The at least one foam layer can be further tailored to obtain specific characteristics, such as anti-static, breathable, conductive, hydrophilic, high-tensile, high-tear, controlled elongation, and/or any combination thereof. The at least one foam layer 3510 may have a thickness ranging from 7 mm to 25 mm. Alternatively, the impact mitigation structure assembly 3530 may comprise at least one impact mitigation structure 3520, at least one foam layer 3510, and at least one plate 3540 disposed between the impact mitigation structure 3520 and the at least one foam layer 3540. The impact mitigation structure assembly 3530 may be coupled to the helmet structure. The at least one plate 3540 may comprise of a polymer, or more specifically, polycarbonate.

Retrofitting Existing Designs

In various embodiments, impact absorbing structures, impact absorbing assemblies, and/or impact absorbing pads can be retrofitted into an existing helmet designs that may require a low offset, such as a protective military combat helmet, a sports snowboard helmet and/or any occupational type helmet design. For example, in military applications, it is often desirous for a protective helmet design to be optimized for protecting the wearer from impacts from small, high velocity objects such as bullets and shell fragments (i.e., moving objects hitting the user), as well as provide protection from "slower" impacts such as a user's fall from a vehicle. Military helmets typically include an extremely hard and durable outer shell, and the size of the helmet is desirably as close as possible to the size of the wearer's head (allowing for the presence of the cushioning and/or padding material between the wearer's skull and the helmet's inner surface).

It may be desirous to customize the offset 4208 within a helmet design. The offset 4208 is the total width of the impact mitigation layer that extends from an internal surface of the outer shell 4202. The protective helmet 4200 may comprise an outer shell 4202 and an impact mitigation layer 4206. The protective helmet 4200 may further comprise an inner shell 4204. Should the protective helmet 4200 comprise an inner shell 4204, the total offset 4208 may be affected. The offset 4208 available for accommodating the impact absorbing layer in a military helmet and/or any other helmet can be relatively low, with offsets of less than 1 inch being common. In various embodiments, impact mitigation layers incorporating open and/or closed polygonal elements for military helmet applications can have offsets 4208 at or between 0.4 inches to 0.9 inches, with filament diameters of between 3 and 4 millimeters and lateral wall thicknesses of 1 millimeter or greater, and filament lengths between 20 mm to 80 mm. Otherwise, other offsets 4208 may be contemplated should the impact force require it and/or the position of the player or the worker.

In at least one exemplary embodiment, a protective helmet for a military, law enforcement, combat and/or other sport application could comprise an impact absorbing structure, an impact absorbing array and/or impact absorbing pads comprising approximately 0.5 inches high offset hexagonal polymeric structures with an underlying 0.25 inch thick comfort layer of foam padding. The polymeric layer could be attached to a thin plastic face sheet (i.e., a lower face sheet) that could help distribute force to the comfort layer and/or the wearer's head. In this embodiment, the filament column diameter could range from 0.09 inches to 0.10 inches (inclusive), with a connecting wall thickness ranging from 0.03 inches to 0.05 inches (inclusive). The individual hexagonal structures in the polymeric layer could be tapered (see FIG. 33), such that the cross-section at the base (i.e., where the structure attaches to the face sheet) has a larger profile than the corresponding profile along a top section of the structure. In various embodiments, the taper angel θ can be approximately 15 degrees, although in other alternative embodiments the taper angle could range from 0 degrees to 15 degrees (inclusive), while in still further embodiments the taper angle can range from 3 degrees to 5 degrees to 10 degrees to 20 degrees or greater (inclusive).

In various embodiments, a hexagonal and/or polygonal LSF structures will desirably incorporate upper ridges or flanges (see FIG. 27A-27B, and FIG. 28A-28J) at the top of each hexagonal structure to aid in structural stability and/or increase stiffness of the structure. The array or pad can desirably comprise an elastomer, rubber, a thermoplastic and/or thermoset material. If desired, these materials can be utilized to meet and/or high-temperature requirements, as these types of materials are typically less sensitive to temperature effects.

In various embodiments, the individual hexagonal structures can be linked together with a face sheet, a perforated face sheet and/or a face sheet webbing the desirably provides flexibility to the pad as well as provides proper spacing of the filament structures. Where desired, the face sheet can provide a surface for adhering the pad structures to a thin plastic layer.

In various embodiments, the pads and/or structures therein can be molded, cast, extruded and/or otherwise manufactured in in a flat configuration, and then bent or otherwise flexed to matching and/or be attached to a curved surface such as a curved load-spreading layer and/or inner helmet surface, or otherwise manipulated to match helmet curvature. Alternatively, the pads and/or structures therein could be created in a curved or other configuration, and then flattened to accommodate a desired environment of use.

In various embodiments, the polygonal and/or hexagonal structures can be spaced differently in different locations of the helmet or other protective clothing. For example, each of the polygonal and/or hexagonal structures can be spaced sparsely in various locations to maximize collapsibility of the pads, such as proximate to areas of lowest offset within the helmet (i.e., at the front edge of the helmet and/or near the rear and/or nape locations). In other areas of the helmet, including areas with higher available offsets, more densely packed hexagonal structures may be placed to desirably absorb and/or ameliorate impact forces to a greater degree. Desirably, the polygonal and/or hexagonal structures can be strategically placed to match location-specific requirements, including anticipated impact zones and/or directions. For example, FIGS. 25A-25E depict one exemplary embodiment of an array having three evenly spaced buckling structures along a left edge of the array, which could correspond to a front edge and/or rear portion or other edge of a helmet. For example, the three polygonal and/or hexagonal structures could be positioned along the front edge of the helmet, with plenty of "dead space" or open areas between the structures to allow for significant deformation and/or collapse.

If desired, the comfort layer can comprise an open cell foam and/or a silicone foam. Desirably, silicone foams are less temperature sensitive than viscoelastic polyurethane foams, although both types of foams could be utilized for various applications.

For sports applications such as skiing and snowboarding, protective helmets are typically larger than their military counterparts, with the impact protection typically designed to protect a moving user from impact with stationary objects and/or other skiers. In addition, sport helmets are often very lightweight, so a replacement array design should also minimize additional weight for the helmet.

The offset available for accommodating the impact absorbing layer in a sports helmet can be 1 inch or greater, but offsets of less than 1 inch are increasingly common in some designs. In various embodiments, impact absorbing layers incorporating open and/or closed polygonal elements for sports applications can have offsets at or between 0.6 inches to 0.9 inches or greater, with filament diameters of between 3 and 4 millimeters and lateral wall thicknesses of 1 millimeter or greater. In various embodiments, the column diameter can range from 0.1 inch to 0.175 inches (inclusive) in some or all array elements and pads, with connecting wall thicknesses approximating 0.03 inches to 0.04 inches (inclusive). The individual hexagonal elements can be linked together using a face sheet webbing that is pierced, which desirably provides flexibility within the array as well as proper spacing of the structures. If desired, the face sheet and/or webbing could provide a surface for adhering pads or other components to a thin plastic layer. In various embodiments, one or more pads can be incorporated with the reflex player, with the pad(s) located and/or positioned within an expanded polystyrene foam (EPS) frame of varying density that lies adjacent to the pad structures.

In creating a replacement array, the existing liner from the commercially available helmet may be removed, allowing measurements to be recorded of the interior profile. All specifications (e.g., mechanical characteristics, behavioral characteristics, the impact zones, fit and/or aesthetics) may be considered in customizing a full array or a modular array. The full or modular array may be further assembled to incorporate foam padding to improve fit, rotation and/or absorption of sweat and skin oils. The full or modular array assembly can be permanently affixed or removably connected to be washable or easily replaced.

Although described throughout with respect to a helmet or similar item, the impact absorbing structures described herein may be applied with other garments such as padding, braces, and protectors for various joints and bones, as well as non-protective garment and non-garment applications.

While many of the embodiments are described herein as constructed of polymers or other plastic and/or elastic materials, it should be understood that any materials known in the art could be used for any of the devices, systems and/or methods described in the foregoing embodiments, for example including, but not limited to metal, metal alloys, combinations of metals, plastic, polyethylene, ceramics, cross-linked polyethylene's or polymers or plastics, and natural or man-made materials. In addition, the various materials disclosed herein could comprise composite materials, as well as coatings thereon.

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. The invention may be embodied in other specific forms without departing from the spirit or essential characteristics thereof. The foregoing embodiments are therefore to be considered in all respects illustrative rather than limiting on the invention described herein. The scope of the invention is thus intended to include all changes that come within the meaning and range of equivalency of the descriptions provided herein.

Many of the aspects and advantages of the present invention may be more clearly understood and appreciated by reference to the accompanying drawings. The accompanying drawings are incorporated herein and form a part of the specification, illustrating embodiments of the present invention and together with the description, disclose the principles of the invention. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the disclosure herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure.

INCORPORATION BY REFERENCE

The entire disclosure of each of the publications, patent documents, and other references referred to herein is incorporated herein by reference in its entirety for all purposes to the same extent as if each individual source were individually denoted as being incorporated by reference.

We claim:

1. An impact mitigation layer comprising:
  a first plurality of laterally supported filament (LSF) structures, each of the first plurality of LSF structures comprises a first plurality of filaments and a first plurality of flat, planar walls arranged into a first polygonal cross-sectional shape with a filament of the first plurality of filaments positioned at each vertex of the first polygonal cross-sectional shape, each of the first plurality of LSF structures further comprises a first end, a second end and a first cover, wherein the first cover of each of the first plurality of LSF structures completely covers the first end of the respective LSF structure; and
  a second plurality of laterally supported filament (LSF) structures, the second plurality of LSF structures interspersed among the first plurality of LSF structures, each of the second plurality of LSF structures comprises a second plurality of filaments and a second plurality of flat, planar walls arranged into a second polygonal cross-sectional shape with a filament of the second plurality of filaments positioned at each vertex of the second polygonal cross-sectional shape, each of the second plurality of LSF structures further comprises a first end, a second end and a second cover, wherein the second cover of each of the second plurality of LSF structures includes an opening and covers the first end of the respective LSF structure;

wherein the opening in each second cover is configured to receive a coupling attachment to couple each of the second plurality of LSF structures to a structure; and wherein each filament of the first plurality of filaments is formed as a straight filament having a constant cross-section extending from a first filament end to a second filament end, and each filament of the second plurality of filaments is formed as a straight filament having a constant cross-section extending from a third filament end to a fourth filament end.

2. The impact mitigation layer of claim 1, wherein the first polygonal cross-sectional shape and the second polygonal cross-sectional shape comprise different polygonal cross-sectional shapes.

3. The impact mitigation layer of claim 1, wherein the first and second polygonal cross-sectional shape comprises a regular polygon.

4. The impact mitigation layer of claim 3, wherein the regular polygon comprises a square or a hexagon.

5. The impact mitigation layer of claim 3, wherein the regular polygon comprises at least one of a square and a hexagon.

6. The impact mitigation layer of claim 1, wherein the impact mitigation layer further comprises a facesheet, the facesheet coupled to the second end of each of the first plurality of LSF structures and each of the second end of the second plurality of LSF structures.

7. The impact mitigation layer of claim 1, wherein the first plurality of LSF structures comprises a first plurality of filaments with a first aspect ratio and the second plurality of LSF structures comprises a second plurality of filaments with a second aspect ratio.

8. The impact mitigation layer of claim 7, wherein the first aspect ratio is different than the second aspect ratio.

9. The impact mitigation layer of claim 7, wherein the first aspect ratio and the second aspect ratio comprises at least a 3:1 aspect ratio.

10. The impact mitigation layer of claim 1, wherein the first plurality of LSF structures or second plurality of LSF structures are frustum shaped.

11. The impact mitigation layer of claim 1, wherein the first plurality of LSF structures are spaced apart from the second plurality of laterally supported filament (LSF) structures.

12. The impact mitigation layer of claim 1, wherein each filament of the first plurality of filaments has a first diameter and each filament of the second plurality of filaments has a second diameter different than the first diameter.

13. The impact mitigation layer of claim 1, wherein each wall of the first plurality of flat, planar walls has a first width between adjacent filaments of the first plurality of filaments, and each wall of the second plurality of flat, planar walls has a second width between adjacent filaments of the second plurality of filaments, the first width being different than the second width.

14. The impact mitigation layer of claim 1, wherein each filament of the first plurality of filaments has a first filament height, and each wall of the first plurality of flat, planar walls extends along the first filament height, and each wall of the first plurality of flat, planar walls has having a generally constant thickness from a top surface to a bottom surface of each of the first plurality of flat, planar walls.

15. The impact mitigation layer of claim 1, wherein each wall of the first plurality of flat, planar walls has a first height and each wall of the second plurality of flat, planar walls has a second height, wherein the first height is different than the second height.

16. The impact mitigation layer of claim 6, wherein each filament of the first plurality of filaments is attached to the facesheet at a filament base.

17. An impact mitigation layer comprising:
a plurality of impact mitigation pads, each of the plurality of impact mitigation pads comprises a facesheet and a plurality of laterally supported filament (LSF) structures,
each of the plurality of LSF structures comprises a plurality of filaments and a plurality of flat, planar walls, the plurality of filaments is spaced apart and arranged into a polygonal shape with a filament of the plurality of filaments positioned at each vertex of the polygonal shape, the plurality of flat, planar walls extend between the plurality of filaments to create a closed polygonal shape, each of the plurality of LSF structures further include a first end and a second end,
at least a portion of the plurality of LSF structures comprises at least one opening disposed at the first end, and the second end of each of the plurality of LSF structures is coupled to the facesheet; and
wherein the at least one opening of the at least a portion of the plurality of LSF structures is configured to receive a coupling attachment to couple the at least a portion of the plurality of LSF structures to a structure; and
wherein each filament of the plurality of filaments is formed as a straight filament having a constant cross-section extending from a first filament end to a second filament end.

18. The impact mitigation layer of claim 17, wherein the polygonal shape comprises a regular polygon.

19. The impact mitigation layer of claim 18, wherein the regular polygon comprises a square or a hexagon.

20. The impact mitigation layer of claim 18, wherein the regular polygon comprises a square and a hexagon.

21. The impact mitigation layer of claim 17, wherein each of the plurality of filaments comprises at least a 3 to 1 aspect ratio.

22. The impact mitigation layer of claim 17, wherein each of the plurality of filaments having a width, each of the plurality flat, planar walls having a width, the width of each of the plurality of filaments is larger than the width of each of the plurality of flat, planar walls.

23. The impact mitigation layer of claim 17, wherein each of the plurality of filaments comprises a circular cross-section.

24. The impact mitigation layer of claim 23, wherein the circular cross-section is solid.

25. The impact mitigation layer of claim 17, wherein the plurality of laterally supported filament (LSF) structures comprise a frustum shape.

* * * * *